(12) United States Patent
Muniraju et al.

(10) Patent No.: US 11,965,568 B2
(45) Date of Patent: Apr. 23, 2024

(54) SENSING AND ANALYZING BRAKE WEAR DATA

(71) Applicant: Honeywell International Inc., Charlotte, NC (US)

(72) Inventors: Raghavendra Muniraju, Bangalore (IN); Balasubramanya Raju B K, Bangalore (IN); Manu Shastry C R, Bangalore (IN); Srinivasan R, Bangalore (IN); Rao P. V. Ramakrishna, Bangalore (IN)

(73) Assignee: Honeywell International Inc., Charlotte, NC (US)

( * ) Notice: Subject to any disclaimer, the term of this patent is extended or adjusted under 35 U.S.C. 154(b) by 37 days.

(21) Appl. No.: 17/815,718

(22) Filed: Jul. 28, 2022

(65) Prior Publication Data
US 2023/0287951 A1   Sep. 14, 2023

(30) Foreign Application Priority Data
Mar. 10, 2022   (IN) .............................. 202211013015

(51) Int. Cl.
| F16D 66/02 | (2006.01) |
| B60T 17/22 | (2006.01) |
| F16D 66/00 | (2006.01) |

(52) U.S. Cl.
CPC ............ *F16D 66/023* (2013.01); *B60T 17/22* (2013.01); *F16D 66/028* (2013.01); *F16D 2066/006* (2013.01)

(58) Field of Classification Search
CPC ................ F16D 66/023; F16D 66/028; F16D 2066/006; F16D 2066/001;
(Continued)

(56) References Cited

U.S. PATENT DOCUMENTS 7,397,169 B2 * 7/2008 Nersessian ........... H10N 30/306
                                                         310/339
10,072,638 B2 * 9/2018 McKay ..................... F03G 7/06
(Continued)

FOREIGN PATENT DOCUMENTS

| EP | 1259991 A1 | 11/2002 |
| EP | 2622239 A1 | 8/2013 |

(Continued)

OTHER PUBLICATIONS

Extended Search Report from counterpart European Application No. 23157652.1 dated Aug. 21, 2023, 9 pp.
(Continued)

*Primary Examiner* — Freddie Kirkland, III
(74) *Attorney, Agent, or Firm* — Shumaker & Sieffert, P.A.

(57) ABSTRACT

In some examples, a system includes a magnet configured to move in response to a movement of a wear pin indicator of a brake assembly of a vehicle; and a sensor configured to generate position data corresponding to the magnet, the position data indicating a relative linear position of the wear pin indicator, wherein the position data corresponds to an estimated remaining useful lifespan of the brake assembly. Additionally, the system includes an energy harvesting device configured to generate an electrical signal based on an operation of one or both of the brake assembly and the vehicle, wherein the energy harvesting device is configured to deliver at least a portion of the electrical signal to the sensor.

20 Claims, 42 Drawing Sheets

(58) Field of Classification Search
CPC .... F16D 2066/005; F16D 66/00; F16D 66/02; F16D 66/021; F16D 2066/003; B60T 17/22
See application file for complete search history.

(56) References Cited

U.S. PATENT DOCUMENTS

| | | | |
|---|---|---|---|
| 10,471,947 | B1 | 11/2019 | Sheriff et al. |
| 10,843,512 | B2 | 11/2020 | Bates et al. |
| 10,941,826 | B2 | 3/2021 | Muniraju et al. |
| 11,538,975 | B2 * | 12/2022 | Rastegar ................ H10N 10/17 |
| 2005/0205125 | A1 * | 9/2005 | Nersessian ........... H10N 30/306 |
| | | | 136/205 |
| 2009/0229926 | A1 | 9/2009 | Schaefer |
| 2014/0298811 | A1 * | 10/2014 | McKay .................. F01N 5/025 |
| | | | 60/645 |
| 2016/0031394 | A1 | 2/2016 | Irish et al. |
| 2016/0215833 | A1 | 7/2016 | Robert et al. |
| 2017/0117775 | A1 * | 4/2017 | Shahosseini ............ F16H 19/04 |
| 2019/0078630 | A1 | 3/2019 | Serra et al. |
| 2019/0128352 | A1 | 5/2019 | Jain et al. |
| 2019/0217671 | A1 * | 7/2019 | Bates .................. B60C 23/0408 |
| 2020/0080609 | A1 * | 3/2020 | Muniraju .............. B60T 17/221 |
| 2020/0149860 | A1 | 5/2020 | Huang et al. |
| 2021/0229651 | A1 | 7/2021 | Al-tabakha |

FOREIGN PATENT DOCUMENTS

| | | |
|---|---|---|
| EP | 3626566 A1 | 3/2020 |
| GB | 2530819 A | 4/2016 |
| JP | 2010259238 A | 11/2010 |
| WO | 0161768 A1 | 8/2001 |
| WO | 2012041321 A1 | 4/2012 |
| WO | 2021058349 A1 | 4/2021 |

OTHER PUBLICATIONS

U.S. Appl. No. 18/062,953, filed Dec. 7, 2022, naming inventors Ramakrishna Rao et al.

Response to Extended Search Report dated Aug. 21, 2023, from counterpart European Application No. 23157652.1 filed Jan. 23, 2024, 68 pp.

* cited by examiner

SENSING AND ANALYZING BRAKE WEAR DATA

This application claims the benefit of Indian Provisional Patent Application No. 202211013015, filed on Mar. 10, 2022, the entire contents of which is incorporated herein by reference.

TECHNICAL FIELD

The disclosure relates to vehicle brake systems.

BACKGROUND

During periodic maintenance, the amount of wear on a vehicle's braking assembly is manually assessed by a maintenance technician. On an aircraft, for example, the remaining use of the braking assembly is determined by observing the length of a wear pin indicator, also known as a wear pin or a brake wear pin.

SUMMARY

In general, this disclosure describes systems and methods for determining the estimated remaining use of a brake assembly of a vehicle. In some examples, the determination may include a magnet and sensor, where the magnet moves in response to movement of a wear pin indicator of the brake assembly. The sensor may be configured to generate an output signal indicating a position of the magnet relative to the sensor. Additionally, or alternatively, a reflector element may be configured to move in response to movement of the wear pin indicator. A transceiver can transmit a measurement signal and receive a reflection of the measurement signal off the reflector element. Processing circuitry is configured to determine the estimated remaining use of the brake assembly based on an output signal from a sensor and/or a reflection of a measurement signal.

In some examples, a device is configured to determine an estimated remaining use of a brake assembly and includes a magnet configured to move in response to movement of a wear pin indicator of the brake assembly. The device further includes a sensor configured to generate an output signal based on a position of the magnet relative to the sensor. The device also includes processing circuitry configured to determine the estimated remaining use of the brake assembly based on the output signal generated by the sensor.

The sensor may, in some cases, receive energy from an energy harvesting device configured to generate energy based on an operation of one or both of the brake assembly or the vehicle. For example, the brake assembly may generate heat when braking the vehicle, and the energy harvesting device may comprise a thermoelectric device configured to convert this heat into electrical energy. Additionally, or alternatively, the energy harvesting device may include an electromagnetic device configured to generate energy based on a magnetic field induced by a rotation of a wheel proximate to the brake assembly. The system may additionally or alternatively use one or more other techniques of energy harvesting. It may be beneficial to supply the sensor with energy harvested from an operation of the brake assembly, because the sensor may be operational during times in which the brake assembly is in use or close to times in which the brake assembly is in use. Supplying the sensor with energy harvested from the operation of the brake assembly may increase an operational lifetime of the sensor as compared with systems that do not harvest energy from the operation of the brake assembly.

In some examples, a system includes a magnet configured to move in response to a movement of a wear pin indicator of a brake assembly of a vehicle; and a sensor configured to generate position data corresponding to the magnet, the position data indicating a relative linear position of the wear pin indicator, wherein the position data corresponds to an estimated remaining useful lifespan of the brake assembly. Additionally, the system includes an energy harvesting device configured to generate an electrical signal based on an operation of one or both of the brake assembly and the vehicle, wherein the energy harvesting device is configured to deliver at least a portion of the electrical signal to the sensor.

In some examples, a method includes moving a magnet in response to a movement of a wear pin indicator of a brake assembly of a vehicle; generating, by a sensor, position data corresponding to the magnet, the position data indicating a relative linear position of the wear pin indicator, wherein the position data corresponds to an estimated remaining useful lifespan of the brake assembly. Additionally, the method includes generating, by an energy harvesting device, an electrical signal based on an operation of one or both of the brake assembly and the vehicle; and delivering, by the energy harvesting device, at least a portion of the electrical signal to the sensor.

In some examples, a non-transitory computer-readable medium comprising instructions for causing one or more processors to: generate position data corresponding to a magnet that moves in response to a movement of a wear pin indicator of a brake assembly of a vehicle, the position data indicating a relative linear position of the wear pin indicator, wherein the position data corresponds to an estimated remaining useful lifespan of the brake assembly; generate an electrical signal based on an operation of one or both of the brake assembly and the vehicle; and deliver at least a portion of the electrical signal.

The summary is intended to provide an overview of the subject matter described in this disclosure. It is not intended to provide an exclusive or exhaustive explanation of the systems, device, and methods described in detail within the accompanying drawings and description below. Further details of one or more examples of this disclosure are set forth in the accompanying drawings and in the description below. Other features, objects, and advantages will be apparent from the description and drawings, and from the claims.

DETAILED DESCRIPTION

Figure 1:
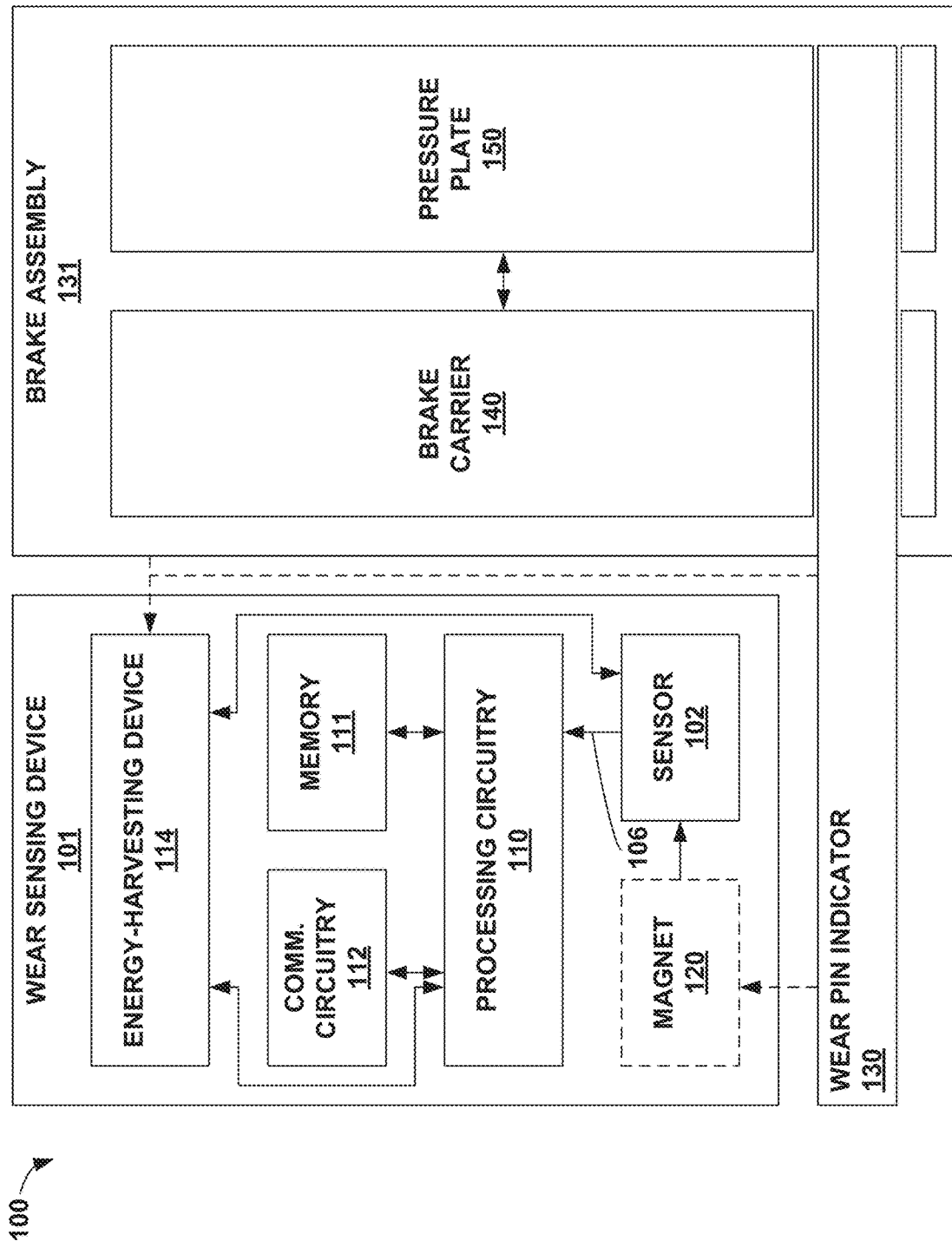
FIG. 1 is a block diagram illustrating a system configured to measure the length of a wear pin indicator and harvest energy for the operation of a sensor, in accordance with one or more techniques of this disclosure.

This disclosure describes techniques for determining an estimated remaining use of a brake assembly based on a length of a wear pin indicator (e.g., a wear pin, a brake wear pin, a wear indicator, and/or a wear indicator pin) in the brake assembly. In some examples, a sensor is configured to generate an output signal based on the position of a magnet that moves in response to movement of the wear pin indicator. The output signal can indicate the position (e.g., a cartesian position and/or a rotational position) of the magnet relative to the sensor, which may indicate the length of the wear pin indicator. Processing circuitry may be configured to determine the estimated remaining use of the brake assembly based on the output signal.

Determining a length of a wear pin indicator is described herein with the understanding that the length of the wear pin indicator corresponds to the amount of use or estimated life of the brake assembly. It should be understood however that when implemented by processing circuitry, the processing circuitry does not necessarily need to determine a length of the wear pin indicator as an input or output variable and may just map an output signal or a time difference to the estimated life of the brake assembly. The mapping, which may be stored to a memory device, can associate signal characteristics and/or times with estimated remaining uses for the brake assembly. The mapping can be based on an equation, a lookup table, or a data structure and may include data such as amplitude, signal strength, time, distance, length, remaining use, and wear rates.

A device of this disclosure can be installed in an existing brake assembly as a retrofit sensor (e.g., an after-market product), or the device can be built into a new brake assembly. In some examples, the device is installed such that the sensor and/or the transceiver does not touch the wear pin indicator. The processing circuitry may be configured to determine and track the length of the wear pin indicator as the length declines over the life of the brake assembly. The processing circuitry may also be configured to output data indicating the length(s) of the wear pin indicator and/or estimate(s) of the remaining use of the brake assembly.

This disclosure also describes techniques for harvesting energy in order to supply power to the processing circuitry and/or the sensor of the wear sensing device that determines the estimated life of the brake assembly. In some examples, the brake assembly may generate heat when the brake assembly operates. For example, the brake assembly may create friction with a wheel in order to cause a rotational velocity of the wheel to decrease. This friction may include heat that radiates to one or more components of the brake assembly including the wear pin indicator, the brake carrier, the pressure plate or any combination thereof. In some examples, an energy harvesting device may include a thermoelectric device that generates an electrical current based on a temperature gradient. This temperature gradient may use one or more components of the brake assembly as a "hot node" of the temperature gradient, thus using the heat generated by operation of the brake assembly to generate power. The energy harvesting device may deliver the electrical energy to one or both of the processing circuitry so that the sensor can operate to determine a remaining length of the wear pin indicator.

The energy harvesting device is not limited to including a thermoelectric device. The energy harvesting device may additionally or alternatively include a piezoelectric device configured to generate an electrical energy based on a vibration of the brake assembly, an electromagnetic device configured to generate an electrical energy based on a rotation of a wheel relative to the brake assembly, or any combination thereof. In any case, the energy harvesting device may be configured to automatically generate energy based on one or more aspects of an operation of the brake assembly. It may be beneficial for the energy harvesting device to generate electrical energy based on the operation of the brake assembly, because the wear sensing device may, in some examples, determine a length of a wear pin indicator during a time when the brake assembly is operating or close to a time when the brake assembly is operating. This means that the energy harvesting device can deliver energy to the sensor at a time when the sensor is operating or close to a time when the sensor is operating.

In some examples, the brake assembly described herein is located on an aircraft. Aircrafts may, in some examples use wheels and braking systems when taking off, landing, taxiing, resting, or any combination thereof. Since aircraft are often subject to congested taxiways, short runway exits, and tight gate turn-times it may be beneficial to improve an efficiency of monitoring one or more aspects of the aircraft. For example, shortening an amount of time that it takes to evaluate a remaining use of a brake assembly may shorten an amount of time that an aircraft is idle. In some examples, a ground aircraft engineering team makes efforts in monitoring the wheels and brakes of an aircraft in order to analyze wear and tear and ensure the aircraft safety during take-off and landing. In some examples, an airline may perform routine (e.g., daily) visual inspections of the tires and brake systems. Standard procedures may involve a visual inspection. Visual inspections may be subject to human error, so it may be beneficial to use sensor data to evaluate wheels and brakes of an aircraft. In some examples, it may be beneficial to use an artificial intelligence (AI) model and/or a machine learning (ML) model in order to evaluate sensor data.

It may be beneficial to automatically measure the wear of a braking system in order to improve safety. For example, every time an aircraft lands may cause wear to a brake assembly. Since the brake assembly is important to an aircraft, some aircraft operators inspect brake assemblies before every flight in order to make sure that the brake assembly has enough life remaining. In some examples, a manual and/or a visual inspection of the brakes takes 10-15 minutes, meaning that manual and visual inspections are costly to aircraft operators. Automatic brake inspections based on sensor data may improve an accuracy of brake inspections and/or decrease a cost to airlines as compared with manual inspections. One or more automatic brake wear measurement systems described herein may generate and evaluate sensor data in order to determine an estimated remaining life of one or more brake assemblies. For example, one or more electronic wear pin sensors (eWPS) may use self-powered energy harvesting technology in order to supply power to the sensors so that the sensors may operate independently without relying on batteries and/or an outside power source. Additionally, or alternatively, sensors may include wear sensing technology, automatic landing and takeoff detection, and on board edge inferencing. Sensors may communicate with a cloud. Computing systems may use AI/ML models in order to evaluate sensor data.

FIG. 1 is a block diagram illustrating a system 100 configured to measure the length of a wear pin indicator 130 and harvest energy for the operation of a sensor 102, in accordance with one or more techniques of this disclosure. As seen in FIG. 1 system 100 includes wear sensing device 101 and brake assembly 131. Wear sensing device 101 includes sensor 102, processing circuitry 110, memory 111, communication circuitry 112, and energy harvesting device 114. Magnet 120 may, in some examples, be part of wear sensing device 101. In other examples, magnet 120 is part of brake assembly 131. Brake assembly 131 includes wear pin indicator 130, brake carrier 140, and pressure plate 150. Wear sensing device 101, or any other device described in this disclosure, can be physically attached to a brake assembly (e.g., brake assembly 131) of a vehicle, such as an aircraft or a helicopter, a space vehicle such as a satellite or spaceship, a land vehicle such as an automobile, a manned vehicle, an unmanned vehicle such as a drone, a remote-control vehicle, or any suitable vehicle without any pilot or crew on board.

Wear sensing device 101 may be attached to one or more components such that a movement of magnet 120 indicates a movement of wear pin indicator 130 relative to one or more other components of brake assembly 131. In some examples, wear sensing device 101 may be attached to brake carrier 140 of brake assembly 131, but this is not required. Wear sensing device 101 may be attached to any component such that sensor 102 wear sensing device 101 is configured to generate an output signal indicative of a remaining length of wear pin indicator 130.

In some examples, sensor 102 includes array of sensor elements, where each of the sensor elements may be configured to generate an output signal based on the position of magnet 120. In some examples, sensor 102 could include a single sensor element or any other number of sensor elements. Each sensor element in the array of sensor elements may be spaced apart or separated from an adjacent sensor by an air gap or another dielectric material. In some examples, sensor 102 includes one or more sensor elements configured to determine a rotational position of magnet 120 relative to sensor 102. For example, magnet 120 may be fixed in a cartesian position relative to magnet 120 and sensor 102, but magnet 120 may be configured to rotate as sensor 102 remains stationary. Sensor 102 may be configured to determine one or more rotational parameters of magnet 120 in order to determine a remaining length of wear pin indicator 130.

Processing circuitry 110, in some examples, may include one or more processors that are configured to implement functionality and/or process instructions for execution within wear sensing device 101. For example, processing circuitry 110 may be capable of processing instructions stored in memory 111. Processing circuitry 110 may include, for example, microprocessors, digital signal processors (DSPs), application specific integrated circuits (ASICs), field-programmable gate arrays (FPGAs), or equivalent discrete or integrated logic circuitry, or a combination of any of the foregoing devices or circuitry. Accordingly, processing circuitry 110 may include any suitable structure, whether in hardware, software, firmware, or any combination thereof, to perform the functions ascribed herein to processing circuitry 110.

Processing circuitry 110 is configured to determine an estimated remaining use of the brake assembly, which includes wear pin indicator 130, brake carrier 140, and pressure plate 150, as well as other components not shown in FIG. 1A. Processing circuitry 110 may be configured to determine the estimated remaining use based directly on output signal 106, or processing circuitry 110 may first determine the length of wear pin indicator 130. Processing circuitry 110 can determine the length of wear pin indicator 130 based on output signal 106 and determine the remaining use of the brake assembly based on the length of wear pin indicator 130. Processing circuitry 110 may divide the length by an estimate of the wear (e.g., reduction in length) per braking event to determine the remaining use. Processing circuitry 110 can use the specifications for the brake assembly to determine the estimate of wear per braking event (e.g., rate of wear). Alternatively, or additionally, processing circuitry 110 can use measurements of the length of wear pin indicator 130, along with the number of braking events between measurements, to determine the estimate of wear per braking event.

Processing circuitry 110 may be configured to determine the position (e.g., a cartesian position and/or a rotational position) of magnet 120 based on output signal 106. Processing circuitry 110 may receive output signal 106 and determine the position of magnet 120 relative to sensor 102 based output signal 106. Using output signal 106, processing circuitry 110 may be configured to determine the remaining length of wear pin indicator 130 by, for example, comparing the current distance measurement to an initial or previous distance or length. Processing circuitry 110 may be configured to determine the position of magnet 120 and then determine the length of wear pin indicator 130 based on the position of magnet 120 relative to sensor 102 and the position of magnet 120 relative to wear pin indicator 130. Processing circuitry 110 may also be configured to transmit the determined current length of wear pin indicator 130, along with a timestamp indicative of the time at which the length was measured, to be stored within memory 111 of device 101.

Processing circuitry 110 may further be configured to retrieve from memory 111 a previous set of wear pin indicator length and time data and use the data in conjunction with a current measurement in order to determine a rate of change of the length of wear pin indicator 130 during the time between which the different measurements were conducted. Processing circuitry 110 may then transmit the rate of change data to be stored in memory 111 along with the length and time data. Processing circuitry 110 may determine if the length of the wear pin indicator is less than a threshold length and generate an alert in response to determining that the length of the wear pin indicator is less than the threshold length. Such an alert may be an audio alert, such as a recorded verbal message or a tone, or alternatively or additionally, a visual alert, such as a displayed phrase, message, symbol, or color.

In some examples, processing circuitry 110 may perform data analysis on the data indicating the length of wear pin indicator 130. For example, processing circuitry 110 may use data indicating the number of braking events, the weather conditions during each braking event, the vehicle operator during each braking event, the type of surface for each braking event (asphalt, concrete, etc.), and/or any other data stored to memory 111. Processing circuitry 110 may determine metrics such as the rate of wear and the estimated remaining use of wear pin indicator 130. Processing circuitry 110 may also determine when and whether to generate alerts regarding the status of wear pin indicator 130 and/or the brake assembly. Alternatively, or additionally, processing circuitry 110 may output the data to an external computing system, such as the avionics bay of an aircraft, to perform the data analysis on data relating to wear pin indicator 130 and/or the brake assembly.

In some examples, memory 111 includes computer-readable instructions that, when executed by processing circuitry 110, cause wear sensing device 101 and processing circuitry 110 to perform various functions attributed to wear sensing device 101 and processing circuitry 110 herein. Memory 111 may include any volatile, non-volatile, magnetic, optical, or electrical media, such as a random access memory (RAM), read-only memory (ROM), non-volatile RAM (NVRAM), electrically-erasable programmable ROM (EEPROM), flash memory, or any other digital media.

Memory 111 may include a non-transitory computer-readable medium capable of storing information indicative of the length of wear pin indicator 130 along with a timestamp indicating the time at which the measurement was made. Memory 111 may be further configured to store multiple sets of length and time data, as well as rates of change of the length of wear pin indicator 130 between subsequent measurements. Memory 111 may also store threshold lengths and threshold distances that processing circuitry 110 may use to determine if wear pin indicator 130 is approaching an end of useful life. In some examples, the memory device stores data relating to braking events, such as a measurement conducted when the brakes are applied, and weather or climate conditions.

Processing circuitry 110 may be configured to determine the estimated remaining use of the brake assembly 131 directly based on output signal 106, for example, based on a mapping of signal characteristics to remaining-use estimates stored to memory 111. The mapping may take the form a data structure such as an array or a lookup table that associates estimated remaining uses with signal characteristics, such as strength, amplitude, power, direction, etc. Processing circuitry 110 may use the mapping stored to memory 111 to directly determine the estimated remaining use of the brake assembly, or processing circuitry 110 may first determine the position of magnet 120 (e.g., absolute position or position relative to sensor 102). Processing circuitry 110 may be configured to update the mapping stored to memory 111 by storing each instance of output signal 106 (e.g., each sampling of output signal 106) and the new estimated remaining use of the brake assembly to the memory device.

Communication circuitry 112 may include any suitable hardware, firmware, software or any combination thereof for communicating with another device. Under the control of processing circuitry 110, communication circuitry 112 may receive downlink telemetry from, as well as send uplink telemetry to, another device. In some examples, communication circuitry 112 exchanges information with the aid of an internal or external antenna (not illustrated in FIG. 1. Communication circuitry 112 may include any combination of a Bluetooth® radio, LoRa radio, Wi-Fi radio, LTE radio, an electronic oscillator, frequency modulation circuitry, frequency demodulation circuitry, amplifier circuitry, and power switches such as a metal-oxide-semiconductor field-effect transistors (MOSFET), a bipolar junction transistor (BJT), an insulated-gate bipolar transistor (IGBT), a junction field effect transistor (JFET), or another element that uses voltage for its control.

In some examples, magnet 120 is may be coupled to or attached to an exposed end of wear pin indicator 130. Magnet 120 is configured to move laterally (e.g., in the y-axis direction) in response to movement of wear pin indicator 130. The position of magnet 120 indicates remaining wear length 132 of wear pin indicator 130. Magnet 120 may be attached to wear pin indicator 130 by mounting, screwing, welding, gluing, taping, soldering, and/or any other attaching technique. In some examples, magnet 120 may comprise a rotational magnet configured to engage with wear pin indicator 130 such that magnet 120 rotates as wear pin indicator 130 moves laterally. Magnet 120 may include magnetic material such as iron, cobalt, nickel, aluminum, alnico, and/or any other magnetic materials.

Energy harvesting device 114 may be configured to generate electrical energy for powering one or more components of wear-sensing device 101. Energy harvesting device 114 may include one or more thermoelectric devices, one or more electromagnetic devices, one or more piezoelectric devices, or any combination thereof. In some examples, energy harvesting device 114 may generate electrical energy based on an operation of brake assembly 131. For example, brake assembly 131 may generate heat during operation, move during operation, vibrate during operation, and a wheel may rotate proximate to brake assembly 131 while brake assembly 131 is operating. One or more thermoelectric devices of energy harvesting device 114 may generate electrical energy based on heat generated by brake assembly 131 during operation. One or more electromagnetic devices of energy harvesting device 114 may generate electrical energy based on a rotation of a wheel proximate to brake assembly 131 during operation and/or based on a vibration of brake assembly 131 during operation. One or more piezoelectric devices of energy harvesting device 114 may generate electrical energy based on a vibration of brake assembly 131 during operation.

Wear pin indicator 130 is a component whose exposed length represents the remaining use (e.g., remaining lifespan) of the brake assembly of a vehicle. In some examples, when the tip of wear pin indicator 130 is flush with brake carrier 140, the vehicle's brakes may need replacement due to excessive wear. Wear pin indicator 130 may have any suitable shape, such as a cylinder, a cone, or a rectangle, where the length of wear pin indicator 130 may decrease over time. As a cylinder, wear pin indicator 130 may have a radius of a few millimeters. Wear pin indicator 130 can also include a material layer, a coating, and/or a covering that indicates the wear of the brake assembly.

The brake assembly may include braking elements for slowing the speed of rotation of vehicle wheels, such as automobile wheels or aircraft landing gear. The brake assembly may be mounted to or built in to the wheels. Wear sensing device 101 may be mounted to a part of the brake assembly, such as brake carrier 140. The brake assembly may also be referred to herein as a "braking assembly" or as a "braking system." As used herein, the term "the remaining use of the brake assembly" may refer to the remaining use of the brake lining.

Wear pin indicator 130 is mounted on pressure plate 150 (e.g., by a rivet), which holds the brake lining on the other side of pressure plate 150. Pressure plate 150 may include metal material. Pressure plate 150 can be attached to one or more pads of the brake lining (e.g., a brake shoe a brake pad) that may include steel or carbon. Pressure plate 150 is configured to move with respect to brake carrier 140 as the vehicle's brakes wear down through use over time.

The brake lining may press against a rotating component of a wheel to reduce the speed of the rotating component. When the brakes are applied during a braking event, a stationary hydraulic system can push or displace pressure plate 150 against the brake lining thereby generating friction between the stationary pads of the brake lining and the rotating component, such as a wheel disc. The friction between the pads of the brake lining and the rotating component causes the rotation of the wheel to decline. The brake lining may be the active portion of braking assembly that wears down over time due to braking events.

Because wear pin indicator 130 is physically coupled to pressure plate 150, wear pin indicator 130 likewise moves with respect to brake carrier 140, and with respect to sensor 102. As a remaining wear length of wear pin indicator 130 approaches zero, and the tip or surface of wear pin indicator 130 approaches the surface of brake carrier 140, the brakes may be nearing the time at which they need to be replaced. When the surface of wear pin indicator 130 is flush with the surface of brake carrier 140, the lifespan of the vehicle's brakes may be presumed to be over, or may be considered dangerous to continue using, as this may result in brake failure.

In accordance with the techniques of this disclosure, processing circuitry 110 may determine the estimated remaining use of the brake assembly based on output signal 106, which may indicate the position (e.g., a cartesian position and/or a rotational position) of magnet 120 relative to sensor 102. Device 101 may perform a measurement of the estimated remaining use of the brake assembly automatically (e.g., without a human operator). For example, a measurement of the estimated remaining use of the brake assembly may occur when the brakes are applied. Processing circuitry 110 may be configured to determine when the brakes are applied and to sample, without human intervention, output signal 106 when the brakes are applied.

In some examples, the techniques of this disclosure may be especially useful for after-market devices that can be installed on existing brake assemblies. An after-market device may be installed on a brake carrier 140 such that device 101 does not contact wear pin indicator 130. In some examples, the techniques of this disclosure may be especially useful for new brake assemblies and/or other new products.

Figure 2A:
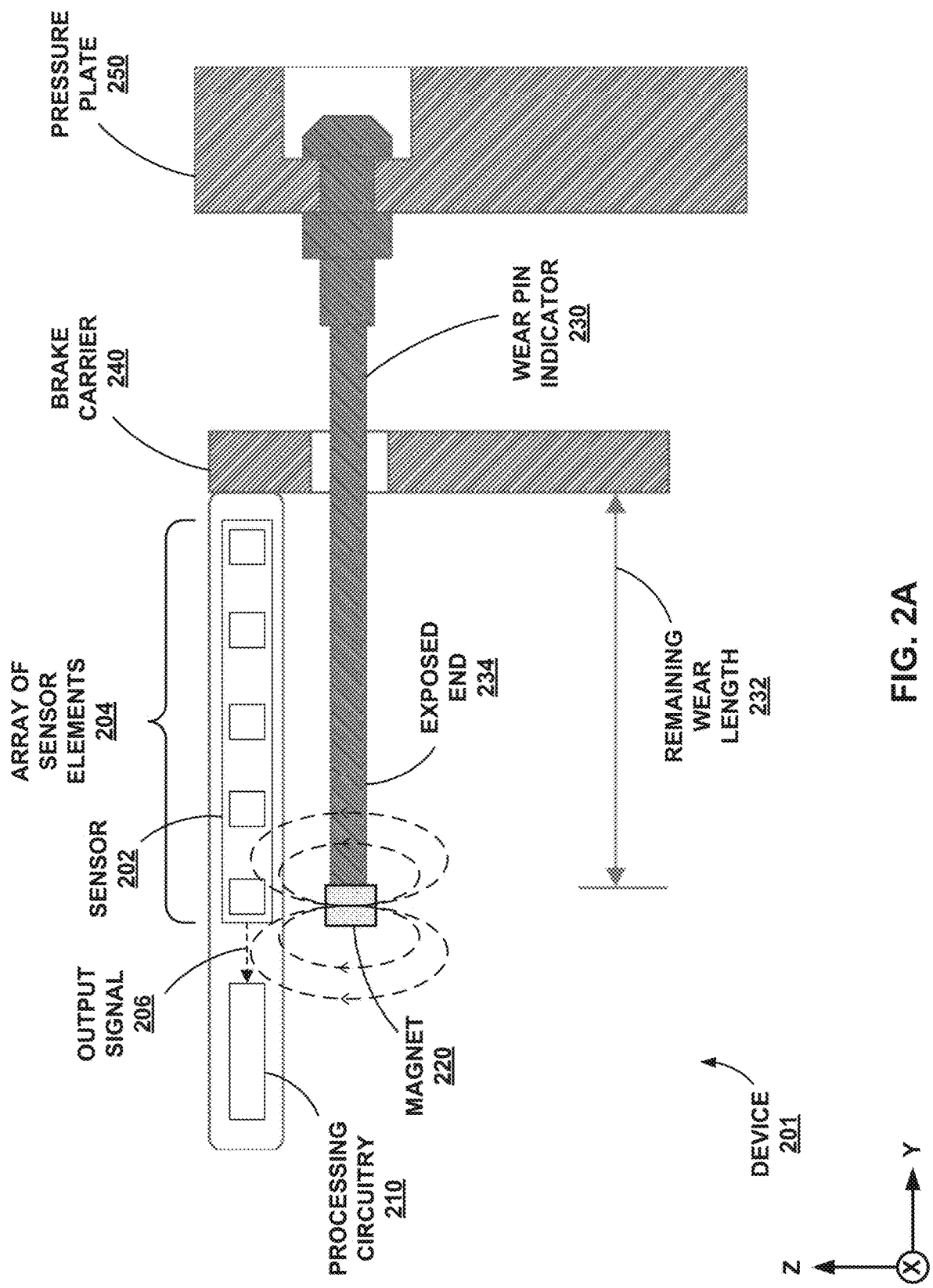
FIG. 2A is a diagram depicting a device for measuring the length of a wear pin indicator 230 with a linear array of sensor elements 204, in accordance with one or more techniques of this disclosure.

FIG. 2A is a diagram depicting a device for measuring the length of a wear pin indicator 230 with a linear array of sensor elements 204, in accordance with one or more techniques of this disclosure. Wear sensing device 201 includes sensor 202, processing circuitry 210, and magnet 220. Wear sensing device 201, or any other device described in this disclosure, can be physically attached to a brake assembly of a vehicle, such as an aircraft or a helicopter, a space vehicle such as a satellite or spaceship, a land vehicle such as an automobile, a manned vehicle, an unmanned vehicle such as a drone, a remote-control vehicle, or any suitable vehicle without any pilot or crew on board. The brake assembly includes wear pin indicator 230, brake carrier 240, and pressure plate 250.

Device 201 includes sensor 202 configured to generate output signals based on the position magnet 220. Device 201 also includes processing circuitry 210 configured to determine an estimated remaining use of a brake assembly.

Wear sensing device 201 may be attached to brake carrier 240 by mounting, gluing, taping, soldering, and/or any other attaching technique. In some examples, wear sensing device 201 is attached to brake carrier 240 such that wear sensing device 201 does not move. Therefore, as the length of wear pin indicator 230 decreases, output signal 206 changes based on the position of magnet 220 relative to each sensor of array of sensor elements 204. Output signal 206 may indicate a reduction in the length of wear pin indicator 230, which indicates the remaining use of brake carrier 240.

Sensor 202 includes array of sensor elements 204, where each of the sensor elements may be configured to generate an output signal based on the position of magnet 220. Sensors 202, 302, and 902 are examples of sensor 202. In some examples, sensor 202 could include a single sensor element or any other number of sensor elements. Each sensor element in array 204 may be spaced apart or separated from an adjacent sensor by an air gap or another dielectric material. This dielectric material may include an encapsulation material, a potting compound, or a room temperature vulcanizing (RTV) rubber sealant. Each of the sensor elements may be spaced center-on-center by five millimeters, ten millimeters, or any other suitable spacing. For example, if array 204 has eight sensor elements, sensor 202 may be 75 millimeters or three inches wide. Each of the sensor elements may be mounted on a printed circuit board inside of a housing or carrier.

In some examples, the output signal of each sensor element of array 204 may be inversely proportional to the distance between the respective sensor element and magnet 220. Sensor 202 may include a magnetoresistive sensor such as an anisotropic magnetoresistive (AMR) sensor or a giant magnetoresistive sensor, a Hall sensor, and/or any other type of sensor.

Output signal 206 may also be based on the position of magnet 220, or more specifically, by the direction of the portion of the magnetic field generated by magnet 220 that is passing through sensor 202 (e.g., through each element of array 204) at that position. Because the magnetic field lines are curved, the direction of the field passing through sensor 202 changes as magnet 220 moves along the y-axis, thereby varying output signal 206. For example, as magnet 220 approaches sensor 202 from the negative y-axis, the magnetic field passing through the sensor may gradually rotate from the positive z-axis, to the negative y-axis, to the negative z-axis. This rotation may trigger output signal 206 to have a positive value, a minimum negative value, and then approach zero value, respectively. Once magnet 220 is directly underneath a sensor element of array 204 (in the negative z-axis direction relative to sensor 202), the sensor element may be situated directly between the symmetrical magnetic fields extending from either side of magnet 220, and output signal 206 may register a zero value. As magnet 220 further progresses along the y-axis, the opposite magnetic field may trigger output signal 206, moving from the zero value to a maximum positive value, and then regressing back toward a negative value.

Processing circuitry 210 is configured to determine an estimated remaining use of the brake assembly, which includes wear pin indicator 230, brake carrier 240, and pressure plate 250, as well as other components not shown in FIG. 2A. Processing circuitry 210 may be configured to determine the estimated remaining use based directly on output signal 206, or processing circuitry 210 may first determine the length of wear pin indicator 230. Processing circuitry 210 can determine the length of wear pin indicator 230 based on output signal 206 and determine the remaining use of the brake assembly based on the length of wear pin indicator 230. Processing circuitry 210 may divide the length by an estimate of the wear (e.g., reduction in length) per braking event to determine the remaining use. Processing circuitry 210 can use the specifications for the brake assembly to determine the estimate of wear per braking event (e.g., rate of wear). Alternatively, or additionally, processing circuitry 210 can use measurements of the length of wear pin indicator 230, along with the number of braking events between measurements, to determine the estimate of wear per braking event.

Processing circuitry 210 may be configured to determine the position of magnet 220 based on output signal 206, which may include a plurality of output signals generated by array of sensor elements 204. For example, if array 204 includes five sensor elements, each sensor can generate an output signal. Processing circuitry 210 may receive the five output signals and determine the position of magnet 220 relative to sensor 202 based on the five output signals. If magnet 220 is closer to a first sensor element than a second sensor element, the first sensor element may generate a stronger output signal than the first sensor element depending on the orientation of the positive pole and the negative pole of magnet 220.

Using output signal 206, processing circuitry 210 may be configured to determine the remaining length of wear pin indicator 230 by, for example, comparing the current distance measurement to an initial or previous distance or length. Processing circuitry 210 may be configured to determine the position of magnet 220 and then determine the length of wear pin indicator 230 based on the position of magnet 220 relative to sensor 202 and the position of magnet 220 relative to wear pin indicator 230. Processing circuitry 210 may also be configured to transmit the determined current length of wear pin indicator 230, along with a timestamp indicative of the time at which the length was measured, to be stored within a memory device of Wear sensing device 201.

Processing circuitry 210 may further be configured to retrieve from the memory device a previous set of wear pin indicator length and time data and use the data in conjunction with a current measurement in order to determine a rate of change of the length of wear pin indicator 230 during the time between which the different measurements were conducted. Processing circuitry 210 may then transmit the rate of change data to be stored in the memory device along with the length and time data. Processing circuitry 210 may determine if the length of the wear pin indicator is less than a threshold length and generate an alert in response to determining that the length of the wear pin indicator is less than the threshold length. Such an alert may be an audio alert, such as a recorded verbal message or a tone, or alternatively or additionally, a visual alert, such as a displayed phrase, message, symbol, or color.

In some examples, processing circuitry 210 may perform data analysis on the data indicating the length of wear pin indicator 230. For example, processing circuitry 210 may use data indicating the number of braking events, the weather conditions during each braking event, the vehicle operator during each braking event, the type of surface for each braking event (asphalt, concrete, etc.), and/or any other data stored to the memory device. Processing circuitry 210 may determine metrics such as the rate of wear and the estimated remaining use of wear pin indicator 230. Processing circuitry 210 may also determine when and whether to generate alerts regarding the status of wear pin indicator 230 and/or the brake assembly. Alternatively, or additionally, processing circuitry 210 may output the data to an external computing system, such as the avionics bay of an aircraft, to perform the data analysis on data relating to wear pin indicator 230 and/or the brake assembly.

Although not shown in FIG. 2A, the memory device of wear sensing device 201 is a non-transitory computer-readable medium capable of storing information indicative of the length of wear pin indicator 230 along with a timestamp indicating the time at which the measurement was made. The memory device may be further configured to store multiple sets of length and time data, as well as rates of change of the length of wear pin indicator 230 between subsequent measurements. The memory device may also store threshold lengths and threshold distances that processing circuitry 210 may use to determine if wear pin indicator 230 is approaching an end of useful life. In some examples, the memory device stores data relating to braking events, such as a measurement conducted when the brakes are applied, and weather or climate conditions.

Processing circuitry 210 may be configured to determine the estimated remaining use of the brake assembly directly based on output signal 206, for example, based on a mapping of signal characteristics to remaining-use estimates stored to a memory device. The mapping may take the form a data structure such as an array or a lookup table that associates estimated remaining uses with signal characteristics, such as strength, amplitude, power, direction, etc. Processing circuitry 210 may use the mapping stored to a memory device to directly determine the estimated remaining use of the brake assembly, or processing circuitry 210 may first determine the position of magnet 220 (e.g., absolute position or position relative to sensor 202). Processing circuitry 210 may be configured to update the mapping stored to the memory device by storing each instance of output signal 206 (e.g., each sampling of output signal 206) and the new estimated remaining use of the brake assembly to the memory device.

Wear sensing device 201 may also include a communication element (see, e.g., communication circuitry 912 shown in FIG. 9) configured to transmit data to an external computing system. The communication element may transmit data through a wired connection or a wireless connection to the external computing system. The transmitted data may indicate the estimated remaining use of the brake assembly, the length of the wear, the rate of change of the length of the wear pin indicator, and/or any other relevant data.

Magnet 220 is shown in FIG. 2A as coupled to or attached to exposed end 234 of wear pin indicator 230. Magnet 220 is configured to move laterally (e.g., in the y-axis direction) in response to movement of wear pin indicator 230. The position of magnet 220 indicates remaining wear length 232 of wear pin indicator 230. Magnet 220 may be attached to wear pin indicator 230 by mounting, screwing, welding, gluing, taping, soldering, and/or any other attaching technique. Magnet 220 may include magnetic material such as iron, cobalt, nickel, aluminum, alnico, and/or any other magnetic materials.

Magnet 220 is configured to generate a magnetic field, as shown by the example magnetic field lines in FIG. 2A. Magnet 220 may include a positive pole and a negative pole oriented along a line in the z-axis direction, such that one pole is closer to array of sensor elements 204 than the other pole. Thus, as magnet 220 moves past sensor 202, output signal 206 varies as a function of the direction of the magnetic field passing through the sensor at that position. Since the magnetic fields form a symmetrical arc on either side of magnet 220, output signal 206 may form a sinusoid as magnet 220 gradually moves past sensor 202, as shown in graph 270B of FIG. 2B.

Wear pin indicator 230 is a component whose exposed length represents the remaining use (e.g., remaining lifespan) of the brake assembly of a vehicle. In some examples, when the tip of wear pin indicator 230 is flush with brake carrier 240, the vehicle's brakes may need replacement due to excessive wear. Wear pin indicator 230 may have any suitable shape, such as a cylinder, a cone, or a rectangle, where the length of wear pin indicator 230 may decrease over time. As a cylinder, wear pin indicator 230 may have a radius of a few millimeters. Wear pin indicator 230 can also include a material layer, a coating, and/or a covering that indicates the wear of the brake assembly.

The brake assembly may include braking elements for slowing the speed of rotation of vehicle wheels, such as automobile wheels or aircraft landing gear. The brake assembly may be mounted to or built into the wheels. Wear sensing device 201 may be mounted to a part of the brake assembly, such as brake carrier 240. The brake assembly may also be referred to herein as a "braking assembly" or as a "braking system." As used herein, the term "the remaining use of the brake assembly" may refer to the remaining use of the brake lining.

Wear pin indicator 230 is mounted on pressure plate 250 (e.g., by a rivet), which holds the brake lining on the other side of pressure plate 250. Pressure plate 250 may include metal material. Brake carriers 240, 340, 440, 540, and 740 are examples of brake carrier 240, and pressure plates 250, 350, 450, 550, and 750 are examples of pressure plate 250. Pressure plate 250 can be attached to one or more pads of the brake lining (e.g., a brake shoe a brake pad) that may include steel or carbon. Pressure plate 250 is configured to move with respect to brake carrier 240 as the vehicle's brakes wear down through use over time.

The brake lining may press against a rotating component of a wheel to reduce the speed of the rotating component. When the brakes are applied during a braking event, a stationary hydraulic system can push or displace pressure plate 250 against the brake lining thereby generating friction between the stationary pads of the brake lining and the rotating component, such as a wheel disc. The friction between the pads of the brake lining and the rotating component causes the rotation of the wheel to decline. The brake lining may be the active portion of braking assembly that wears down over time due to braking events.

Because wear pin indicator 230 is physically coupled to pressure plate 250, wear pin indicator 230 likewise moves with respect to brake carrier 240, and with respect to sensor 202. In the example of FIG. 2A, wear pin indicator 230 is attached to pressure plate 250 and protrudes through brake carrier 240. Because wear pin indicator 230 moves with respect to brake carrier 240, the exposed portion of wear pin indicator 230, or remaining wear length 232, decreases with use of the brakes. As remaining wear length 232 approaches zero, and the tip or surface of wear pin indicator 230 approaches the surface of brake carrier 240, the brakes may be nearing the time at which they need to be replaced. When the surface of wear pin indicator 230 is flush with the surface of brake carrier 240, the lifespan of the vehicle's brakes may be presumed to be over, or may be considered dangerous to continue using, as this may result in brake failure.

For example, if the original length of wear pin indicator 230 is one inch (e.g., approximately twenty-five millimeters), and the part supplier states that the new brake lining can perform for one thousand braking events, processing circuitry 210 determines that the wear per braking event is 0.001 inches or 0.025 millimeters. If processing circuitry 210 later determines that a new length of wear pin indicator 230 is ten millimeters less than the original, the processing circuitry may determine that the new length is fifteen millimeters. Using a rate of wear of 0.025 millimeters per braking event and Equation (3), processing circuitry 210 determines that the remaining use of the brake lining is six hundred braking events.

In accordance with the techniques of this disclosure, processing circuitry 210 may determine the estimated remaining use of the brake assembly based on output signal 206, which may indicate the position of magnet 220 relative to sensor 202. Wear sensing device 201 may perform a measurement of the estimated remaining use of the brake assembly automatically (e.g., without a human operator). For example, a measurement of the estimated remaining use of the brake assembly may occur when the brakes are applied. Processing circuitry 210 may be configured to determine when the brakes are applied and to sample, without human intervention, output signal 206 when the brakes are applied.

The techniques of this disclosure may be especially useful for after-market devices that can be installed on existing brake assemblies. An after-market device may be installed on a brake carrier 240 such that wear sensing device 201 does not contact wear pin indicator 230.

Figure 2B:
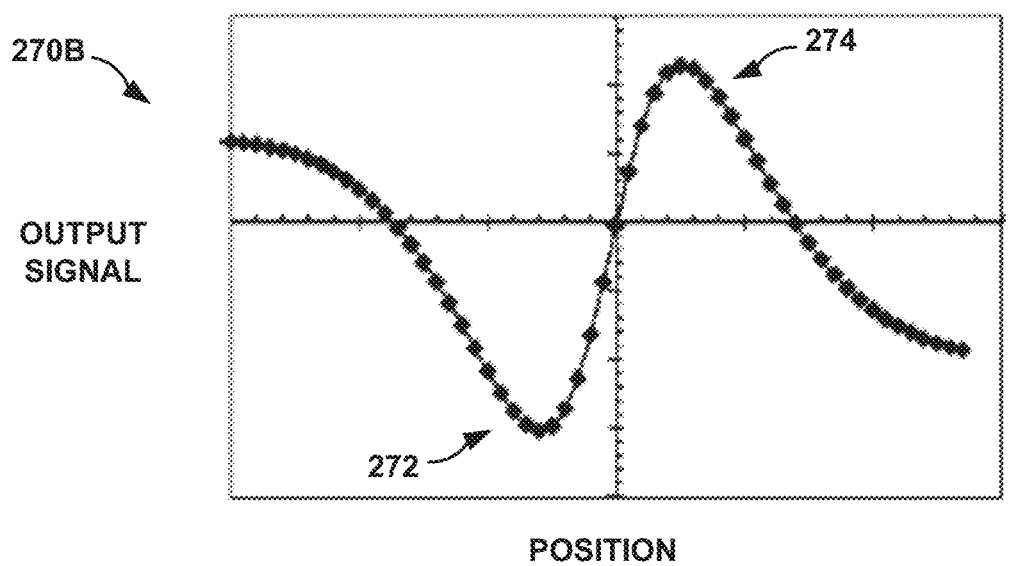
FIGS. 2B-2D are graphs of output signals, position of a magnet, and lengths of a wear pin indicator, in accordance with one or more techniques of this disclosure.
Figure 2C:
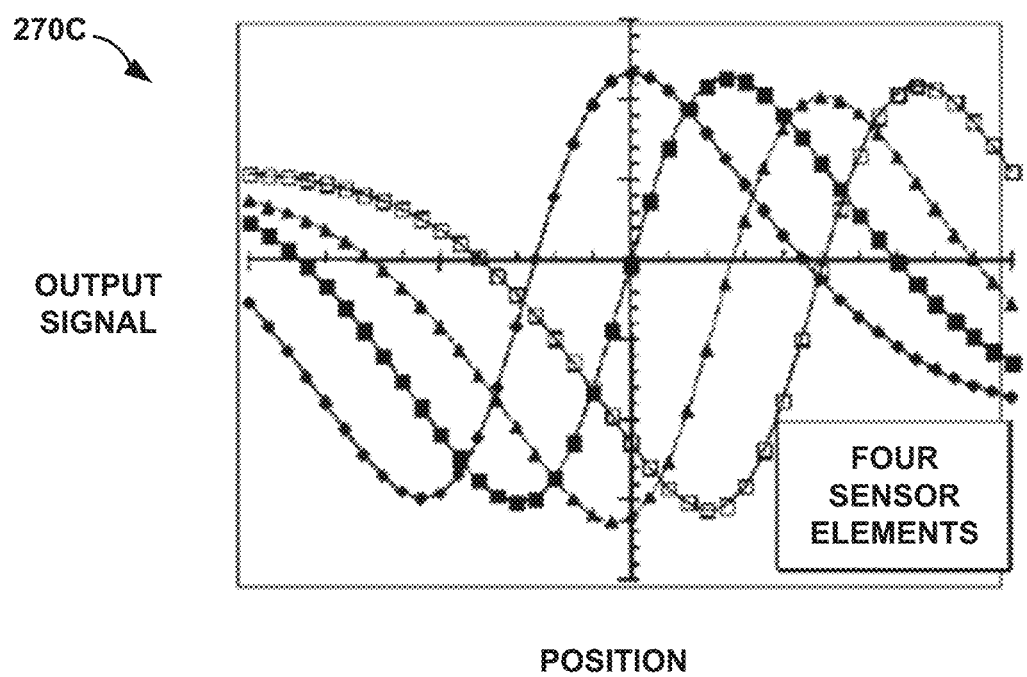
Figure 2D:
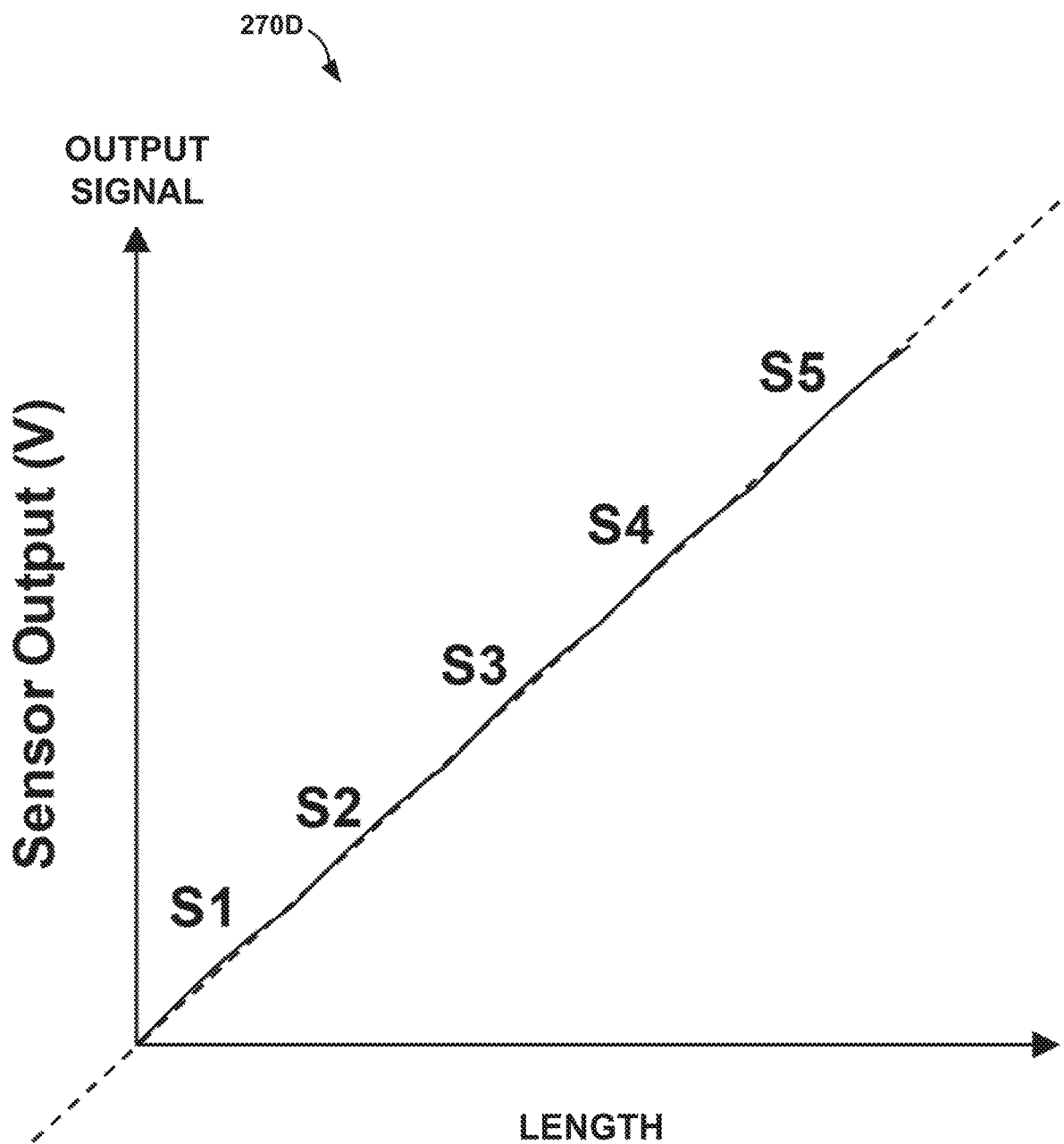

FIGS. 2B-2D are graphs 270B-270D of output signals, position of a magnet, and lengths of a wear pin indicator, in accordance with one or more techniques of this disclosure. For example, graph 270B shows the output signal from a single sensor element. The amplitude of the output signal is a function of the direction of the magnetic field lines passing through the sensor element for any given position of the magnet generating the field. As a magnet approaches the sensor element, the amplitude of the output signal decreases to minimum 272 at the "top" of the field on a first side of the magnet. As the magnet moves past the sensor element, the amplitude of the output signal increases to maximum 274 at the "top" of the magnetic field on the opposite side of the magnet, before decreasing again.

Graph 270C shows output signals that are similar to the output signal shown in graph 270B. However, graph 270C shows four output signals from an array of four sensor elements. Depending on the layout of the sensor elements, the magnet may move past each sensor element at a different time, such that the minimums and maximums of the output signals are not necessarily occurring at the same times. Graph 270D shows a composite output signal for an array of five sensor elements (S1-S5). The output signal shown in graph 270D may have a generally linear relationship with the length of a wear pin indicator but may stray from an ideal linear relationship as the magnet passes each sensor element. Processing circuitry may be configured to determine an estimated remaining use of a brake assembly based on the output signal shown in graph 270D.

Figure 3:
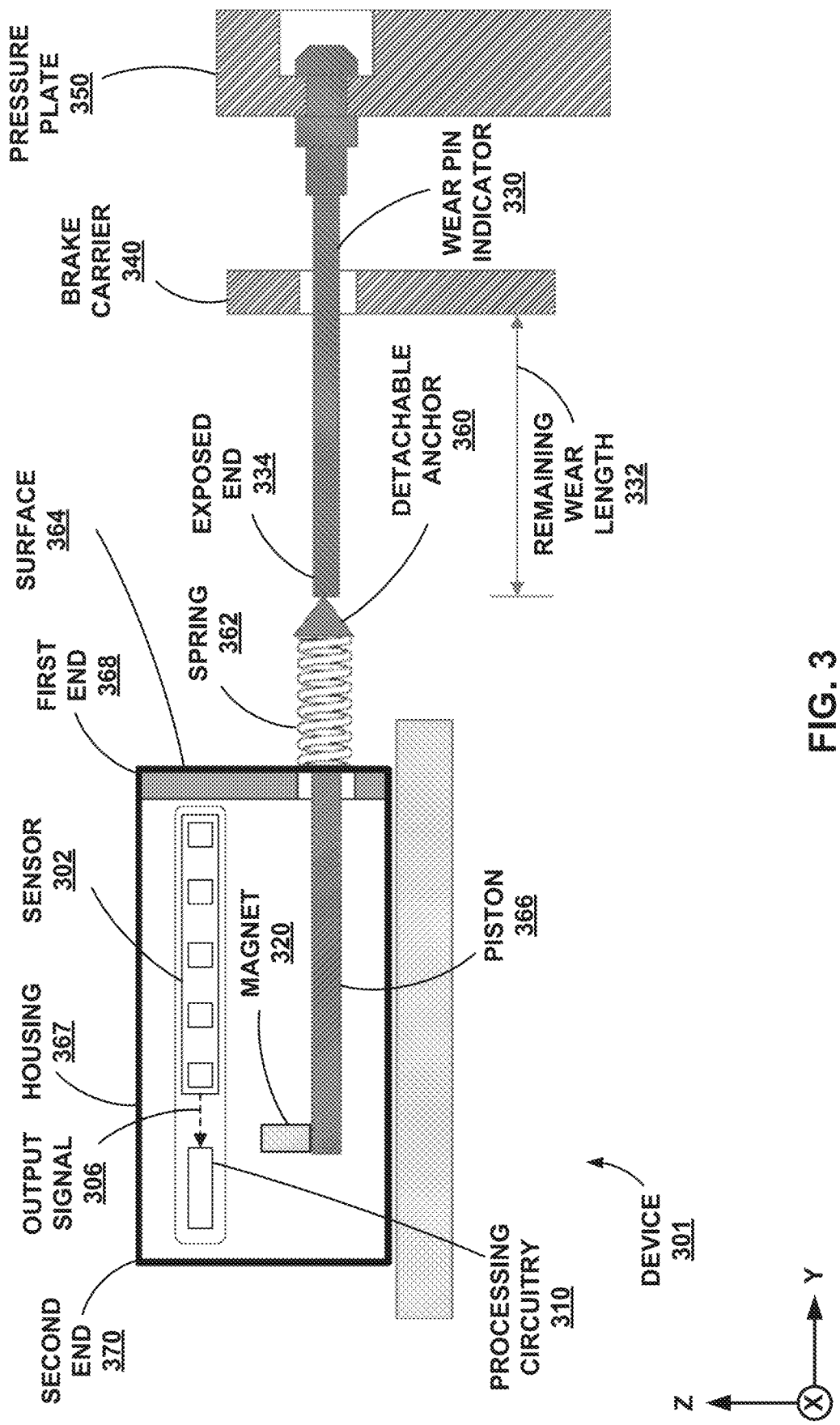
FIG. 3 is a diagram depicting a wear sensing device for measuring the length of a wear pin indicator with a sensor, in accordance with one or more techniques of this disclosure.

FIG. 3 is a diagram depicting a wear sensing device 301 for measuring the length of a wear pin indicator 330 with a sensor 302, in accordance with one or more techniques of this disclosure. Wear sensing device 301 includes sensor 302, processing circuitry 310, magnet 320, detachable anchor 360, spring 362, surface 364, and piston 366. Sensor 302 and processing circuitry 310 may operate in the same manner or a similar manner to sensor 102 and processing circuitry 110 shown in FIG. 1.

Detachable anchor 360 is coupled to exposed end 334 of wear pin indicator 330 and configured to move laterally (e.g., in the y-axis direction) in response to movement of wear pin indicator 330. Detachable anchor 360 is depicted as a pointer tip or a triangle in FIG. 3, but detachable anchor 360 may include any material suitable for attaching an end of spring 362 to wear pin indicator 330. Detachable anchor 360 may be attached to wear pin indicator 330 by mounting, gluing, taping, soldering, and/or any other attaching technique.

Spring 362 is configured to expand or compress in response to movement of wear pin indicator 330. A first end of spring 362 is coupled to detachable anchor 360 and configured to move laterally in response to movement of wear pin indicator 330. A second end of spring 362 is coupled to surface 364 and does not move in response to movement of wear pin indicator 330. Surface 364 may be configured to not move as wear pin indicator 330 moves. Over time, as exposed end 334 moves towards pressure plate 350, spring 362 may expand as the first end moves towards pressure plate 350 and the second end does not move. Spring 362 may expand as a distance between brake carrier 340 and pressure plate 350 increases. Spring 362 may expand as remaining wear length 332 decreases.

Piston 366 is an example of a mounting element coupled to an end of spring 362 and configured to move laterally in response to movement of wear pin indicator 330. A first end of piston 366 may be coupled to detachable anchor 360 and to the first end of spring 362. The first end of piston 366 and a portion of piston 366 is not shown in FIG. 3 because piston 366 is loaded inside of spring 362. Piston 366 may pass through surface 364. Magnet 320 is coupled to a second end of piston 366 by mounting, gluing, taping, soldering, and/or any other attaching technique. Surface 364 may form at least a part of a housing 367 having a first end 368 and a second end 370. In some examples, surface 364 may represent a part of housing 367 located at first end 368. In some examples, surface 364 may represent an entirety of housing 367. Magnet 320 may move along the y-axis towards first end 368 relative to sensor 302 as spring 362 expands. In other words, as a distance between brake carrier 340 and pressure plate 350 increases, and as remaining wear length 332 decreases, spring 362 expands to move piston 366 through the opening in surface 364 at first end 368, thus moving magnet 320 along the y-axis towards first end 368 relative to sensor 302. Processing circuitry 310 may determine the estimated remaining use of the brake assembly based on output signal 306, which may indicate the position of magnet 320 relative to sensor 302. The estimated remaining use of the brake determined by processing circuitry 310, may, in some examples, be correlated with the remaining wear length 332.

Figure 4:
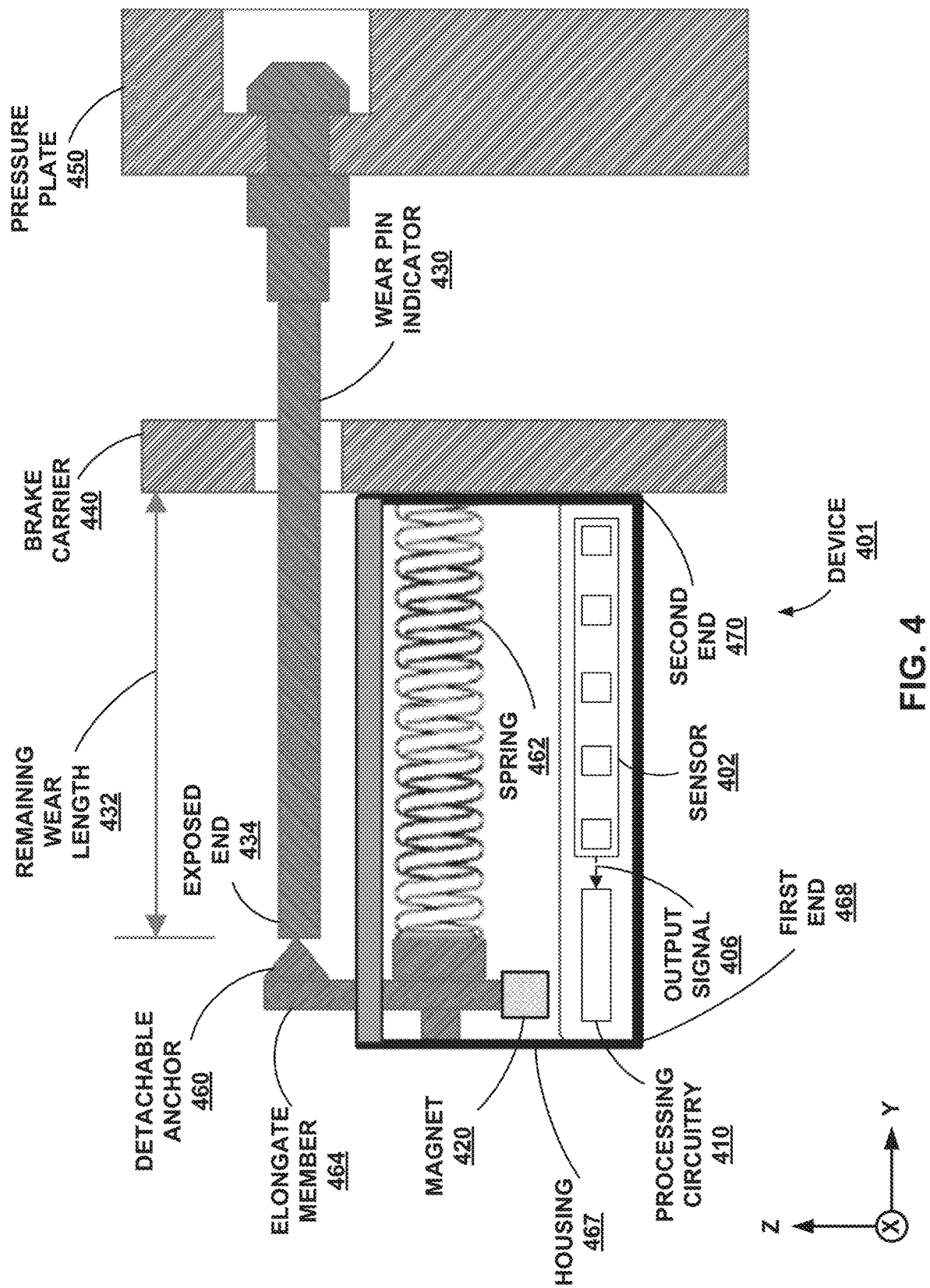
FIG. 4 is a diagram depicting a wear sensing device for measuring the length of a wear pin indicator with a sensor, in accordance with one or more techniques of this disclosure.

FIG. 4 is a diagram depicting a wear sensing device 401 for measuring the length of a wear pin indicator 430 with a sensor 402, in accordance with one or more techniques of this disclosure. Wear sensing device 401 includes sensor 402, processing circuitry 410, magnet 420, detachable anchor 460, spring 462, and elongate member 464. Sensor 402 and processing circuitry 410 may operate in the same manner or a similar manner to sensors 202, and 302 and processing circuitry 210 and 310 shown in FIGS. 2A and 3.

In the example of FIG. 4, housing 467 of wear sensing device 401 includes a first end 468 and a second end 470. The second end 470 of housing 467 may be coupled to brake carrier 440 so that when brake carrier 440 moves relative to pressure plate 450 and wear pin indicator 430, wear sensing device 401 also moves relative to pressure plate 450 and wear pin indicator 430.

In some examples, detachable anchor 460 is coupled to exposed end 434 of wear pin indicator 430. In some examples, detachable anchor detachable anchor 460 and exposed end 434 apply pressure to each other so that detachable anchor 460 and exposed end 434 remain in contact without separating. Elongate member 464 is coupled to detachable anchor 460. Detachable anchor 460 and elongate member 464 are configured to move laterally (e.g., in the y-axis direction) in response to movement of wear pin indicator 430. For example, when a distance between brake carrier 440 and pressure plate 450 increases, the remaining wear length 432 decreases as the exposed end 434 and the detachable anchor 460 move closer to brake carrier 440. Elongate member 464 may move closer to brake carrier 440 as exposed end 434 moves closer to brake carrier 440, causing elongate member 464 to compress spring 462, and causing magnet 420 to move closer to brake carrier 440 and second end 470.

Detachable anchor 460 is depicted as a pointer tip or a triangle in FIG. 4, but detachable anchor 460 may include any material suitable for attaching an end of spring 462 to wear pin indicator 430. The attachments between elements shown in FIG. 4 may include mounting, gluing, taping, soldering, and/or any other attaching technique.

Spring 462 is configured to expand or compress in response to movement of wear pin indicator 430. A first end of spring 462 is coupled to elongate member 464 and configured to move laterally along the y-axis in response to movement of wear pin indicator 430. A second end of spring 462 is coupled to brake carrier 440 and does not move in response to movement of wear pin indicator 430. Over time, as a distance between exposed end 434 and brake carrier 440 decreases, spring 462 may compress as the first end of spring 462 moves towards brake carrier 440 and the second end does not move. Therefore, spring 462 is configured to hold elongate member 464 in contact with exposed end 434. In some examples, elongate member 464 may be attached to exposed end 434 such that spring 462 is not necessary. Similarly, springs 462, 562, and 662 may not be necessary. Magnet 420 may be configured to move in response to the movement of wear pin indicator 430 and with elongate member 464.

As elongate member 464 compresses spring 462, elongate member 464 moves magnet 420 along the y-axis relative to sensor 402. Processing circuitry 410 may determine the estimated remaining use of the brake assembly based on output signal 406, which may indicate the position of magnet 420 relative to sensor 402. The estimated remaining use of the brake determined by processing circuitry 410, may, in some examples, be correlated with the remaining wear length 432.

Figure 5A:
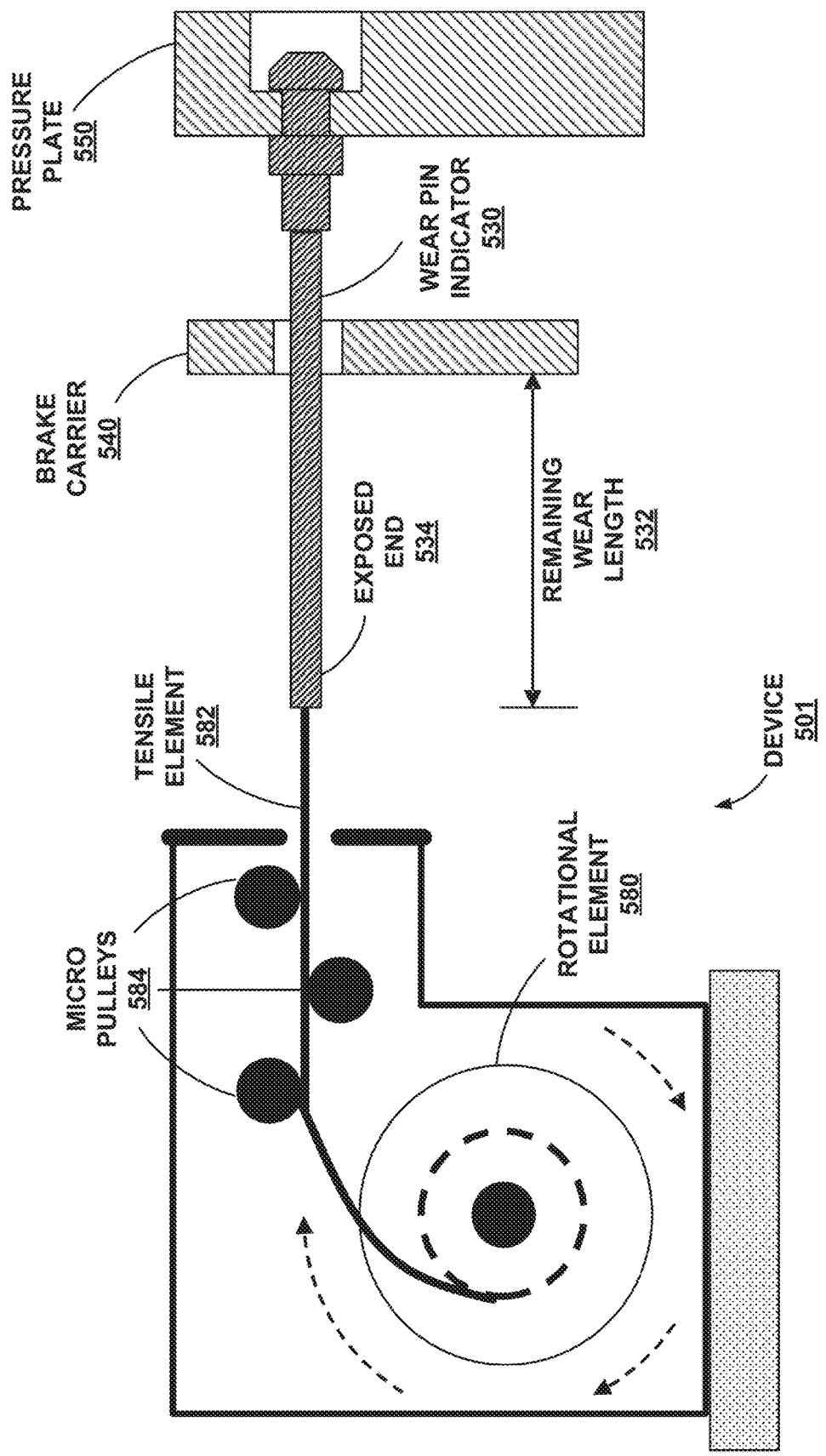
FIG. 5A is a diagram depicting a wear sensing device with rotational element for measuring the length of a wear pin indicator with a rotary magnetic sensor, in accordance with one or more techniques of this disclosure.

FIG. 5A is a diagram depicting a wear sensing device 501 with rotational element 580 for measuring the length 532 of a wear pin indicator 530 with a rotary magnetic sensor 502, in accordance with one or more techniques of this disclosure. Rotational element 580 is configured to rotate in response to lateral movement (e.g., in the y-axis direction) of wear pin indicator 530. As a result, lateral displacement of wear pin indicator 530 may result in angular displacement of rotational element 580. A first end of tensile element 582 may be coupled to exposed end 534 of wear pin indicator 530, and a second end of tensile element 582 may be wrapped around rotational element 580, causing rotational element 580 to rotate. When wear pin indicator 530 moves towards pressure plate 550, wear pin indicator 530 pulls tensile element 582, causing rotational element 580 to rotate. Micro pulleys 584 are optional elements that can cause tensile element 582 to stay in a specific path. Rotational element 580 may include a bobbin.

Figure 5B:
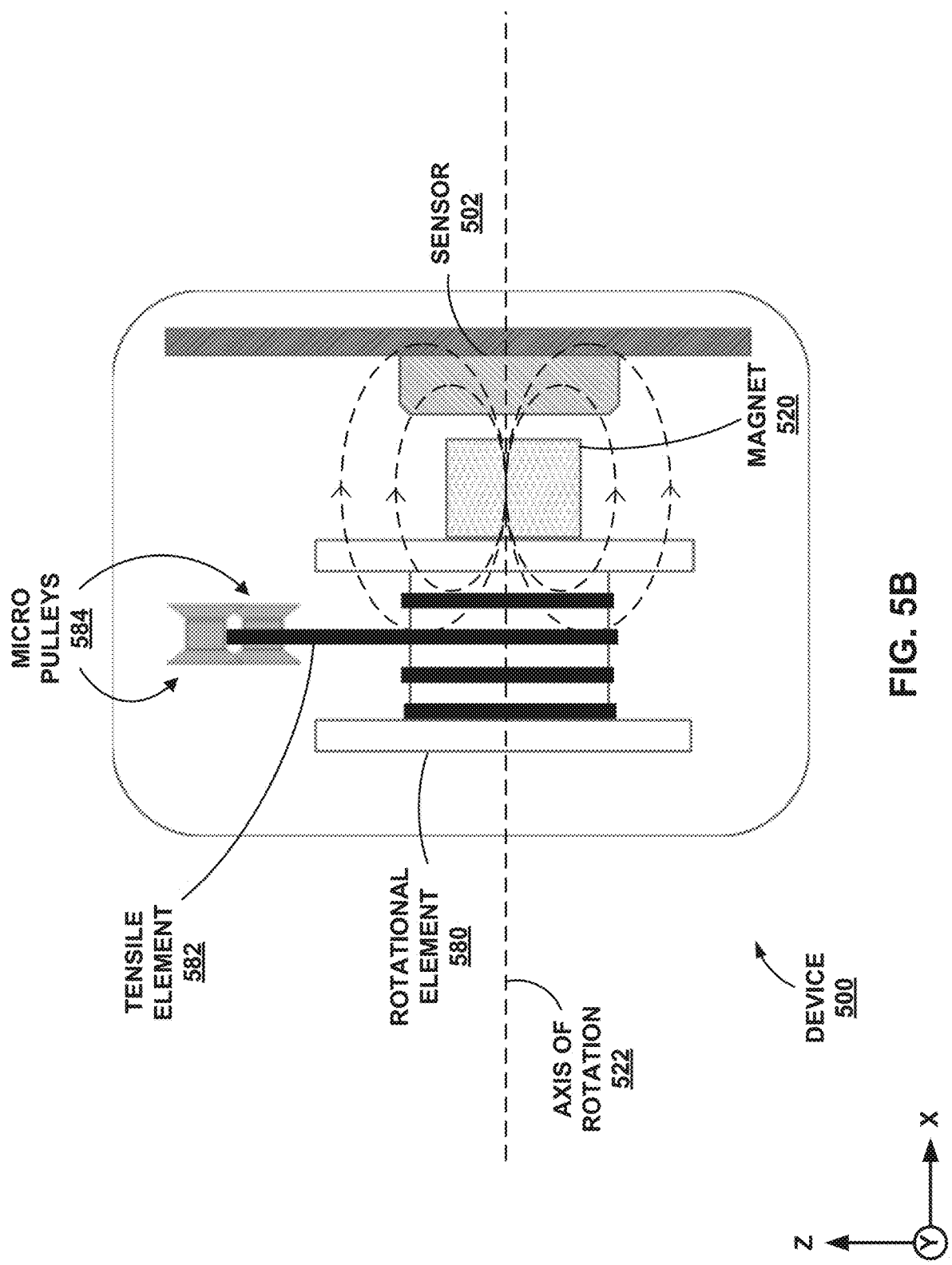
FIG. 5B is a diagram depicting a side view of wear sensing device, in accordance with one or more techniques of this disclosure.

FIG. 5B is a diagram depicting a side view of wear sensing device 501, in accordance with one or more techniques of this disclosure. Magnet 520 is attached to rotational element 580 and configured to rotate when rotational element 580 rotates. Thus, magnet 520 may be configured to rotate in response to movement of wear pin indicator 530 shown in FIG. 5A. Magnet 520 may be positioned along axis of rotation 522 of rotational element 580. Axis of rotation 522 extends in the x-axis rotation.

Sensor 502 is configured to generate an output signal based on the magnetic field produced by magnet 520, which can change based on the orientation of magnet 520. FIG. 5B shows magnetic field lines for the magnetic field produced by magnet 520. Sensor 502 may be configured to generate the output signal based on an angle of magnet 520 relative to sensor 502.

Figure 6A:
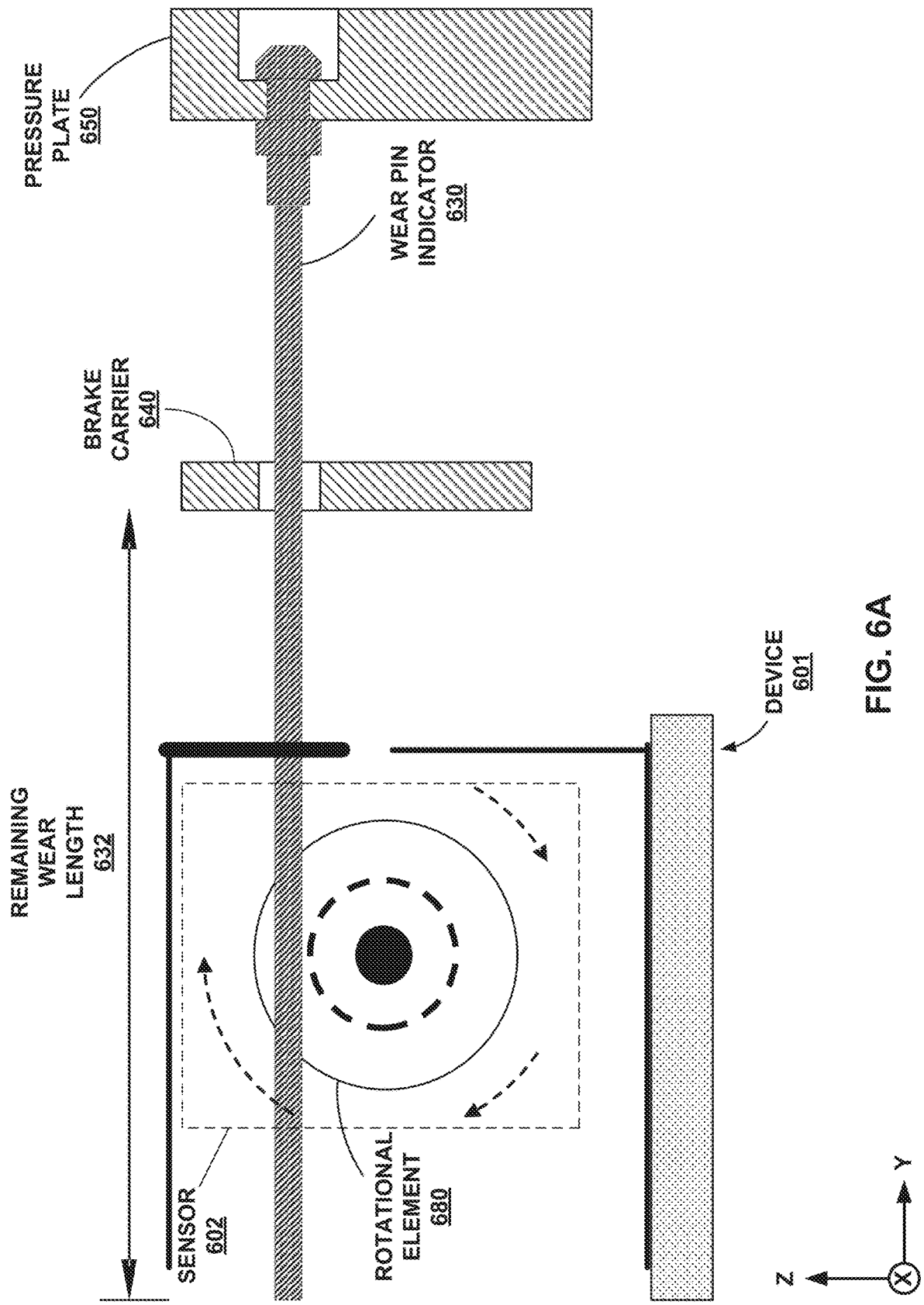
FIG. 6A is a conceptual diagram illustrating a y-axis view of a wear sensing device including a rotational sensor, in accordance with one or more techniques of this disclosure.

FIG. 6A is a conceptual diagram illustrating a y-axis view of a wear sensing device 601 including a rotational sensor, in accordance with one or more techniques of this disclosure. As seen in FIG. 6A, wear sensing device 601 includes a sensor 602 and a rotational element 680. Wear Pin indicator 630 may pass through an opening in brake carrier 640 such that a portion of wear pin indicator 630 extends beyond brake carrier 640. The portion of wear pin indicator 630 that extends beyond brake carrier 640 may be referred to as the remaining wear length 632. Wear pin indicator 630 may be fixed to pressure plate 650.

In some examples, brake carrier 640 and pressure plate 650 may grow farther apart as the brake assembly wears. When a distance between the brake carrier 640 and the pressure plate 650 increases, the remaining wear length 632 decreases. In some examples, device 601 may be configured to measure an amount of brake wear by determining the remaining wear length 632 and/or determining an amount that the remaining wear length 632 has changed. For example, the wear pin indicator 630 may engage with the rotational element 680 such that a lateral movement of wear pin indicator 630 relative to device 601 causes the rotational element 680 to rotate. In some examples, rotational element 680 may include a gear, comprising a first set of teeth, and wear pin indicator may include a second set of teeth configured to engage with the first set of teeth on the gear. This may cause the rotational element 680 to rotate when the wear pin indicator 630 moves laterally relative to device 601.

Sensor 602 may be configured to generate one or more signals indicative of one or more rotational parameters of rotational element 680. In some examples, rotational element 680 includes a magnet that rotates with rotational element 680, and sensor 602 may include a hall sensor or another kind of sensor configured to sense the position of a magnet. Sensor 602 may be configured to generate one or more signals indicative of the rotational position of the magnet as a function of time, the rotational velocity of the magnet as a function of time, the rotational acceleration of the magnet as a function of time, or any combination thereof. Based on the one or more signals generated by sensor 602, processing circuitry of device 601 may be configured to determine remaining wear length 632 and/or an estimated amount of wear to the brake assembly.

Figure 6B:
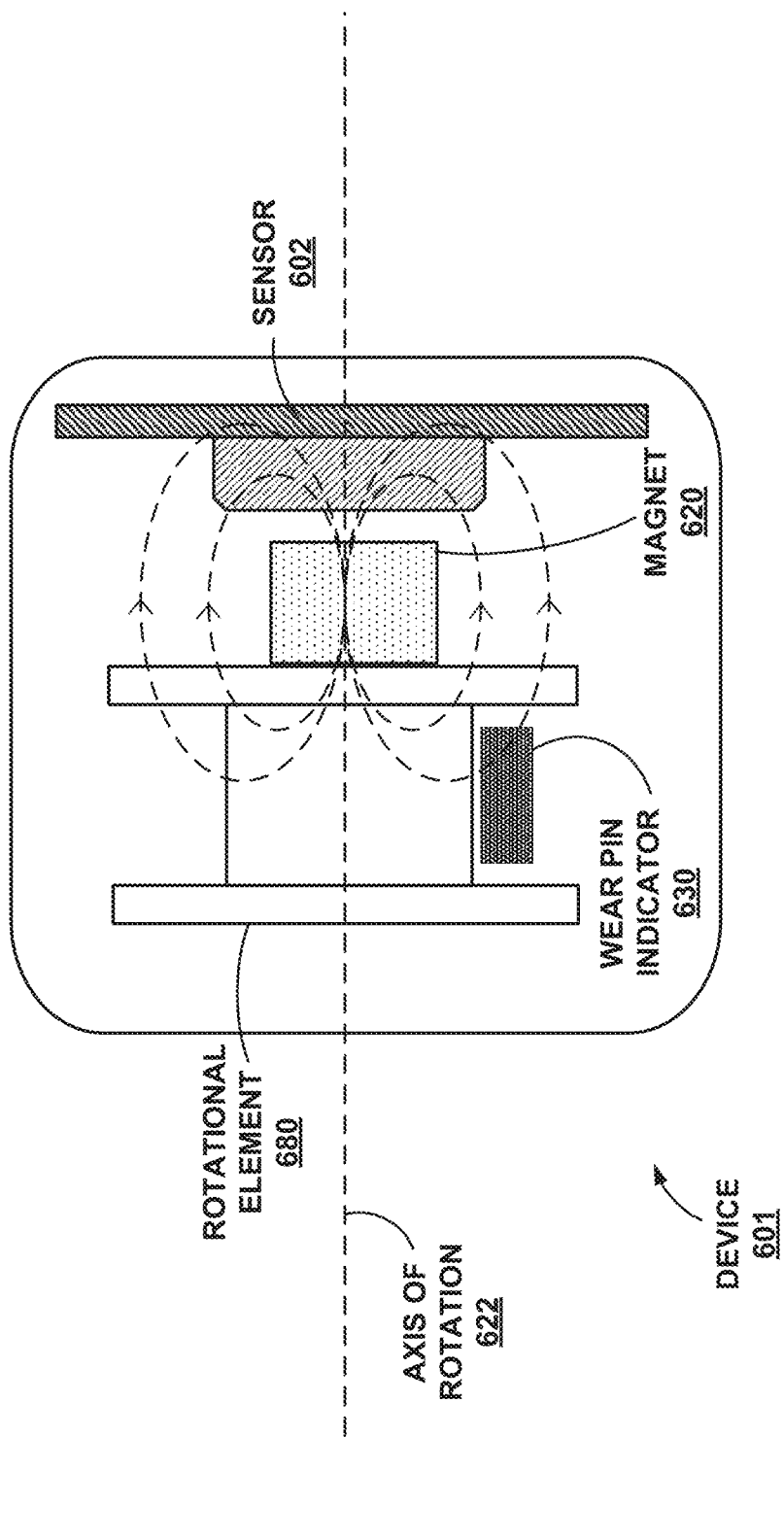
FIG. 6B is a conceptual diagram illustrating an x-axis view of a wear sensing device including a rotational sensor, in accordance with one or more techniques of this disclosure.

FIG. 6B is a conceptual diagram illustrating an x-axis view of a wear sensing device 601 including a rotational sensor, in accordance with one or more techniques of this disclosure. The wear sensing device 601 illustrated by FIG. 6B may be another view of the wear sensing device 601 illustrated by FIG. 6A. As seen in FIG. 6B, a magnet 620 is attached to rotational element 680. Wear pin indicator 630 may engage with rotational element 680 such that when wear pin indicator 630 moves laterally along the y-axis relative to device 601, rotational element 680 and magnet 620 rotate about axis of rotation 622. Magnet 620 and rotational element 680 may rotate about axis of rotation 622. As magnet 620 and rotational element 680 rotate about axis of rotation 622, sensor 602 remains fixed. Sensor 602 may one or more signals indicative of one or more rotational parameters of the magnet 620. For example, magnet 620 may create a magnetic field. Rotation of magnet 620 may cause sensor 602 to sense the magnetic field differently based on the rotation of the magnet 620. Sensor 602 may generate one or more signals indicative of the rotational position of the magnet as a function of time, the rotational velocity of the magnet as a function of time, the rotational acceleration of the magnet as a function of time, or any combination thereof. In some examples, sensor 602 may generate one or more signals indicative of a number of rotations of the magnet 620. The system may store the number of rotations and calculate a remaining wear length based on the number of rotations of magnet 620.

Figure 6C:
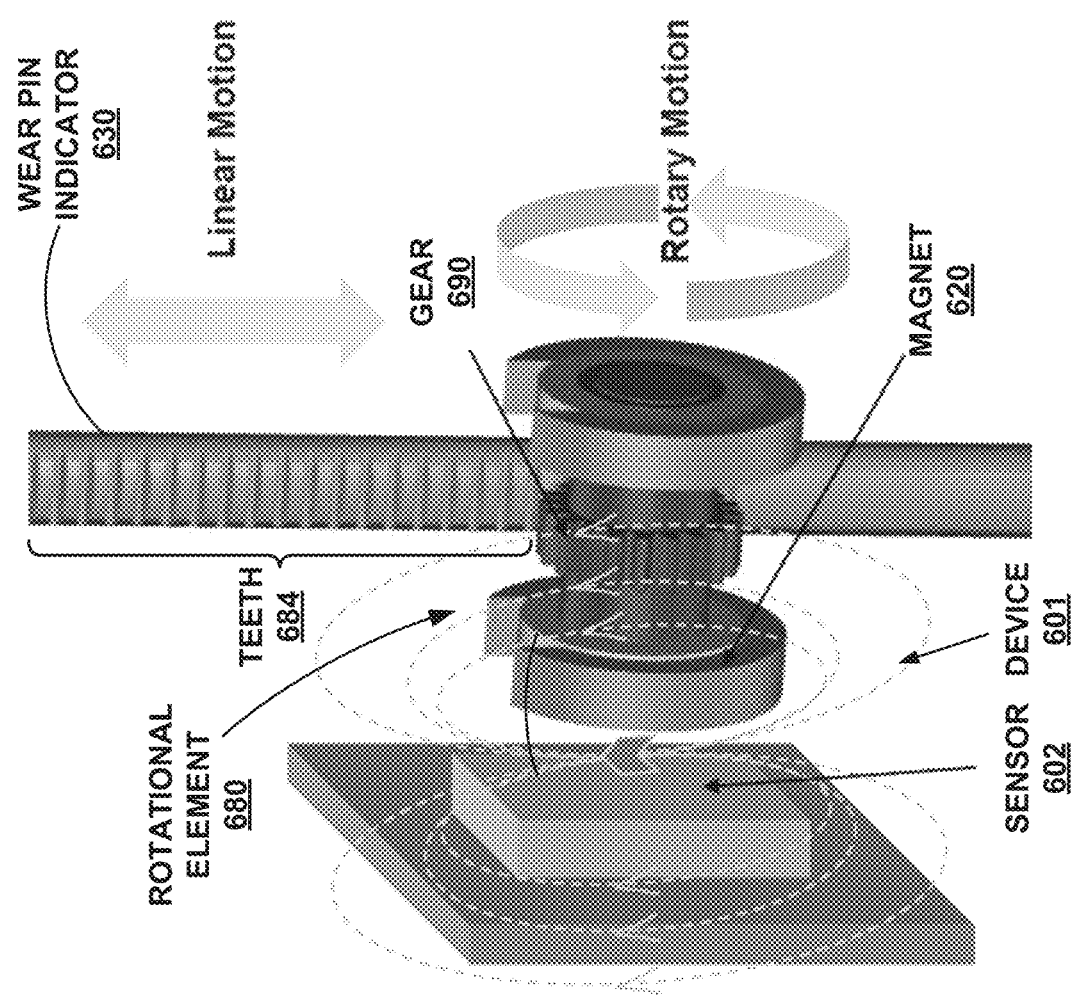
FIG. 6C is a conceptual diagram illustrating a perspective view of a wear sensing device including a rotational sensor, in accordance with one or more techniques of this disclosure.

FIG. 6C is a conceptual diagram illustrating a perspective view of a wear sensing device 601 including a rotational sensor, in accordance with one or more techniques of this disclosure. As seen in FIG. 6C, the wear sensing device 601 includes sensor 602 and rotational element 680. Wear pin indicator 630 may engage with rotational element 680. For example, wear pin indicator 630 includes a set of teeth 684, and rotational element 680 includes a gear 690 that comprises a set of teeth and a set of grooves. The set of teeth 684 on the wear pin indicator 630 may engage with the set of teeth on the gear 690 such that a lateral movement of wear pin indicator 630 causes rotational element 680 to rotate. For example, teeth 684 may fit within the set of grooves formed by the set of teeth on the gear 690. Sensor 602 may generate one or more signals indicative of one or more rotational parameters of magnet 620, which is centered on a rotational axis of rotational element 680.

Figure 6D:
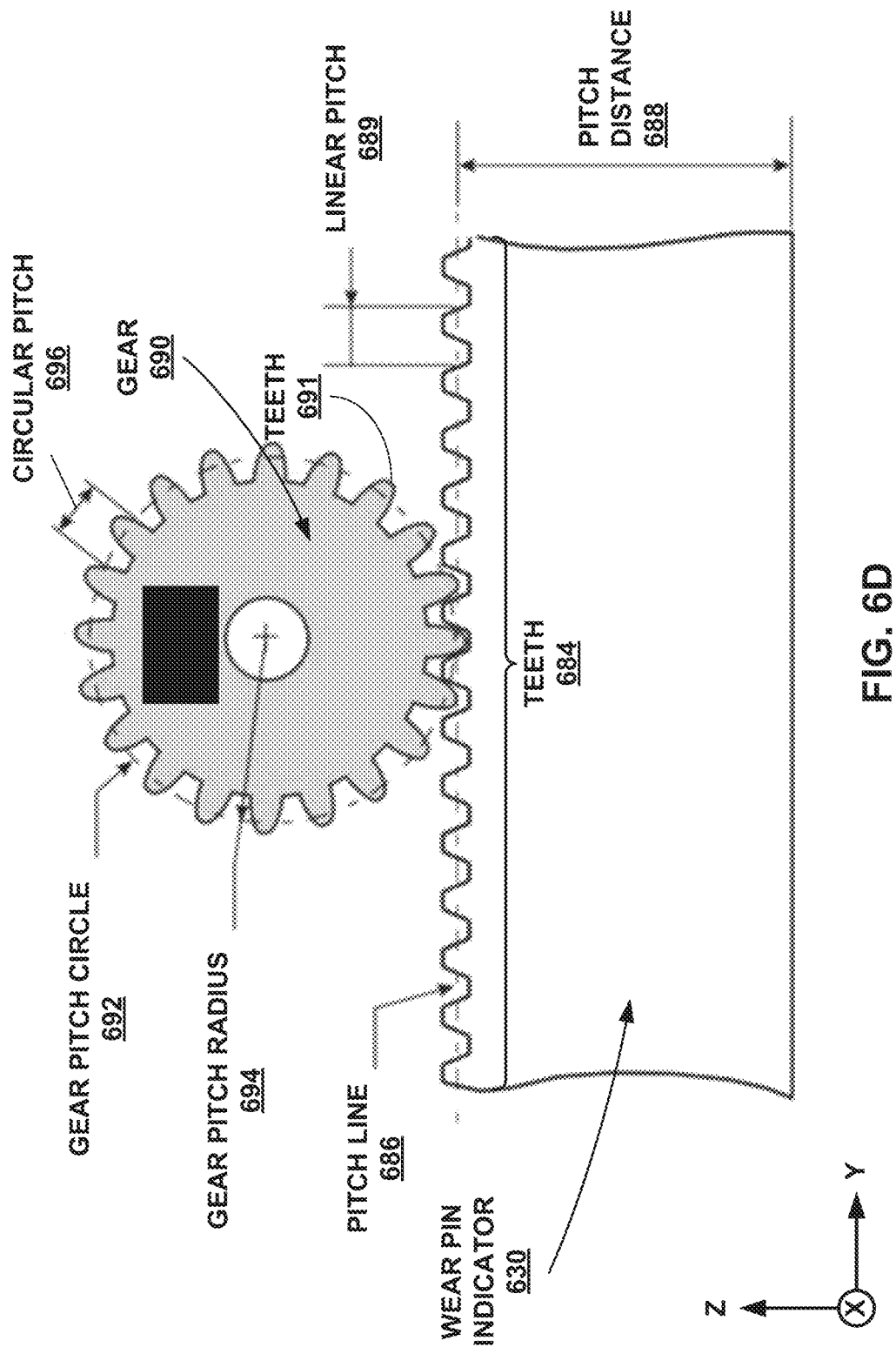
FIG. 6D is a conceptual diagram illustrating a y-axis view of the wear pin indicator engaging with the gear, in accordance with one or more techniques of this disclosure.

FIG. 6D is a conceptual diagram illustrating a y-axis view of the wear pin indicator 630 engaging with the gear 690, in accordance with one or more techniques of this disclosure. Wear pin indicator 630 includes teeth 684. Pitch line 686 extends along a center of the set of teeth 684. Pitch distance 688 represents a distance between pitch line 686 and another side of the wear pin indicator 630. Linear pitch 689 may represent a length of one cycle of teeth 684. Gear 690 includes a set of teeth 691. The set of teeth 691 on the gear 690 engage with the set of teeth 684 on the wear pin indicator 630 such that a lateral movement of wear pin indicator 630 causes gear 690 to rotate. Gear pitch circle 692 may extend around a center of the teeth 691. Gear pitch radius 694 may represent a distance between gear pitch circle 692 and a center of gear 690. Circular pitch 696 may represent a distance of one cycle of teeth 691.

Figure 7A:
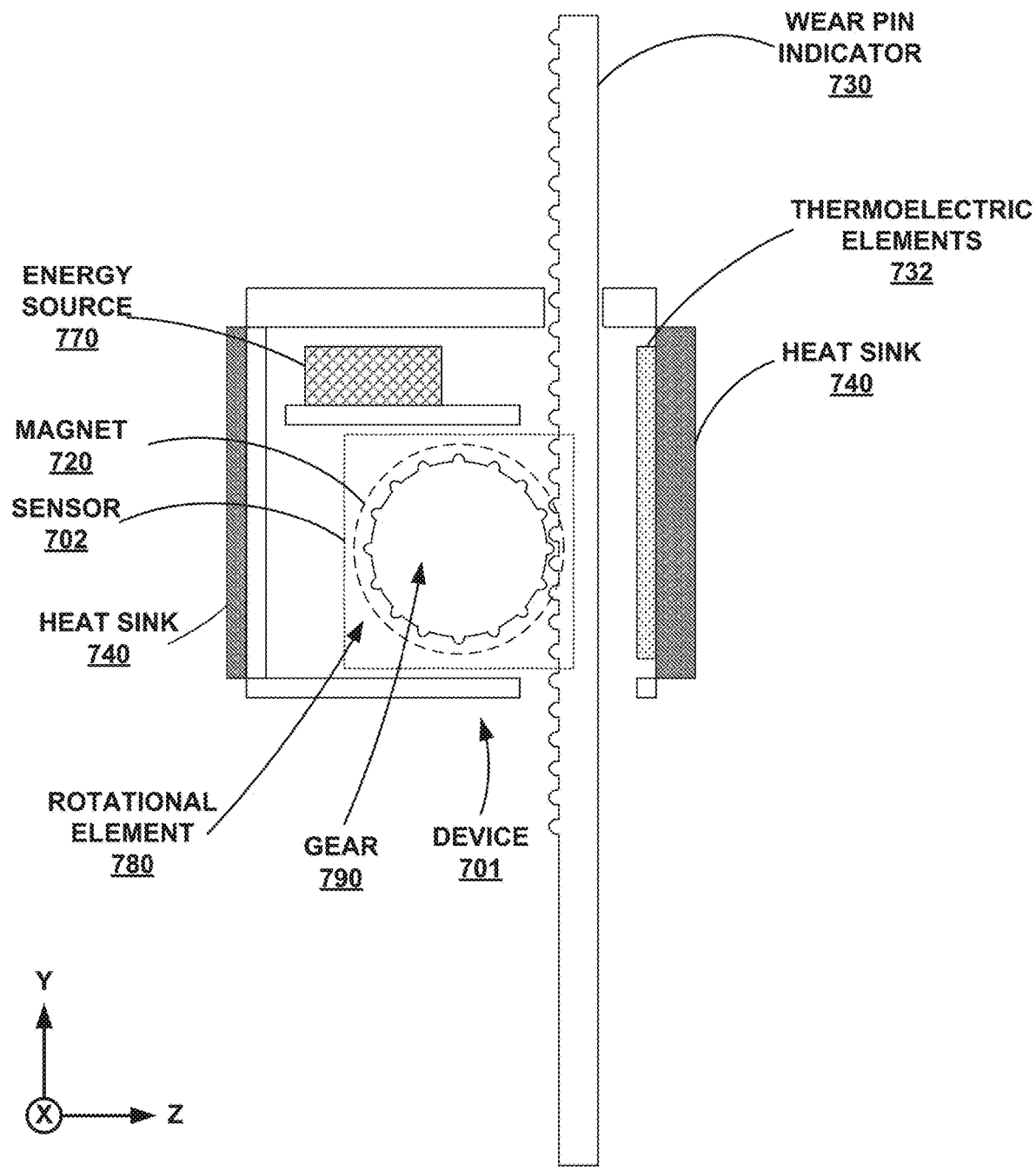
FIG. 7A is a conceptual diagram illustrating a first y-axis view of a wear sensing device including a rotational sensor and energy harvesting circuitry, in accordance with one or more techniques of this disclosure.

FIG. 7A is a conceptual diagram illustrating a first y-axis view of a wear sensing device 701 including a rotational sensor and energy harvesting circuitry, in accordance with one or more techniques of this disclosure. As seen in FIG. 7A, wear sensing device 701 includes sensor 702, thermoelectric elements 732, heat sink 740, energy source 770, and rotational element 780. Rotational element 780 includes magnet 720 and gear 790. Wear pin indicator 730 may engage with gear 790 such that a lateral movement of wear pin indicator 730 along the y-axis causes rotational element 780 to rotate.

In some examples, wear sensing device 701 may be fixed such that wear pin indicator 730 is configured to move laterally relative to device 701. In some examples, device 701 is fixed to a brake carrier, a pressure plate, one or more other components of a brake assembly, or any combination thereof. In any case, a movement of wear pin indicator 730 relative to device 701 may cause rotational element 780 to rotate. Sensor 702 may generate one or more signals indicative of one or more rotational parameters of rotational element 780. For example, magnet 720 may create a magnetic field, and sensor 702 may generate the one or more signals based on the magnetic field. Sensor 702 may be configured to generate the one or more signals to indicate the one or more rotational parameters based on the magnetic field created by the magnet 720.

Thermoelectric elements 732 may be configured to generate an electric signal based on a temperature gradient. In some examples, Thermoelectric elements 732 may be connected to heat sink 740. The temperature gradient may represent a difference in temperature between a hot node and a cold node. The cold node may, in some examples, be located at heat sink 740. In some examples, the hot node may be located on an inside of device 701. Heat may flow through the thermoelectric elements 732 from the hot node to the cold node. Thermoelectric elements 732 may generate an electrical signal. In some examples, a magnitude of the electrical signal may depend on a magnitude of the temperature gradient between the hot node and the cold node. In some examples, device 701 may generate at least a portion of the electrical signal to energy source 770. Energy source 770 may, in some examples, provide power to sensor 702. In some examples, device 701 may include one or more electromagnetic devices in addition to or alternatively to the thermoelectric elements 732. In some examples, device 701 may include one or more piezoelectric devices in addition to or alternatively to the thermoelectric elements 732.

Figure 7B:
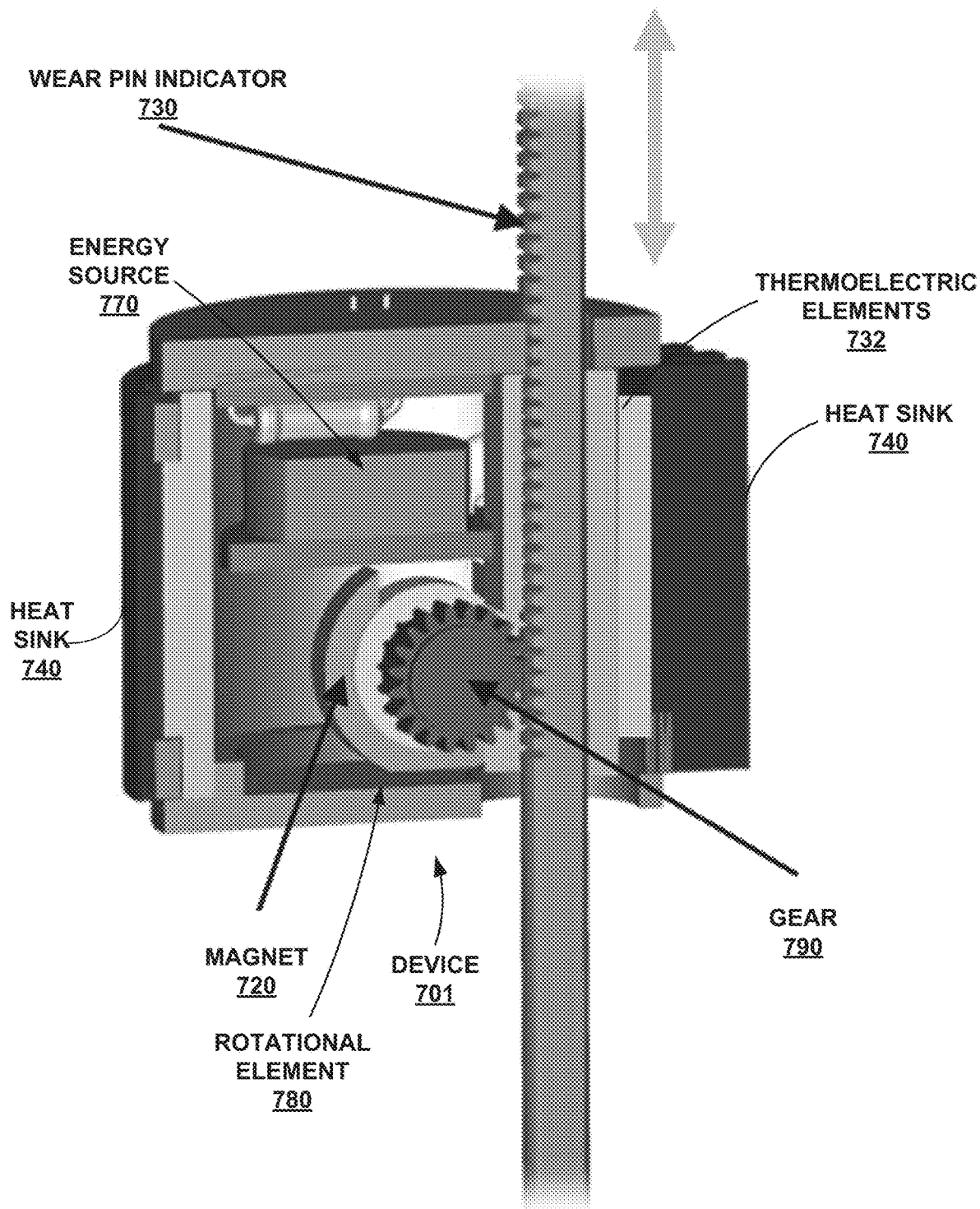
FIG. 7B is a conceptual diagram illustrating a first perspective view of a wear sensing device including a rotational sensor and energy harvesting circuitry, in accordance with one or more techniques of this disclosure.

FIG. 7B is a conceptual diagram illustrating a first perspective view of a wear sensing device 701 including a rotational sensor and energy harvesting circuitry, in accordance with one or more techniques of this disclosure. The wear sensing device 701 illustrated by FIG. 7B may be an example of the wear sensing device 701 illustrated by FIG. 7A. As seen in FIG. 7B, heat sink 740 extends around at least a portion of the outside of device 701. The rotational element 780 and the sensor 702 (not illustrated in FIG. 7B) are located within device 701. Thermoelectric elements 732 are located on an opposite side of wear pin indicator 730 from rotational element 780. Energy source 770 is located within device 701.

Figure 7C:
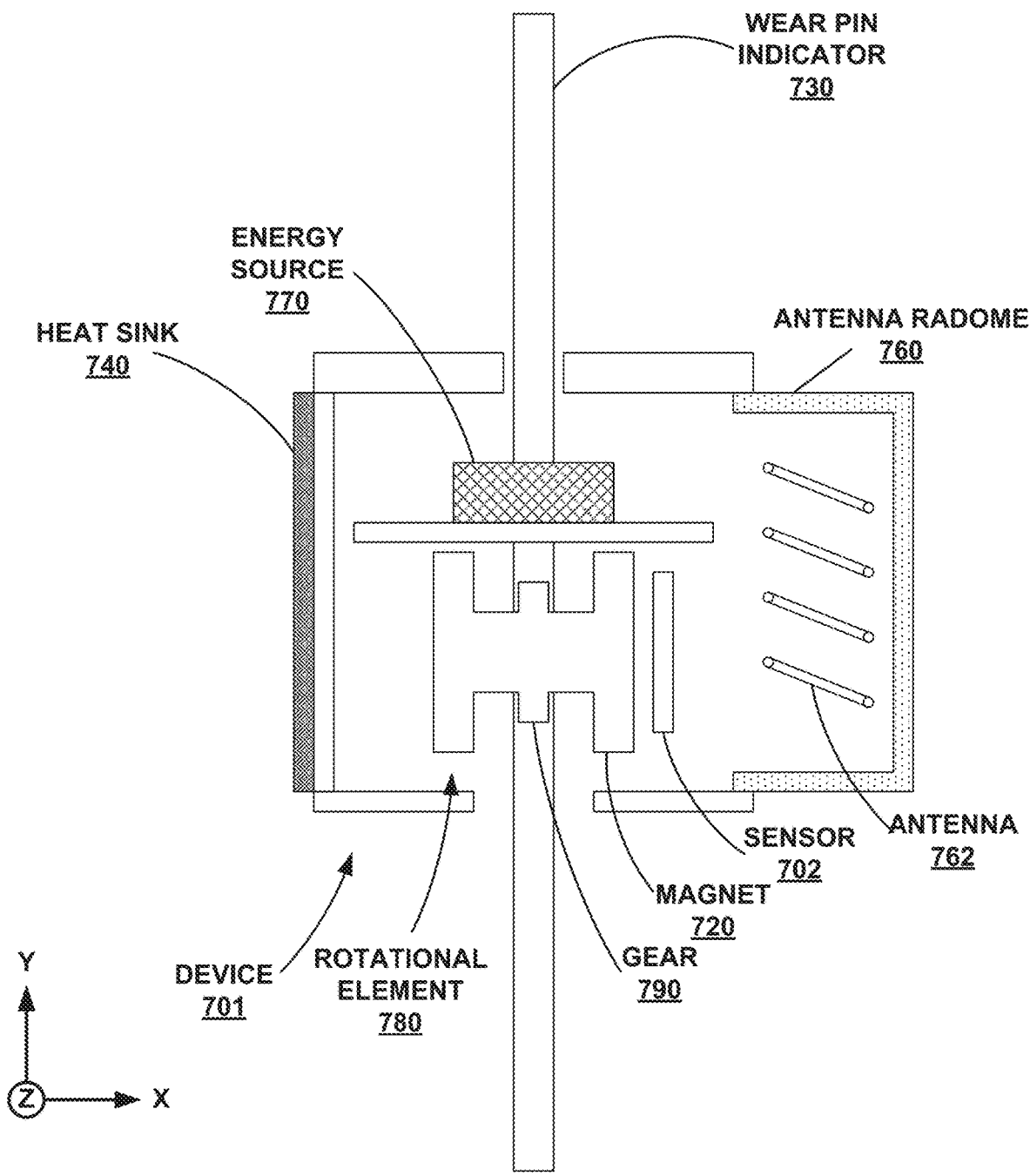
FIG. 7C is a conceptual diagram illustrating a second y-axis view of a wear sensing device including a rotational sensor and energy harvesting circuitry, in accordance with one or more techniques of this disclosure.

FIG. 7C is a conceptual diagram illustrating a second y-axis view of a wear sensing device 701 including a rotational sensor and energy harvesting circuitry, in accordance with one or more techniques of this disclosure. The second y-axis view of the device 701 illustrated by FIG. 7C is different than the first y-axis view of the device 701 illustrated by FIG. 7A in that the second view is rotated 90 degrees from the first view. As seen in FIG. 7C, device 701 includes sensor 702, heat sink 740, antenna radome 760, antenna 762, energy source 770, and rotational element 780. Rotational element 780 includes magnet 720 and gear 790.

A lateral movement of wear pin indicator 730 along the y-axis may cause rotational element 780 to rotate. Sensor 702 may remain fixed while rotational element 780 rotates, and sensor 702 may generate one or more signals indicative of one or more rotational parameters of rotational element 780. Processing circuitry of device 701 may be configured to determine a remaining wear length of wear pin indicator 730 based on the one or more signals generated by sensor 702. Device 702 may include communication circuitry configured to transmit and/or receive information via antenna 762 housed within antenna radome 760.

Figure 7D:
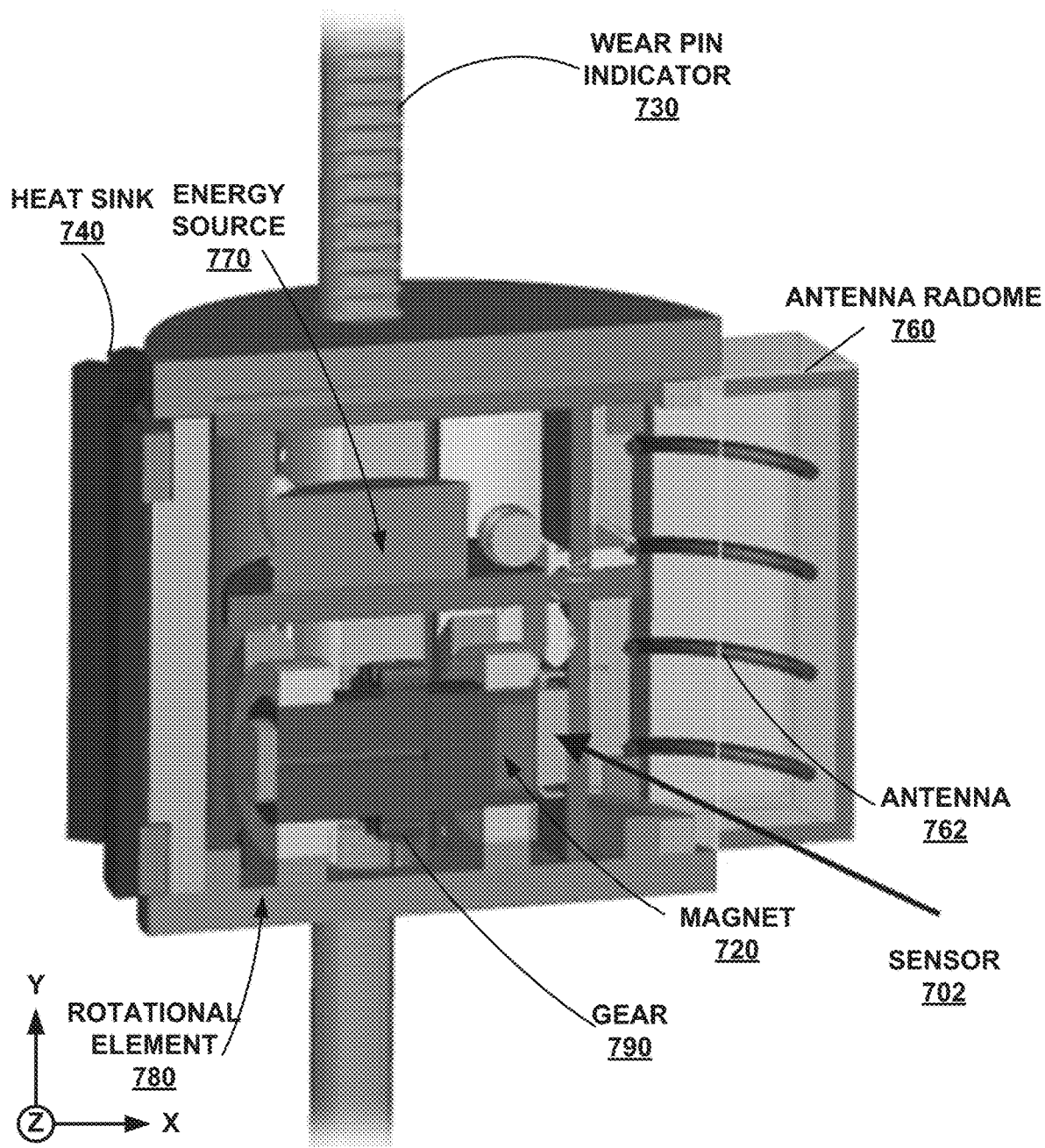
FIG. 7D is a conceptual diagram illustrating a second perspective view of a wear sensing device including a rotational sensor and energy harvesting circuitry, in accordance with one or more techniques of this disclosure.

FIG. 7D is a conceptual diagram illustrating a second perspective view of a wear sensing device 701 including a rotational sensor and energy harvesting circuitry, in accordance with one or more techniques of this disclosure. The wear sensing device 701 illustrated by FIG. 7D may be an example of the wear sensing device 701 illustrated by FIG. 7C. As seen in FIG. 7D, heat sink 740 extends around at least a portion of the outside of device 701. The rotational element 780 and the sensor 702 are located within device 701. Thermoelectric elements 732 are located on an opposite side of wear pin indicator 730 from rotational element 780. Energy source 770 is located within device 701. Antenna radome 760 forms a part of an outer wall of device 701, and antenna radome 760 houses antenna 762.

Figure 8:
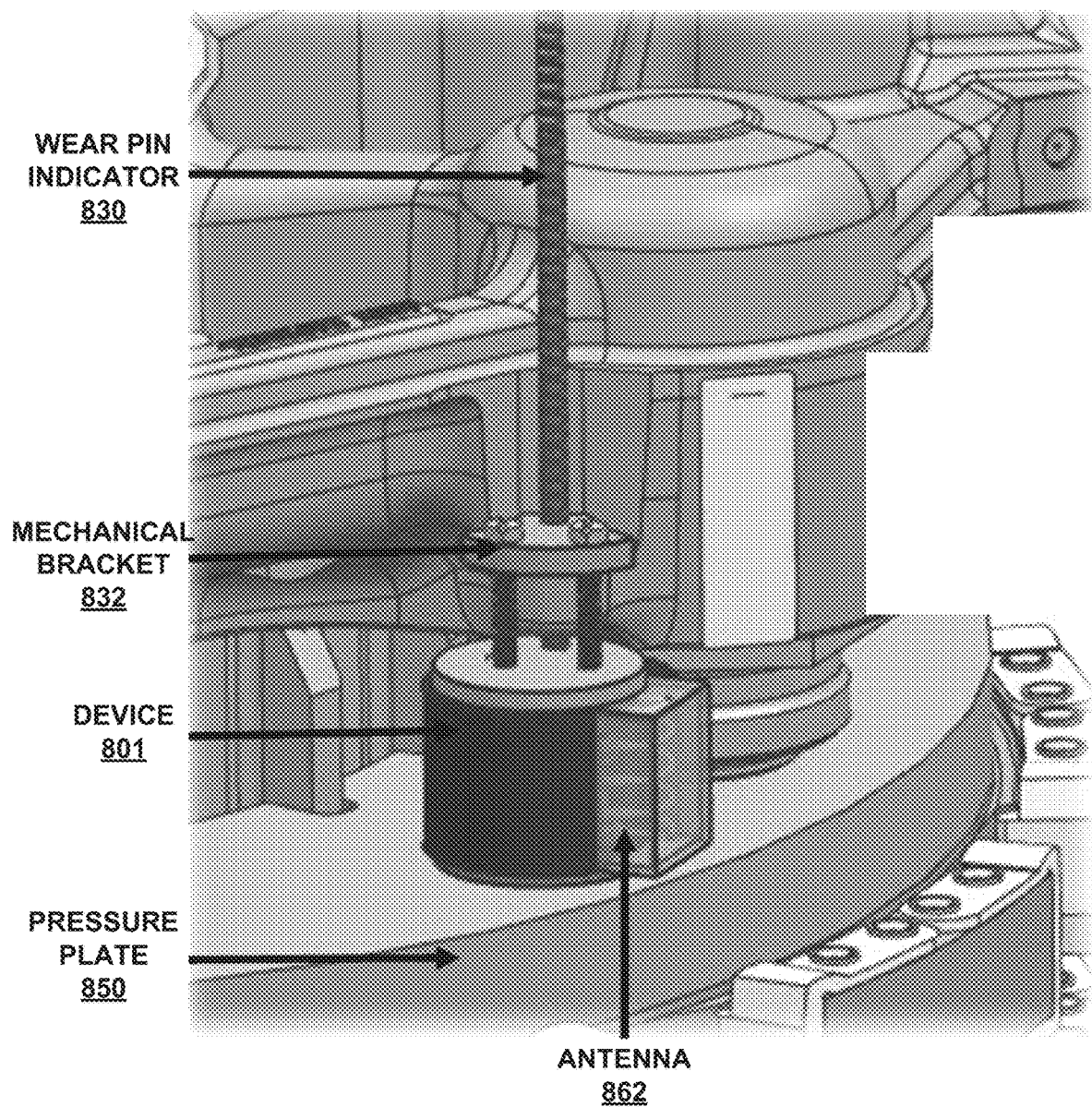
FIG. 8 is a perspective view of a wear sensing device fixed to a brake assembly of a vehicle, in accordance with one or more techniques of this disclosure.

FIG. 8 is a perspective view of a wear sensing device 801 fixed to a brake assembly of a vehicle, in accordance with one or more techniques of this disclosure. As seen in FIG. 8, device 801 is fixed to pressure plate 850. Device 801 may additionally or alternatively be fixed to a brake carrier of the brake assembly. In any case, the wear pin indicator 830 may pass through the device 801. Wear pin indicator 830 may move relative to device 801. Processing circuitry of device 801 may be configured to track a movement of wear pin indicator 830 in order to determine a remaining wear length of wear pin indicator 830. In some examples, a bottom surface of device 801 is fixed to a surface of pressure plate 850. Additionally, mechanical bracket 832 may fix the device 801 to one or more other components of the brake assembly.

Figure 9:
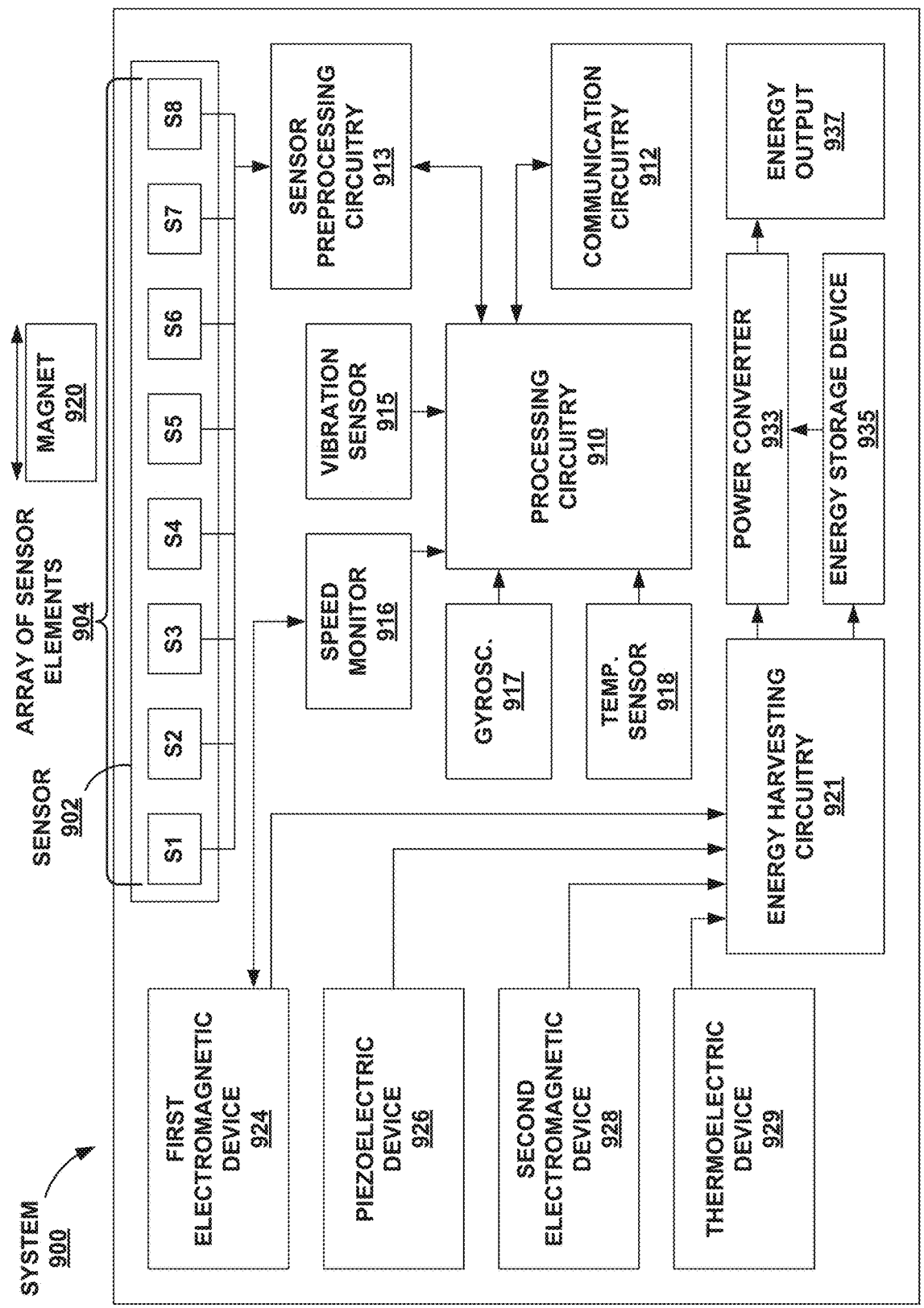
FIG. 9 is a block diagram illustrating a system for determining a linear position of a magnet and harvesting energy, accordance with one or more techniques of this disclosure.

FIG. 9 is a block diagram illustrating a system 900 for determining a linear position of a magnet and harvesting energy, accordance with one or more techniques of this disclosure. As seen in FIG. 9, system 900 includes sensor 902, processing circuitry 910, communication circuitry 912, sensor preprocessing circuitry 913, vibration sensor 915, speed monitor 916, gyroscope 917, temperature sensor 918, magnet 920, energy harvesting circuitry 921, first electromagnetic device 924, piezoelectric device 926, second electromagnetic device 928, thermoelectric device 929, power converter 933, energy storage device 935, and energy output 937. System 900 may be an example of one or more wear sensing devices described herein that use a linear sensor. In some examples, system 900 is an example of the wear sensing device 101 of FIG. 1. In some examples, system 900 may include an accelerometer configured to generate an accelerometer signal.

Sensor 902 includes an array of sensor elements 904. The array of sensor elements 904 may be arranged in a line. Each sensor element of the array of sensor elements 904 may be configured to generate a sensor element signal that indicates a proximity of magnet 920 to the respective sensor element and/or an angle of magnet 920 relative to the respective sensor element. For example, as seen in FIG. 9, the sensor element signal generated by sensor element S5 may indicate a first magnitude and the sensor element signal generated by sensor element S1 may indicate a second magnitude. Since magnet 920 is closer to sensor element S5 than sensor element S1, the first magnitude may be greater than the second magnitude. Magnet 920 may, in some examples move in response to a movement of a wear pin indicator. Consequently, a movement of magnet 920 may indicate a remaining wear length of the wear pin indicator.

Communication circuitry 912 may be configured to communicate with one or more other devices. In some examples, communication circuitry 912 may be configured to send information and/or receive information via an antenna (not illustrated in FIG. 9). Communication circuitry 912 may, in some examples, transmit information indicating a remaining wear length of the wear pin indicator. This information may indicate whether or not it is time to replace the brake assembly.

Sensor preprocessing circuitry 913 may receive a sensor element signal from each of sensor elements 904. Sensor preprocessing circuitry 913 may perform one or more preprocessing actions (e.g., filtering) and deliver one or more signals to processing circuitry 910. Processing circuitry 910 may be configured to determine a remaining wear length of the wear pin indicator based on the one or more signals received from sensor preprocessing circuitry 913.

Vibration sensor 915 may, in some examples, be configured to generate a vibration signal indicating a level of vibration of system 900 and/or a level of vibration of one or more components of the brake assembly. Vibration sensor 915 may send the vibration signal to processing circuitry

910. Speed monitor 916 may be configured to generate a speed signal indicating a speed of the vehicle on which system 900 is located. In some examples, speed monitor 916 may generate the speed signal based on one or more signals received from first electromagnetic device 924. Gyroscope 917 may generate a gyroscope signal that indicates a special orientation of one or more components of system 900. Gyroscope 917 may send the gyroscope signal to processing circuitry 910. Temperature sensor 918 may generate a temperature signal that indicates a temperature of one or more components of system 900 and/or a temperature of the environment at or proximate to system 900. Temperature sensor 918 may send the temperature signal to processing circuitry 910.

Energy harvesting circuitry 921 may be configured to harvest energy for powering one or more components of system 900. In some examples, energy harvesting circuitry 921 may harvest energy based on the operation of a brake assembly. For example, first electromagnetic device 924, piezoelectric device 926, second electromagnetic device 928, and thermoelectric device 929 may each generate energy based on one or more aspects of the operation of the brake assembly, and send the generated energy to energy harvesting circuitry 921. Energy harvesting circuitry 921 may send energy to one or both of power converter 933 and energy storage device 935. Power converter 933 may send energy to energy output 937. In some examples, energy output 937 may include one or more components of system 900 including sensor 902, processing circuitry 910, communication circuitry 912, sensor preprocessing circuitry 913, vibration sensor 915, speed monitor 916, gyroscope 917, temperature sensor 918, or any combination thereof. Consequently, energy harvesting circuitry 921 may supply energy to one or more components of system 900, the energy being derived from the operation of the brake assembly.

Figure 10:
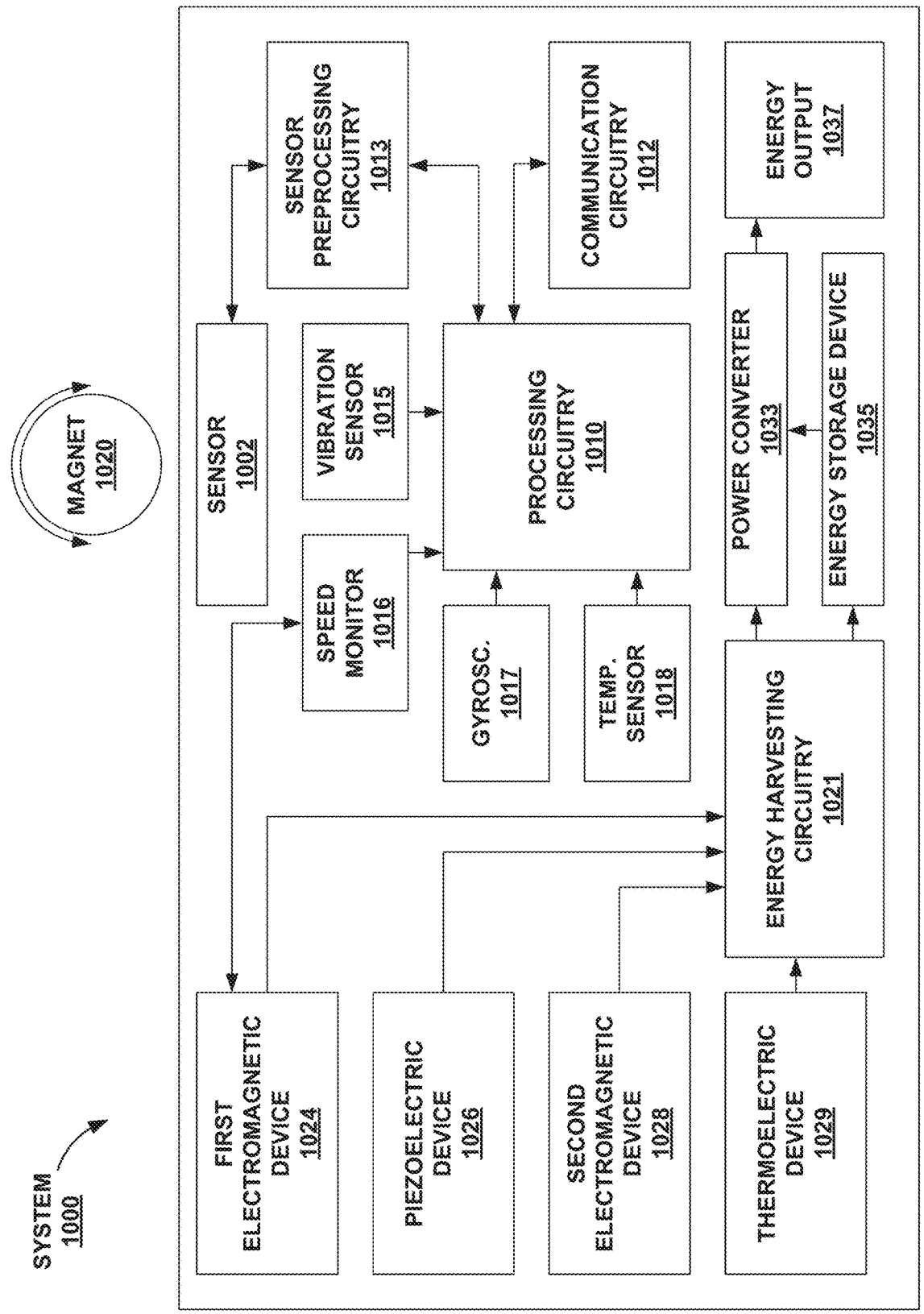
FIG. 10 is a block diagram illustrating a system for determining a rotational position of a magnet and harvesting energy, in accordance with one or more techniques of this disclosure.

FIG. 10 is a block diagram illustrating a system 1000 for determining a rotational position of a magnet and harvesting energy, in accordance with one or more techniques of this disclosure. As seen in FIG. 10, system 1000 includes sensor 1002, processing circuitry 1010, communication circuitry 1012, sensor preprocessing circuitry 1013, vibration sensor 1015, speed monitor 1016, gyroscope 1017, temperature sensor 1018, magnet 1020, energy harvesting circuitry 1021, first electromagnetic device 1024, piezoelectric device 1026, second electromagnetic device 1028, thermoelectric device 1029, power converter 1033, energy storage device 1035, and energy output 1037. System 1000 may be an example of one or more wear sensing devices described herein that use a linear sensor. In some examples, system 1000 is an example of the wear sensing device 101 of FIG. 1. System 1000 may be substantially the same of system 900 of FIG. 9, except that magnet 1020 is a rotational magnet and sensor 1002 senses one or more rotational parameters of magnet 1020, whereas sensor 902 senses one or more parameters corresponding to a linear position of magnet 920. In some examples, system 1000 may include an accelerometer configured to generate an accelerometer signal.

Figure 11A:
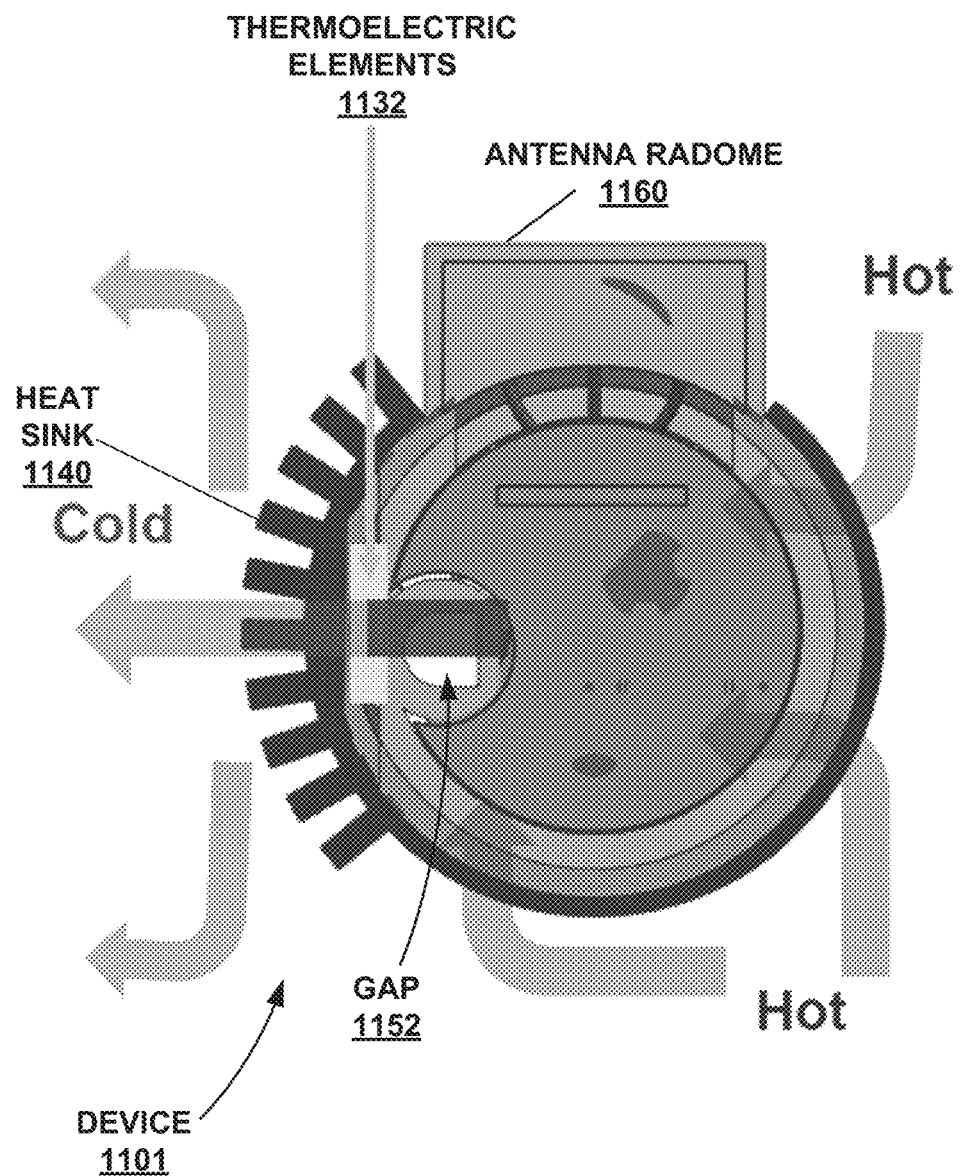
FIG. 11A is a conceptual diagram illustrating heat flow through a cross-section of a wear sensing device, in accordance with one or more techniques of this disclosure.
Figure 11A:
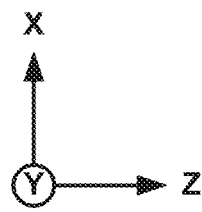

FIG. 11A is a conceptual diagram illustrating heat flow through a cross-section of a wear sensing device 1101, in accordance with one or more techniques of this disclosure. As seen in FIG. 11A, device 1101 includes thermoelectric elements 1132, heat sink 1140, and antenna radome 1160. Device 1101 forms gap 1152. In some examples, a wear pin indicator may pass through gap 1152 and engage with one or more components of the device 1101. In some examples, heat flows through the device 1101 to heat sink 1140. As seen in FIG. 11A, heat sink 1140 includes an array of fins that extend radially outwards from device 1101. These fins may disperse heat that travels through the device 1101. Thermoelectric elements 1132 may be located within device 1101 such that heat flows through thermoelectric elements 1132 to heat sink 1140. Thermoelectric elements 1132 may generate an electrical signal based on a temperature gradient between a hot node and a cold node located at heat sink 1140. In some examples, heat may enter the device 1101 from one or more components of a brake assembly. The brake assembly may generate heat during use, and transfer some of the heat to device 1101. The heat may travel through the device 1101 to heat sink 1140 through thermoelectric elements 1132.

Figure 11B:
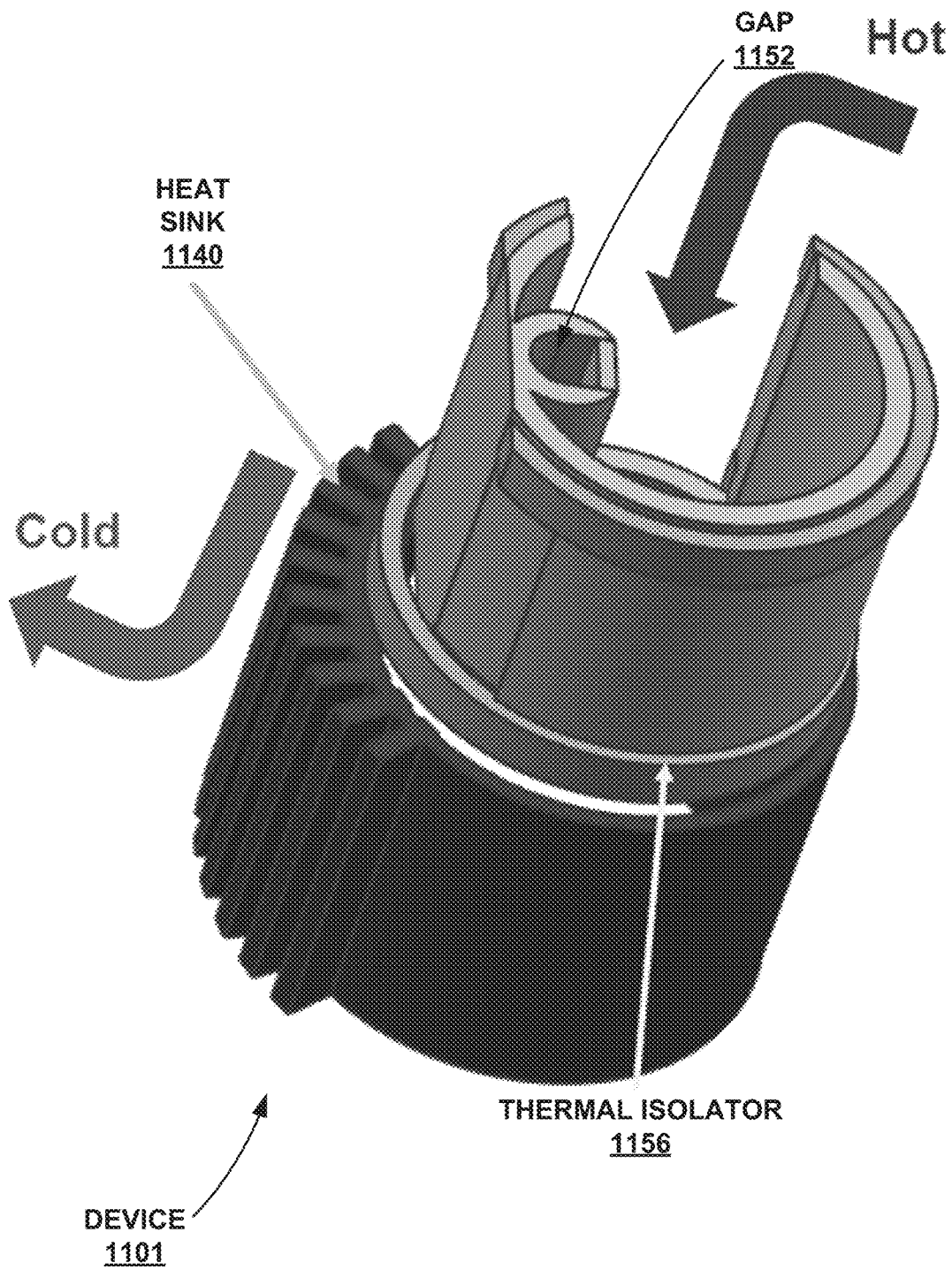
FIG. 11B is a conceptual diagram illustrating a perspective view of a wear sensing device, in accordance with one or more techniques of this disclosure.

FIG. 11B is a conceptual diagram illustrating a perspective view of a wear sensing device 1101, in accordance with one or more techniques of this disclosure. Although FIG. 11B shows an inner housing of device 1101 as being displaced from heat sink 1140, the inner housing may fit within the heat sink 1140 such that the heat sink 1140 at least partially encloses the inner housing. As seen in FIG. 11B, heat may flow into the device 1101 along an axis that is parallel with a wear pin indicator that fits within gap 1150. The heat may travel through device 1101 and disperse via the fins of heat sink 1140.

Figure 11C:
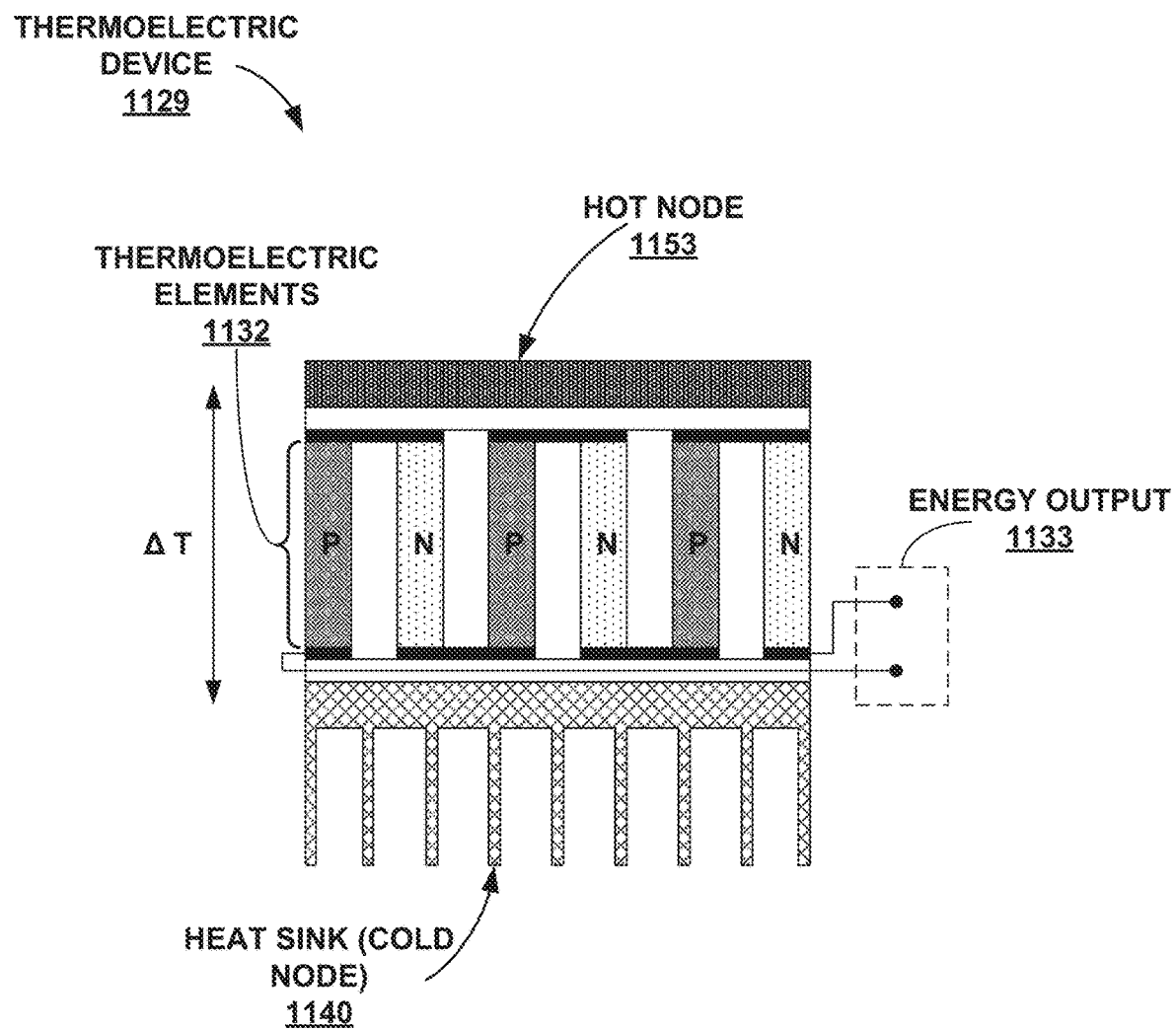
FIG. 11C is a conceptual diagram illustrating a thermoelectric device, in accordance with one or more techniques of this disclosure.

FIG. 11C is a conceptual diagram illustrating a thermoelectric device 1129, in accordance with one or more techniques of this disclosure. Thermoelectric device 1129 includes a set of thermoelectric elements 1132 including positive (P) thermoelectric elements and negative (N) thermoelectric elements. Thermoelectric elements 1132 generate an electrical signal for delivery to energy output 1133. Heat may flow from hot node 1153 to cold node 1140 through the thermoelectric elements 1132. In some examples, a magnitude of the electrical signal delivered to energy output 1133 may depend on a temperature gradient ΔT between the hot node 1153 and the cold node 1140. For example, an increase in the magnitude of the temperature gradient may cause the magnitude of the electrical signal to increase, and a decrease in the magnitude of the temperature gradient may cause the magnitude of the electrical signal to decrease.

Figure 12A:
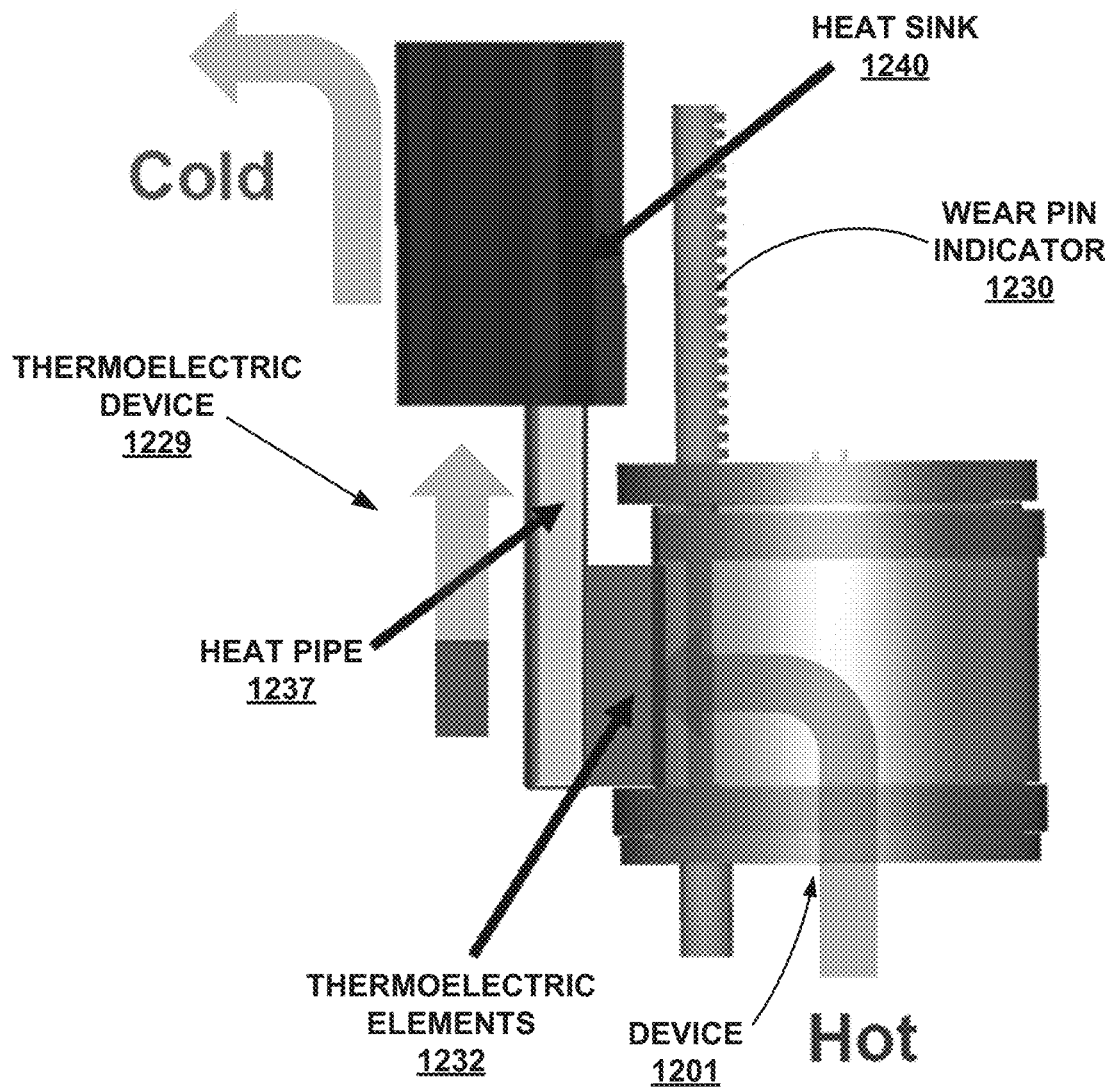
FIG. 12A is a conceptual diagram illustrating a side view of a wear sensing device including a thermoelectric device for harvesting energy, in accordance with one or more techniques of this disclosure.

FIG. 12A is a conceptual diagram illustrating a side view of a wear sensing device 1201 including a thermoelectric device for harvesting energy, in accordance with one or more techniques of this disclosure. Wear pin indicator 1230 is configured to fit through a gap in device 1201, and wear pin indicator 1230 is configured to interact with one or more components of device 1201. In some examples, device 1201 may be configured to sense a remaining wear length of the wear pin indicator 1230. Thermoelectric device 1229 may be configured to generate electrical energy based on heat emitted by a brake assembly that device 1201 is attached to. For example, heat may flow into device 1201 from the brake assembly. The heat may travel through the device to heat sink 1240. As seen in FIG. 12A, a heat pipe 1237 may connect thermoelectric elements 1232 and heat sink 1240 such that heat sink 1240 is laterally displaced from the rest of device 1201. Laterally displacing heat sink 1240 may increase a temperature gradient as compared with devices where the heat sink is not laterally displaced. In some examples, heat pipe 1237 comprises a phase change material (PCM) heat pipe.

Figure 12B:
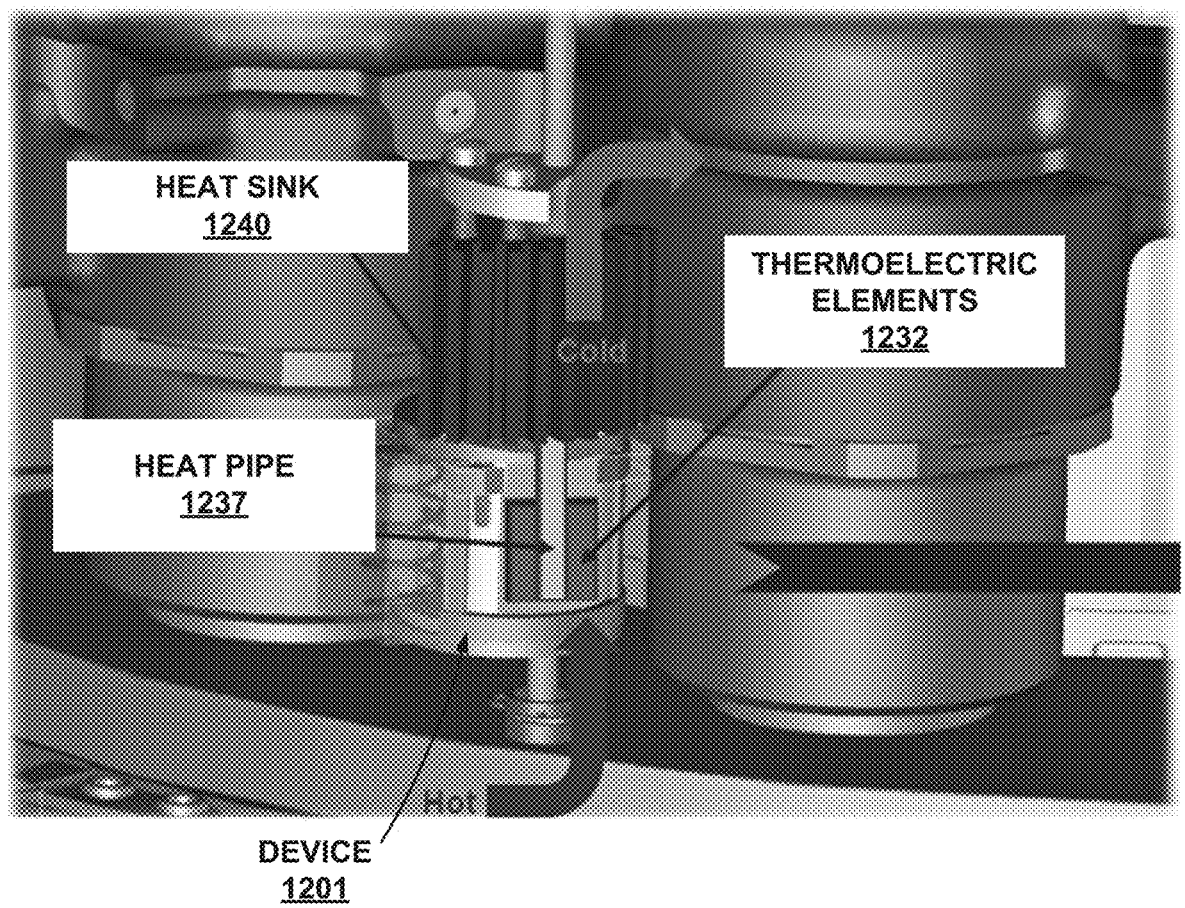
FIG. 12B is a conceptual diagram illustrating a perspective view of a wear sensing device including a thermoelectric device for harvesting energy, in accordance with one or more techniques of this disclosure.

FIG. 12B is a conceptual diagram illustrating a perspective view of a wear sensing device 1201 including a thermoelectric device for harvesting energy, in accordance with one or more techniques of this disclosure. As seen in FIG. 12B, device 1201 may be fixed to one or more components of a brake assembly such that wear pin indicator 1230 passes through device 1201. FIG. 12B also illustrates heat travelling into device 1201 from the brake assembly and dispersing via heat sink 1240. The heat may travel through heat pipe 1237 to the heat sink 1240.

Figure 12C:
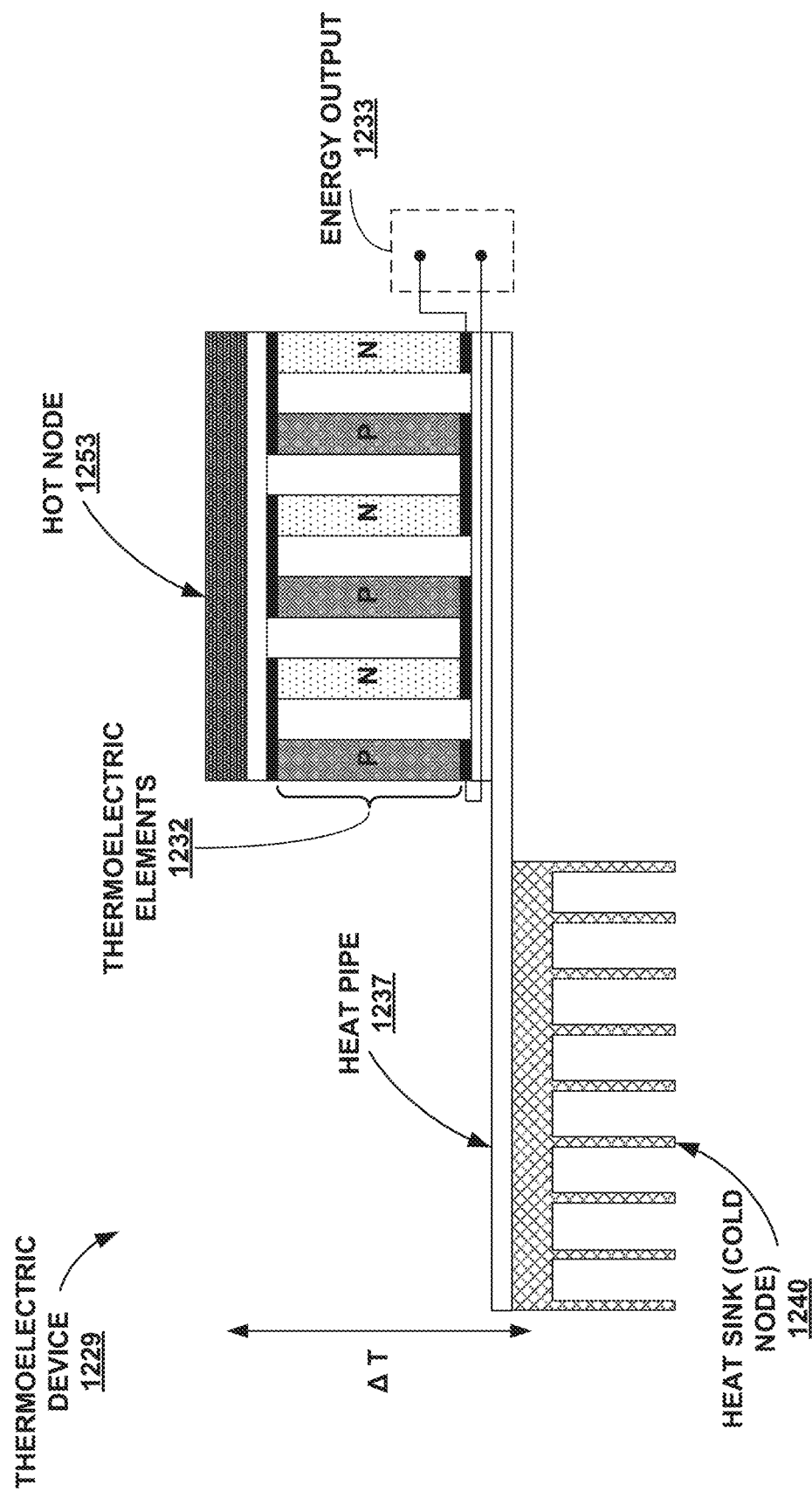
FIG. 12C is a conceptual diagram illustrating a thermoelectric device including a heat pipe, in accordance with one or more techniques of this disclosure.

FIG. 12C is a conceptual diagram illustrating a thermoelectric device 1229 including a heat pipe 1237, in accordance with one or more techniques of this disclosure. The thermoelectric device 1229 includes thermoelectric elements 1232, energy output 1233, heat pipe 1237, heat sink 1240, and hot node 1253. Heat sink 1240 may be referred to herein as a "cold node." Heat may travel from hot node 1253 to cold node 1240 through thermoelectric elements 1232 and heat pipe 1237. Thermoelectric elements 1232 may generate electrical energy for output to energy output 1233 based on a temperature gradient $\Delta T$ between the hot node 1253 and the cold node 1240. In some examples, the heat pipe 1237 technology and proposed arrangement enhances an efficiency and a magnitude of energy harvesting as compared with systems that do not use a heat pipe 1237. For example, the heat generated from the source is pumped to the heat sink 1240 through thermoelectric elements 1232, generating a larger thermal gradient between hot node 1253 and cold node 1240 as compared with systems that do not use a heat pipe 1237, thereby increasing a magnitude of the electrical signal generated by thermoelectrical elements 1232 as compared with systems that do not use a heat pipe 1237.

Figure 12D:
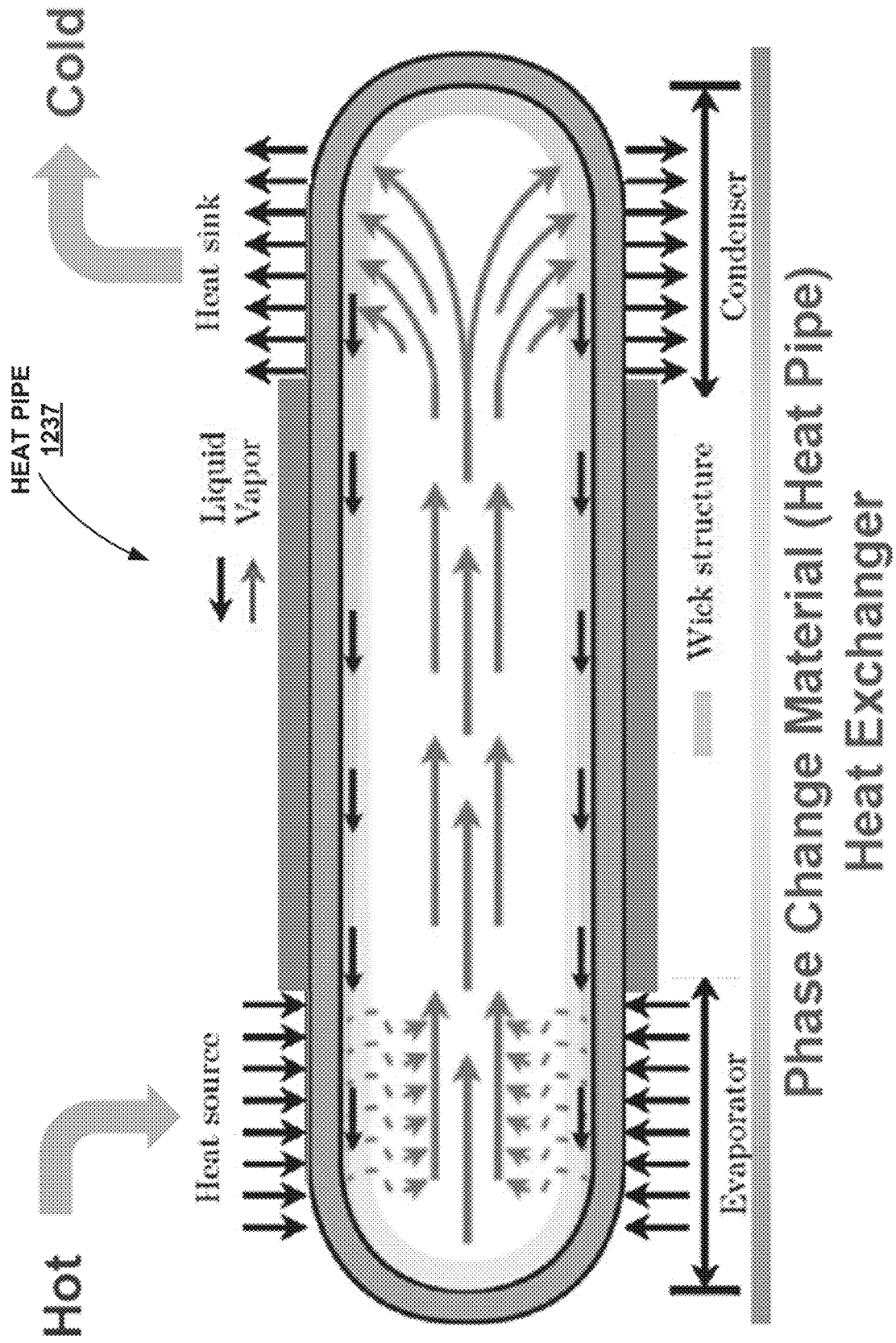
FIG. 12D is a conceptual diagram illustrating a heat pipe, in accordance with one or more techniques of this disclosure.

FIG. 12D is a conceptual diagram illustrating a heat pipe 1237, in accordance with one or more techniques of this disclosure. As seen in FIG. 12D, heat may travel into heat pipe 1237 from a heat source (e.g., thermoelectric elements 1232 and/or hot node 1253). The heat may travel through the heat pipe 1237 to a heat sink (e.g., heat sink 1242). In some examples, heat pipe 1237 may include fluid and/or vapor comprising Water, Ethanol, Methanol, Mercury, Sodium, Lithium, Silver, Ammonia, Nitrogen, Helium, or any combination thereof. The fluid and/or vapor may be configured to carry heat through the heat pipe 1237. In some examples, heat may be referred to herein as "thermal energy."

Figure 13:
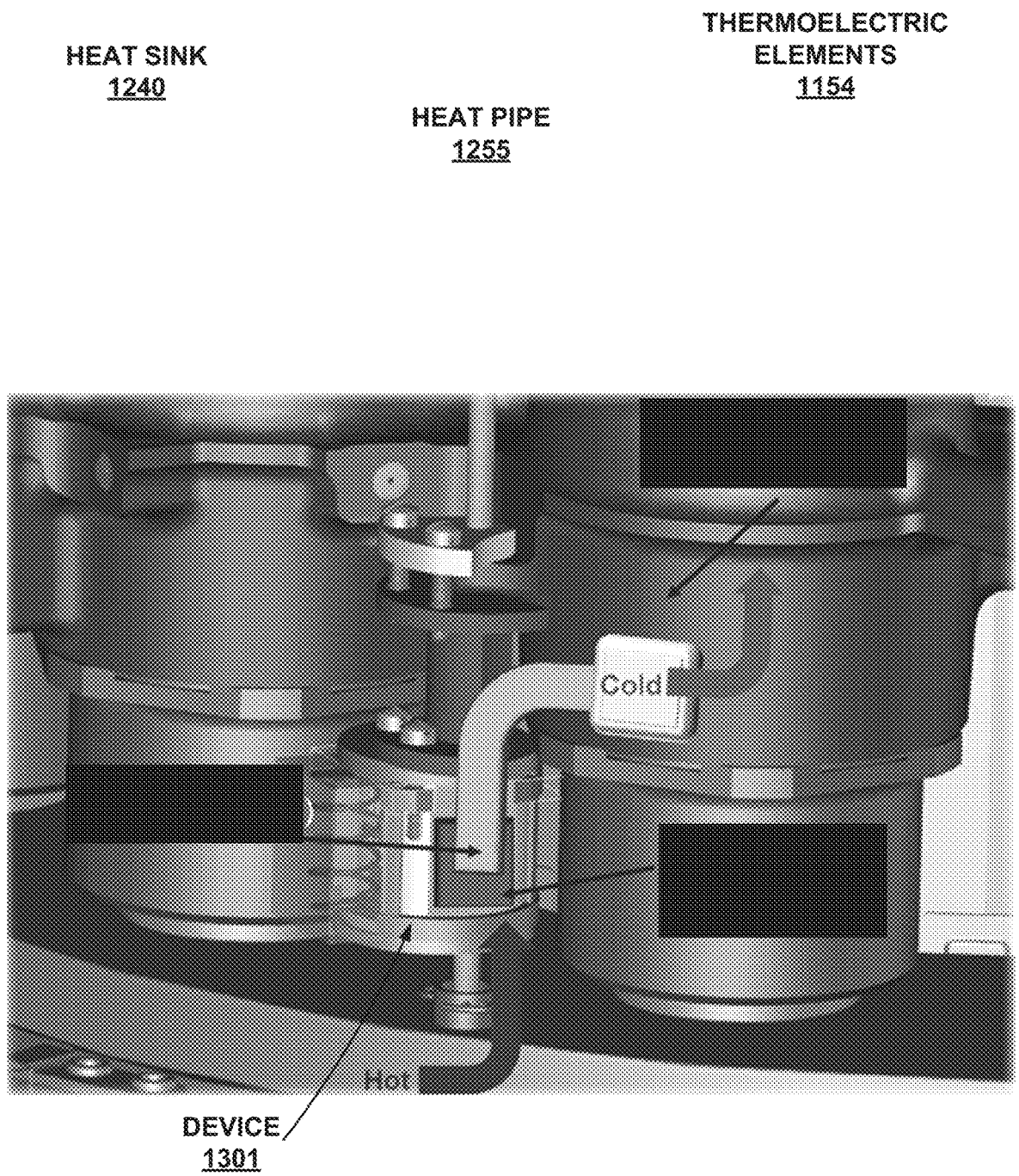
FIG. 13 is a conceptual diagram illustrating a perspective view of a wear sensing device including a thermoelectric device that sinks heat via one or more components of a brake assembly, in accordance with one or more techniques of this disclosure.

FIG. 13 is a conceptual diagram illustrating a perspective view of a wear sensing device 1301 including a thermoelectric device that sinks heat via one or more components of a brake assembly, in accordance with one or more techniques of this disclosure. As seen in FIG. 13, heat pipe 1337 connects thermoelectric elements 1332 to a cold node 1340 that is fixed to a component (e.g., a brake hydraulic cylinder). Heat may travel through the device 1301 to the cold node 1340 through the thermoelectric elements 1332 and the heat pipe 1337. Sinking heat via a brake hydraulic cylinder may increase a temperature gradient between the cold node 1340 and the hot node as compared with systems that do not sink heat via one or more components of a brake assembly. The thermoelectric device may generate electrical energy based on a thermal gradient across thermoelectric elements 1332. A magnitude of the electrical energy may be proportional to a difference in temperature across thermoelectric elements 1332. The heat pipe 1337 may increase a magnitude of energy harvesting and increase an efficiency of the thermoelectric device as compared with systems that do not use a heat pipe. By transferring heat from the device 1301 to the brake hydraulic cylinders, the thermoelectric device may increase a thermal gradient as compared with systems that do not pump heat to a hydraulic cylinder, thereby generating higher electrical energy.

Figure 14A:
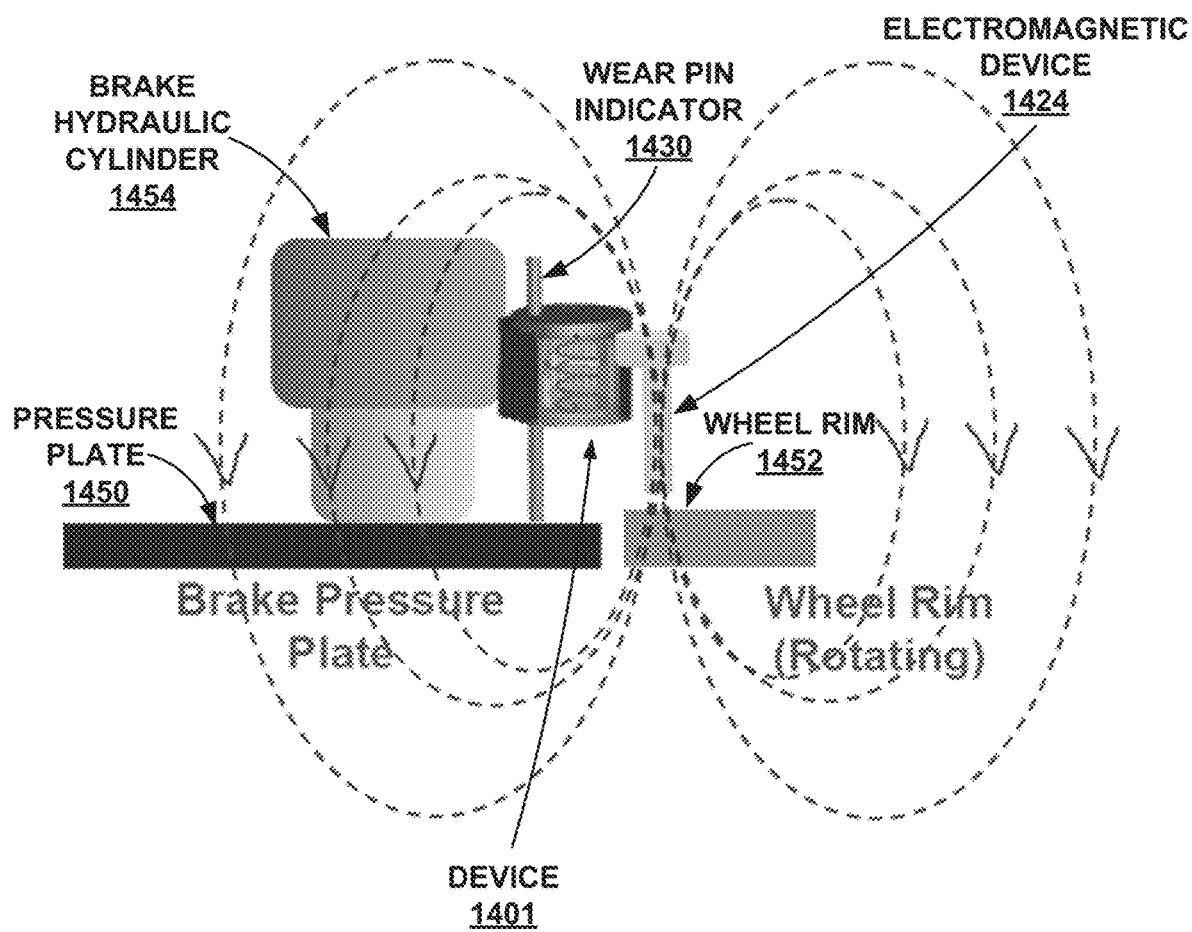
FIG. 14A is a conceptual diagram illustrating a wear sensing device including an electromagnetic device configured to generate an electrical signal based on rotation of a wheel proximate to a bake assembly, in accordance with one or more techniques of this disclosure.

FIG. 14A is a conceptual diagram illustrating a wear sensing device 1401 including an electromagnetic device 1424 configured to generate an electrical signal based on rotation of a wheel proximate to a bake assembly, in accordance with one or more techniques of this disclosure. Device 1401 may be fixed to one or more components of the brake assembly such as pressure plate 1450, a brake carrier, brake hydraulic cylinder 1454, or any combination thereof. Wheel rim 1452 may rotate about the brake assembly while pressure plate 1450, brake hydraulic cylinder 1454, and electromagnetic device 1424 remain fixed relative to wheel rim 1452. In some examples, a rotation of the wheel rim 1452 may create a magnetic field and/or affect a magnetic field proximate to electromagnetic device 1424. The electromagnetic device 1424 may be configured to sense the magnetic field and/or generate an electrical signal based on the magnetic field, and electromagnetic device 1424 may deliver the electrical signal to processing circuitry of device 1401.

Figure 14B:
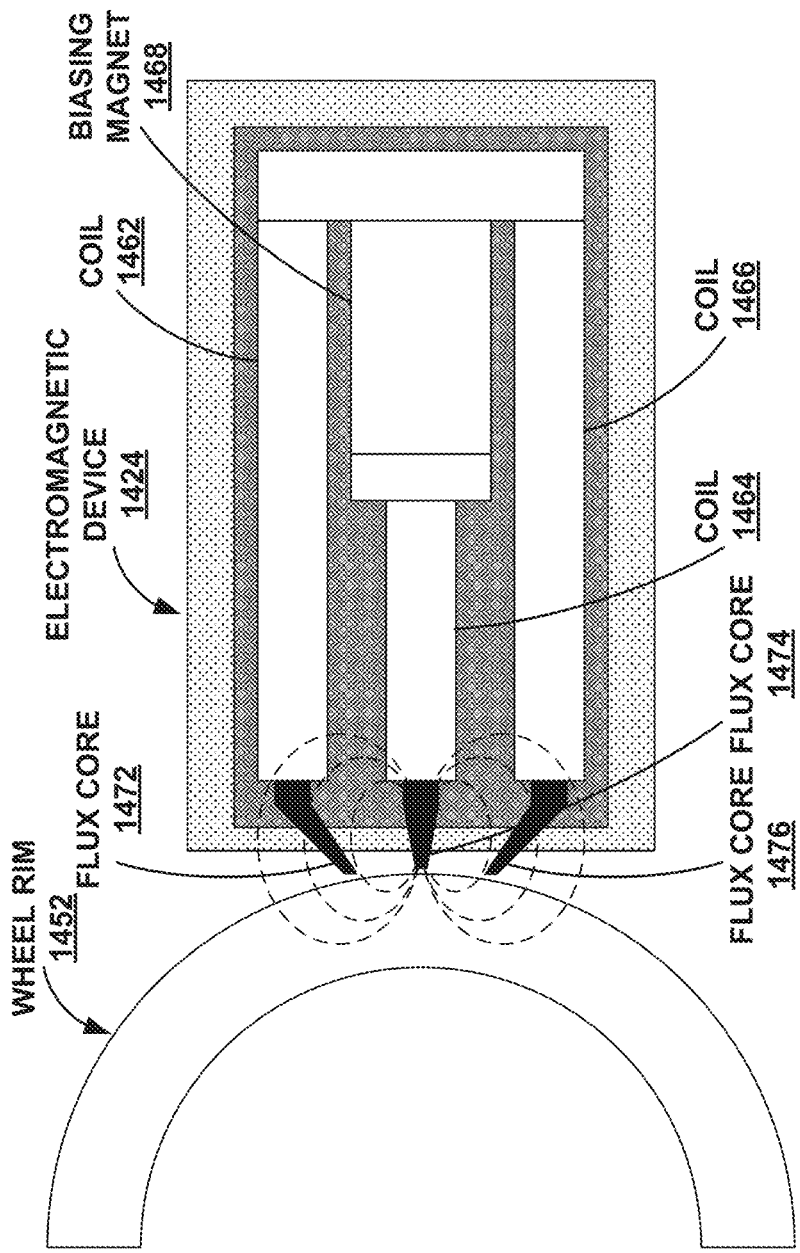
FIG. 14B is a conceptual diagram illustrating a cross section view of the electromagnetic device of FIG. 14A, in accordance with one or more techniques of this disclosure.

FIG. 14B is a conceptual diagram illustrating a cross section view of the electromagnetic device 1424 of FIG. 14A, in accordance with one or more techniques of this disclosure. Electromagnetic device 1424 may be configured to generate an electrical signal based on a rotation of wheel rim 1452. Electromagnetic device 1424 includes coils 1462, 1464, 1466, biasing magnet 1468, and flux cores 1472, 1474, 1476. Flux cores 1472, 1474, 1476 may sense a magnetic field induced by a rotation of wheel rim 1452. Coils 1462, 1464, 1466 may generate an electrical signal based on the magnetic field sensed by flux cores 1472, 1474, 1476. Biasing magnet 1468 may perform one or more actions in order to apply a bias to the electrical signal. Electromagnetic device 1424 may output the electrical signal to energy harvesting circuitry. In some examples, a magnitude of the electrical signal depends on a magnitude of the magnetic field sensed by Coils 1462, 1464, 1466. For example, when a magnitude of the magnetic field increases, a magnitude of the electrical signal may also increase, and when a magnitude of the magnetic field decreases, a magnitude of the electrical signal may also decrease. In some examples, a magnitude of the magnetic field may depend on a rotational speed of the wheel rim 1452. For example, when a speed of the wheel rim 1452 increases, the magnitude of the magnetic field may also increase, and when a speed of the wheel rim 1452 decreases, the magnitude of the magnetic field may also decrease.

Figure 14C:
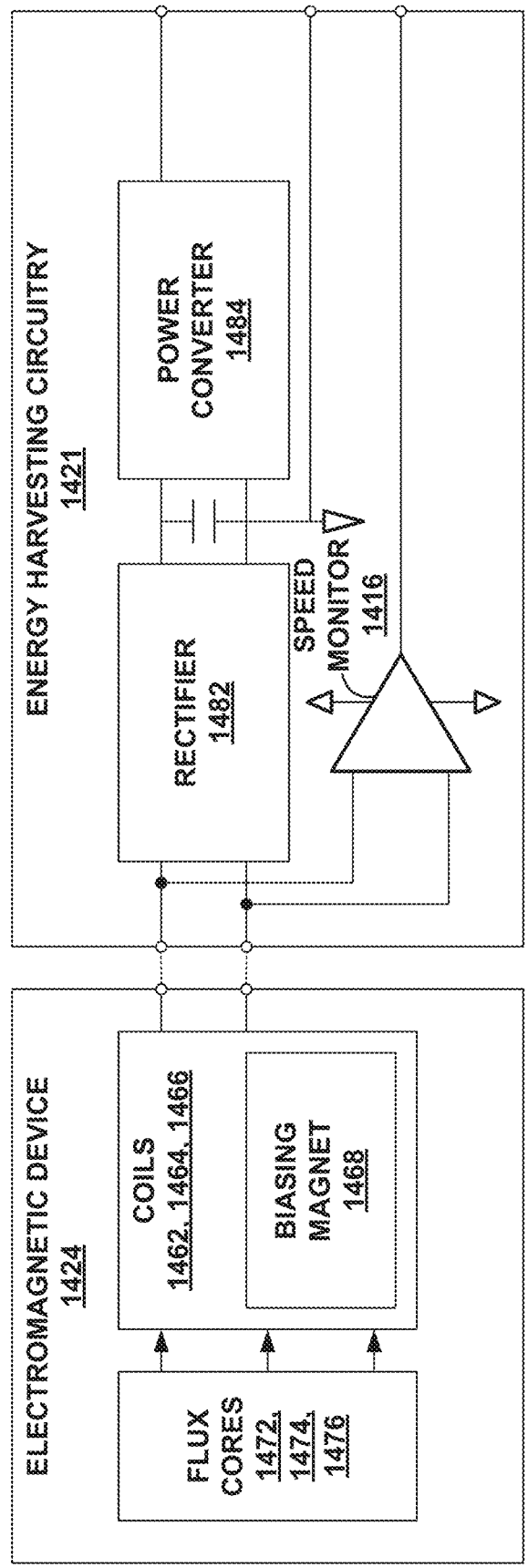
FIG. 14C is a block diagram illustrating energy harvesting circuitry and an electromagnetic device, in accordance with one or more techniques of this disclosure.

FIG. 14C is a block diagram illustrating energy harvesting circuitry 1421 and an electromagnetic device 1424, in accordance with one or more techniques of this disclosure. Electromagnetic device 1424 includes coils 1462, 1464, 1466, biasing magnet 1468, and flux cores 1472, 1474, 1476. Energy harvesting circuitry 1421 may include speed monitor 1415, rectifier 1482, and power converter 1484. In some examples, energy harvesting circuitry 1421 may be an example of energy harvesting circuitry 921 of FIG. 9 and/or energy harvesting circuitry 1021 of FIG. 10. In some examples, electromagnetic device 1424 may be an example of first electromagnetic device 924 of FIG. 9 and/or first electromagnetic device 1024 of FIG. 10.

Flux cores 1472, 1474, 1476 may sense a magnetic field generated based on a rotation of wheel rim 1452. Coils 1462, 1464, 1466 may generate an electrical signal based on the rotation of wheel rim 1452 and deliver the electrical signal to energy harvesting circuitry 1452. Rectifier 1482 may receive the electrical signal and process the electrical signal. Power converter 1484 may generate an output signal based on the processed signal output from rectifier 1482. In some examples, power converter 1484 may represent a direct current-to-direct current (DC/DC) converter. Speed monitor 1416 may generate a speed signal based on the electrical signal received by energy harvesting circuitry 1421. In some examples, the speed signal indicates a rotational speed of the wheel rim 1452 and/or a speed of the vehicle on which energy harvesting circuitry 1421 is located.

Figure 15A:
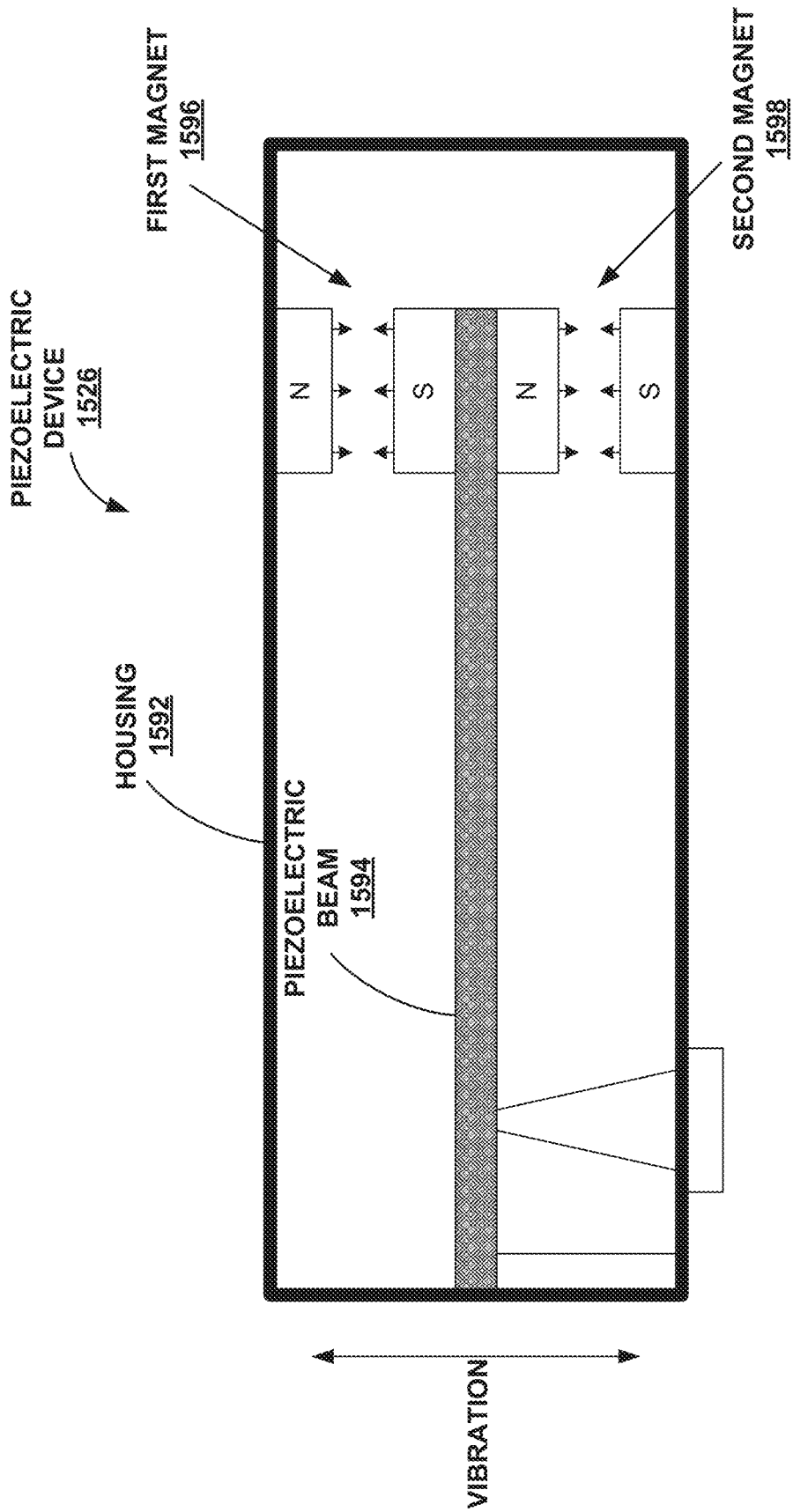
FIG. 15A is a conceptual diagram illustrating a piezoelectric device, in accordance with one or more techniques of this disclosure.

FIG. 15A is a conceptual diagram illustrating a piezoelectric device 1526, in accordance with one or more techniques of this disclosure. Piezoelectric device 1526 includes a housing 1592, piezoelectric beam 1594, first magnet 159, and second magnet 1598. In some examples, first magnet 1596 includes a north pole and a south pole, and the two poles of first magnet 1596 may apply an attractive magnetic force that "pulls" the poles together. In some examples, second magnet 1598 includes a north pole and a south pole, and the two poles of second magnet 1598 may apply an attractive magnetic force that "pulls" the poles together. A null state of piezoelectric device 1526 may be present when a distance between the north pole and the south pole of the first magnet 1596 is equal to a distance between the north pole and the south pole of the second magnet 1598.

When piezoelectric device 1526 vibrates, the piezoelectric beam 1594 may move relative to housing 1592. In some examples, piezoelectric beam 1594 may vibrate relative to housing 1592 when piezoelectric device 1526 vibrates. Piezoelectric device 1526 may generate an electrical signal based on piezoelectric beam 1594 vibrating, thus changing a distance between the north pole and the south pole of the first magnet 1596 and a distance between the north pole and the south pole of the second magnet 1598 over a period of time.

Figure 15B:
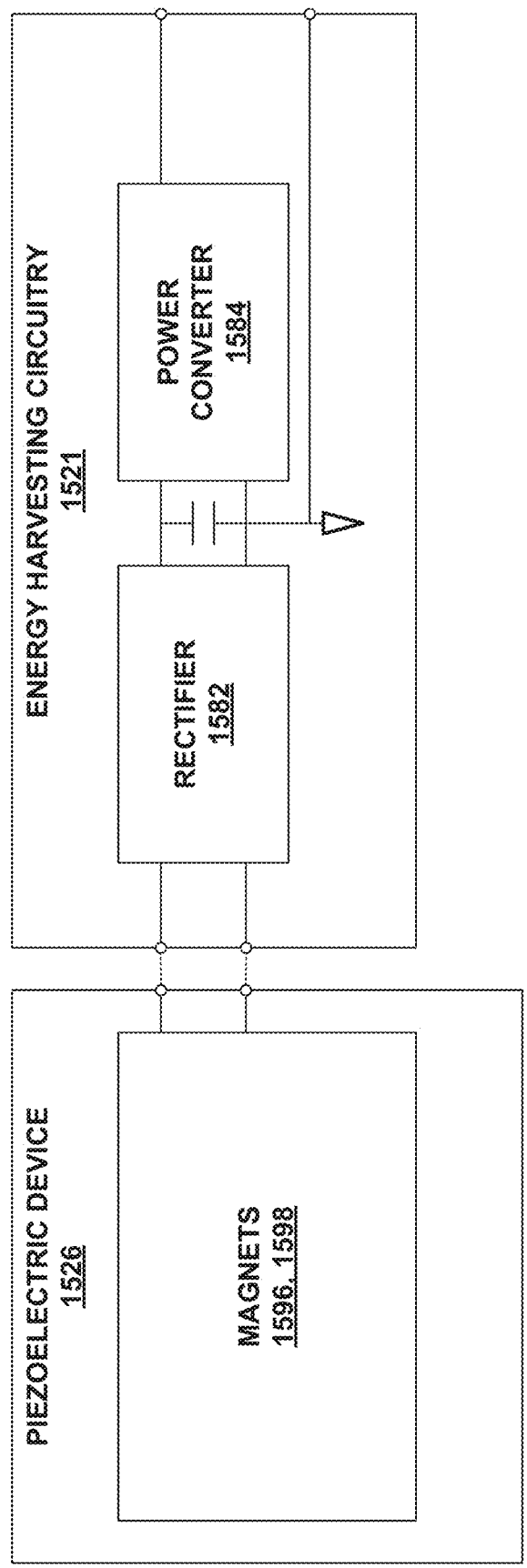
FIG. 15B is a block diagram illustrating energy harvesting circuitry and a piezoelectric device, in accordance with one or more techniques of this disclosure.

FIG. 15B is a block diagram illustrating energy harvesting circuitry 1521 and a piezoelectric device 1526, in accordance with one or more techniques of this disclosure. Piezoelectric device 1526 includes magnets 1596, 1598. Energy harvesting circuitry 1521 may include rectifier 1582 and power converter 1584. In some examples, energy harvesting circuitry 1521 may be an example of energy harvesting circuitry 921 of FIG. 9 and/or energy harvesting circuitry 1021 of FIG. 10. In some examples, piezoelectric device 1526 may be an example of piezoelectric device 926 of FIG. 9 and/or piezoelectric device 1026 of FIG. 10. Piezoelectric device 1526 may generate an electrical signal based on a magnetic field created by magnets 1596, 1598 and transmit this electrical signal to rectifier 1582. Rectifier 1582 may process the electrical signal and deliver the processed electrical signal to power converter 1584. Power converter 1584 may generate another electrical signal based on the processed electrical signal and output the electrical signal.

Figure 16A:
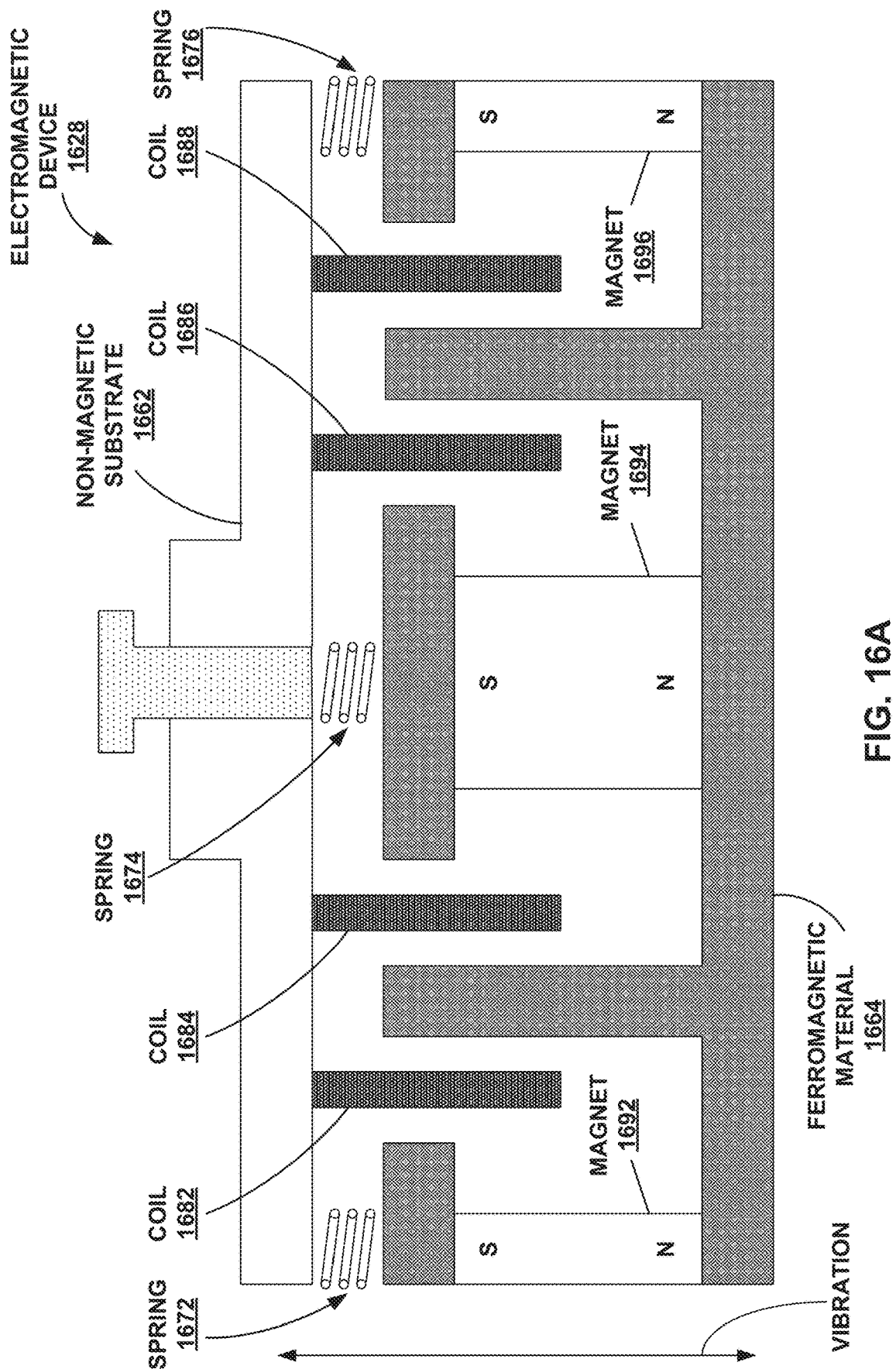
FIG. 16A is a conceptual diagram illustrating an electromagnetic device, in accordance with one or more techniques of this disclosure.

FIG. 16A is a conceptual diagram illustrating an electromagnetic device 1628, in accordance with one or more techniques of this disclosure. Electromagnetic device 1628 includes a non-magnetic substrate 1662, a ferromagnetic material 1664, springs 1672, 1674, 1676, coils 1682, 1684, 1686, 1688, and magnets 1692, 1694, 1696. Springs 1672 may connect a first part of the electromagnetic device 1628 that includes non-magnetic substrate 1662 and coils 1682, 1684, 1686, 1688 with a second part of the electromagnetic device 1628 that includes ferromagnetic material 1664 and magnets 1692, 1694, 1696.

When electromagnetic device 1628 vibrates, the first part of electromagnetic device 1628 may vibrate relative to the second part of electromagnetic device 1628. This means that coils 1682, 1684, 1686, 1688 may move relative to magnets 1692, 1694, 1696 when electromagnetic device 1628 vibrates. Coils 1682, 1684, 1686, 1688 may generate one or more electrical signals based on one or more magnetic fields generated by magnets 1692, 1694, 1696, which change in strength based on a position relative to magnets 1692, 1694, 1696. The one or more electrical signals generated by coils 1682, 1684, 1686, 1688 may indicate a vibration of electromagnetic device 1628 based on coils 1682, 1684, 1686, 1688 moving relative to magnets 1692, 1694, 1696.

Figure 16B:
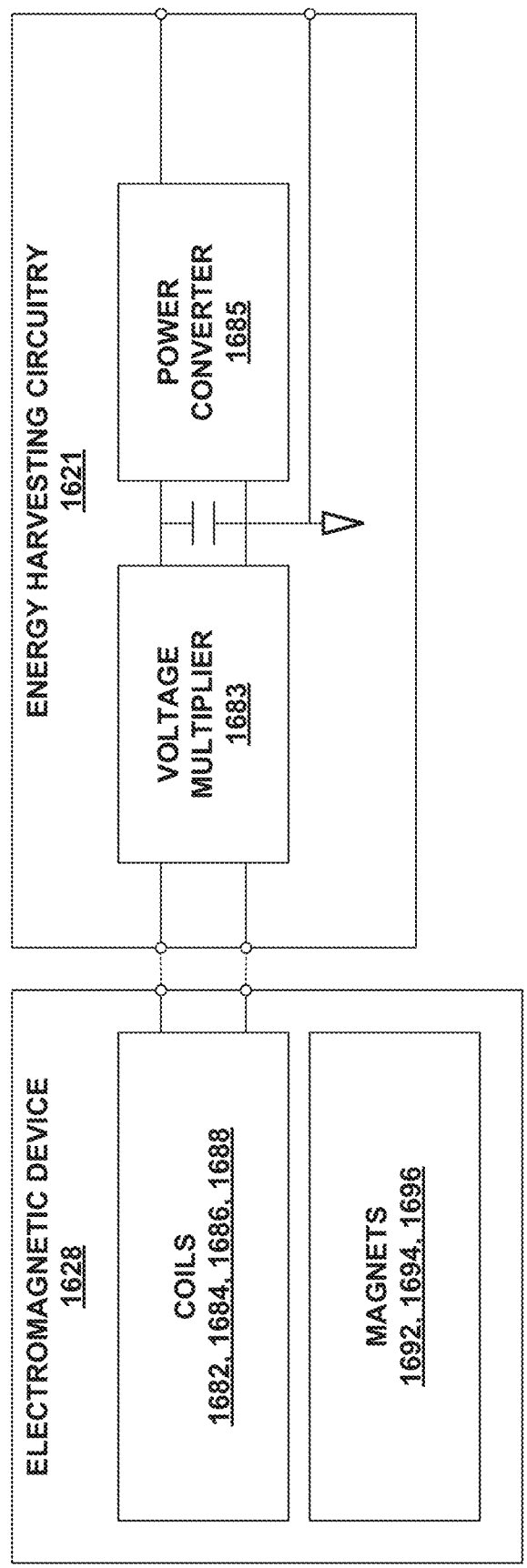
FIG. 16B is a block diagram illustrating energy harvesting circuitry and an electromagnetic device, in accordance with one or more techniques of this disclosure.

FIG. 16B is a block diagram illustrating energy harvesting circuitry 1621 and an electromagnetic device 1628, in accordance with one or more techniques of this disclosure. Electromagnetic device 1628 includes coils 1682, 1684, 1686, 1688 and magnets 1692, 1694, 1696. Energy harvesting circuitry 1621 may include a voltage multiplier 1683 and power converter 1685. In some examples, energy harvesting circuitry 1621 may be an example of energy harvesting circuitry 921 of FIG. 9 and/or energy harvesting circuitry 1021 of FIG. 10. In some examples, electromagnetic device 1628 may be an example of second electromagnetic device 928 of FIG. 9 and/or second electromagnetic device 1028 of FIG. 10. Coils 1682, 1684, 1686, 1688 may generate one or more electrical signals based on a location of coils 1682, 1684, 1686, 1688 relative to magnets 1692, 1694, 1696. Coils 1682, 1684, 1686, 1688 may deliver the one or more electrical signals to voltage multiplier 1683. Voltage multiplier 1683 may send the processed one or more electrical signals to power converter 1685. Power converter 1685 may generate another one or more electrical signals.

Figure 17:
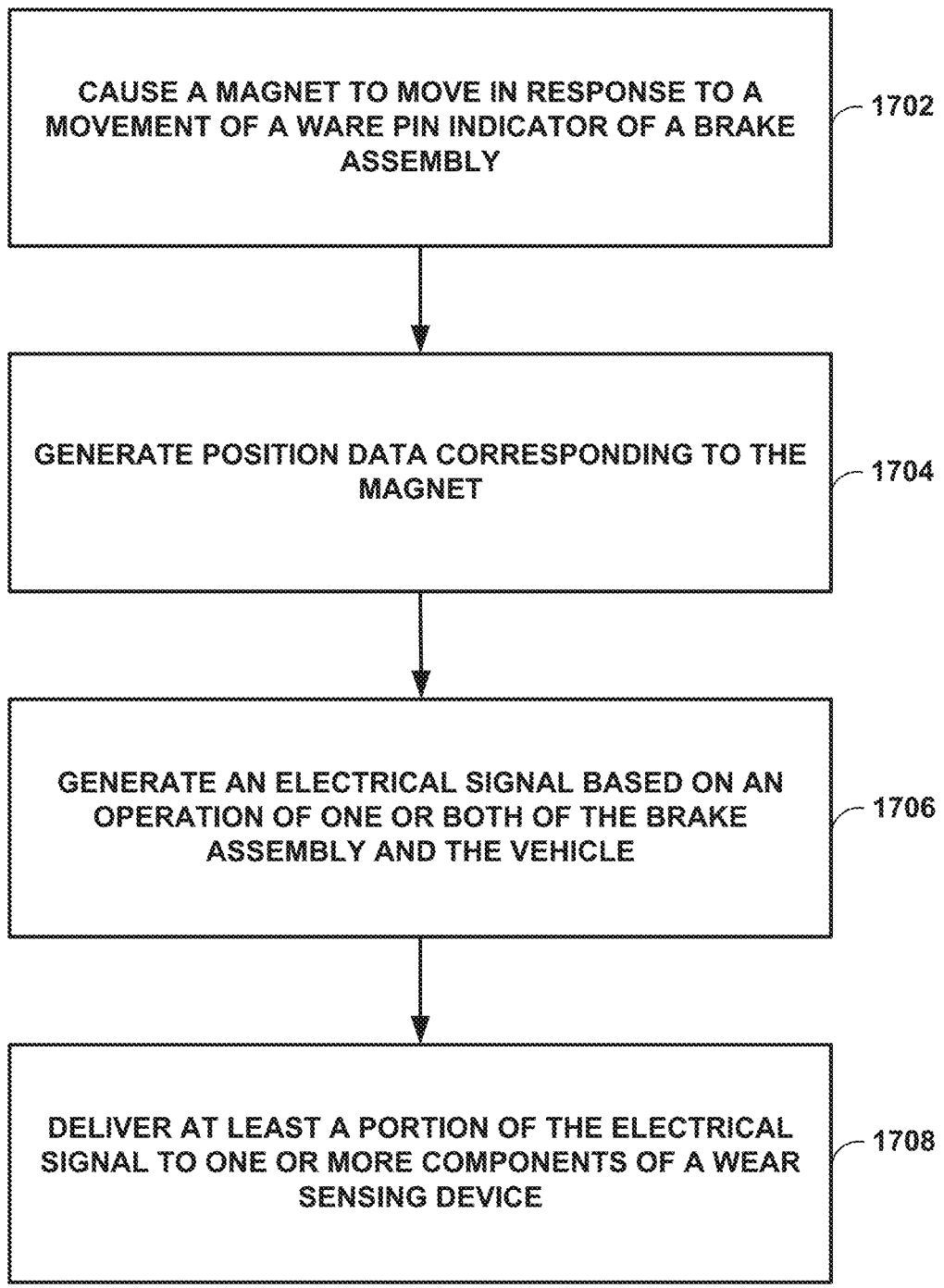
FIG. 17 is a flow diagram illustrating an example operation for sensing an amount of wear of a brake assembly and harvesting energy, in accordance with one or more techniques of this disclosure.

FIG. 17 is a flow diagram illustrating an example operation for sensing an amount of wear of a brake assembly and harvesting energy, in accordance with one or more techniques of this disclosure. FIG. 17 is described with respect to wear sensing device 101 and brake assembly 131 of FIG. 1. However, the techniques of FIG. 17 may be performed by different components of wear sensing device 101 and brake assembly 131 or by additional or alternative systems.

Brake assembly 131 may cause a magnet 120 to move in response to a movement of a wear pin indicator 130 (1702). In some examples, magnet 120 may move laterally in response to the movement of the wear pin indicator 130. In some examples, magnet 120 may rotate in response to the movement of the wear pin indicator 130 without moving laterally. In some examples, a movement of wear pin indicator 130 may represent a movement relative to wear sensing device 101. In some examples, a movement of wear pin indicator 130 may represent a change in a remaining wear length of the wear pin indicator 130. The remaining length of the wear pin indicator 130 may represent a distance that wear pin indicator 130 extends past one or more components (e.g., brake carrier 140) of brake assembly 131. Wear sensing device 101 may be fixed to one or more components of a brake assembly such that wear sensing device 101 can sense a change in the remaining wear length of the wear pin indicator 130.

Wear sensing device 101 may generate position data corresponding to magnet 120 (1704). In some examples, wear sensing device 101 may include a sensor 102 that is configured to generate the position data based on a position of the magnet relative to the sensor 102. In some examples, the sensor 102 senses one or more lateral movement parameters of magnet 120. In some examples, the sensor 102 senses one or more rotational parameters of magnet 120.

Energy harvesting device 114 may generate an electrical signal based on an operation of one or both of a brake assembly 131 and a vehicle on which brake assembly 131 is located (1706). In some examples, energy harvesting device 114 may include one or more thermoelectric devices, one or more electromagnetic devices, one or more piezoelectric devices, or any combination thereof. For example, the brake assembly 131 may generate heat during operation. One or more thermoelectric devices may harvest this heat in order to generate an electrical signal. The brake assembly 131 may vibrate during operation. An electromagnetic device and/or a piezoelectric device may generate an electrical signal based on the vibration. A wheel may rotate around brake assembly 131. An electromagnetic device may generate an electrical signal based on the rotation of the wheel. Energy harvesting device 114 may deliver at least a portion of the electrical signal to one or more components of wear sensing device 101 (1708).

Figure 18:
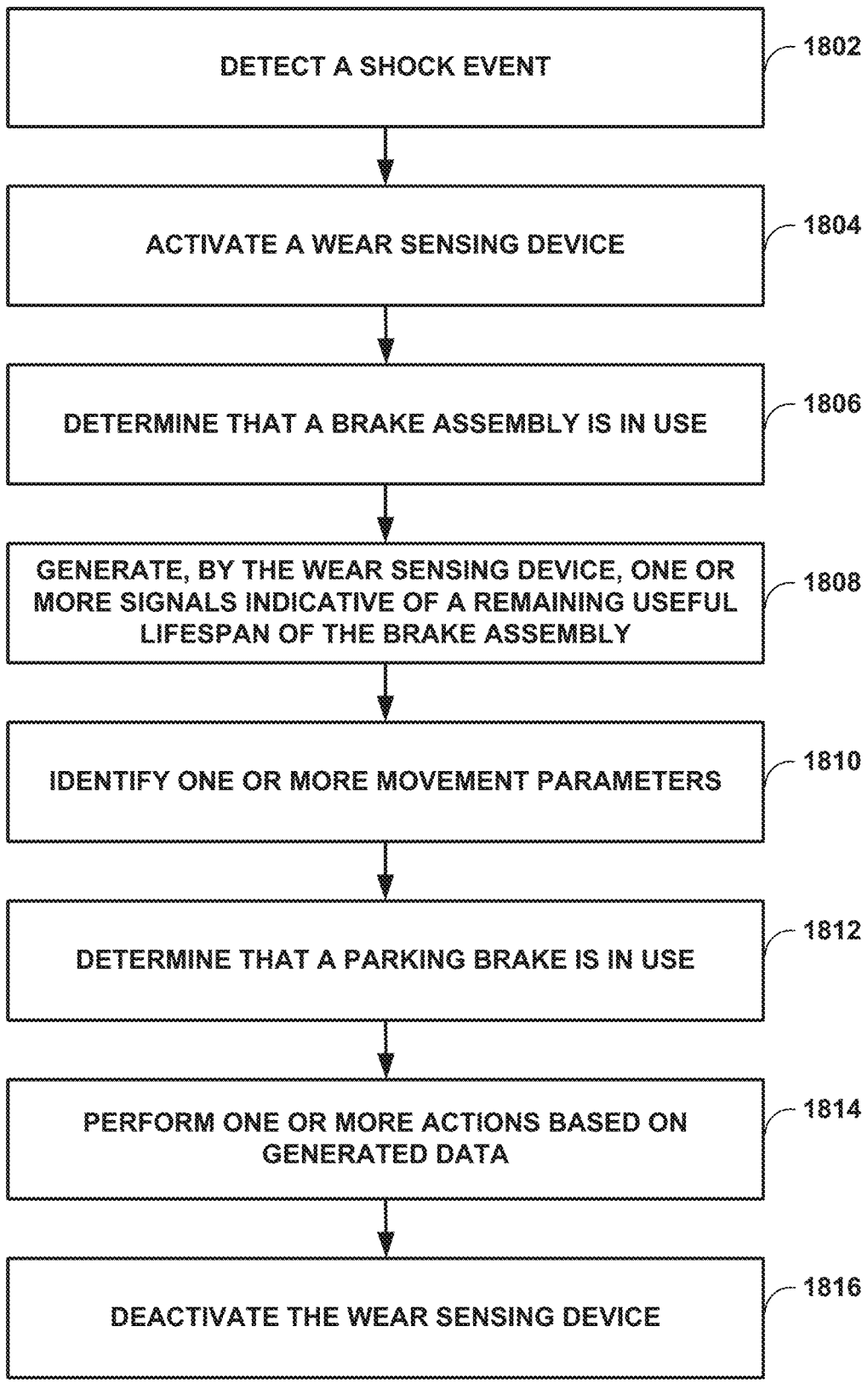
FIG. 18 is a flow diagram illustrating an example operation for operating a wear sensing device when an aircraft lands, in accordance with one or more techniques of this disclosure.

FIG. 18 is a flow diagram illustrating an example operation for operating a wear sensing device when an aircraft lands, in accordance with one or more techniques of this disclosure. FIG. 18 is described with respect to wear sensing device 101 and brake assembly 131 of FIG. 1, system 900 of FIG. 9, and system 1000 of FIG. 10. However, the techniques of FIG. 18 may be performed by different components of wear sensing device 101, brake assembly 131, system 900, and system 1000, or by additional or alternative systems.

In some examples, an aircraft may include one or more wear sensing devices, wherein each wear sensing device of the one or more wear sensing devices monitor a respective brake assembly of the aircraft. In some examples, each wear sensing device of the one or more wear sensing devices generates one or more signals that indicate a remaining life of the respective brake assembly. In some cases, it may be beneficial for the one or more wear sensing devices to monitor the respective brake assemblies when the aircraft is taking off, landing, taxiing, resting, or any combination thereof. The one or more wear sensing devices may be configured to generate signals indicative of one or more use states of the aircraft including taking off, landing, taxiing, resting, or any combination thereof. The one or more wear sensing devices may activate or deactivate depending on a use state of the aircraft.

In some examples, an onboard sensor (e.g., a sensor of wear sensing device 101) may detect a shock event (1802). In some examples, the shock event may represent a contact between landing gear of the aircraft and the ground when the aircraft is landing. In some examples, a sensor may be configured to detect a weight on wheels (WoW) using a shock sensing algorithm. The sensor that performs the shock detection may be part of a wear sensing device, but this is not required.

Based on detecting the shock event, one or more components of wear sensing device 101 may activate and start drawing power from a power source (1804). In some examples, it may be beneficial for the wear sensing device to deactivate when the aircraft is flying and activate when the aircraft landing because the wear sensing device 101 may be most effective when the aircraft is on the ground. Once the one or more components of wear sensing device 101 are activated, the wear sensing device 101 may begin generating one or more signals that indicate a remaining life of the respective brake assembly.

In some examples, wear sensing device 101 may detect one or more events at which the brake assembly is applied (1806). For example, the brake assembly may perform braking functions one or more times after the aircraft lands. In some examples, wear sensing device 101 may monitor position sensing data and/or acceleration data in order to determine when the brakes are applied. In some examples, wear sensing device may detect one or more taxiing "snub" events based on acceleration data and brake wear-out data. Wear sensing device 101 may generate one or more signals indicative of a remaining useful lifespan of the brake assembly (1808) based on detecting the shock event, detecting that the brake assembly is in use, detecting one or more taxiing snub events or any combination thereof.

Wear sensing device 101 may identify one or more movement parameters (1810). In some examples, the one or more movement parameters may include velocity data, acceleration data, shock data, or any combination thereof. These one or more movement parameters may indicate whether the aircraft is decelerating and/or whether a parking brake is applied. Wear sensing device 101 may additionally or alternatively measure temperature data in order to determine whether the aircraft is decelerating and/or whether the parking brake is applied. Wear sensing device 101 may determine that the parking brake is in use (1812). Based on determining that the parking brake is in use, wear sensing device 101 may perform one or more actions based on the generated data (1814). For example, wear sensing device 101 may transmit information (e.g., wear sensing data and/or any other kind of data generated by the wear sensing device) via communication circuitry 112. One or more components of wear sensing device 101 ma deactivate when the wear sensing device 101 is finished performing the one or more actions (1816).

Figure 19:
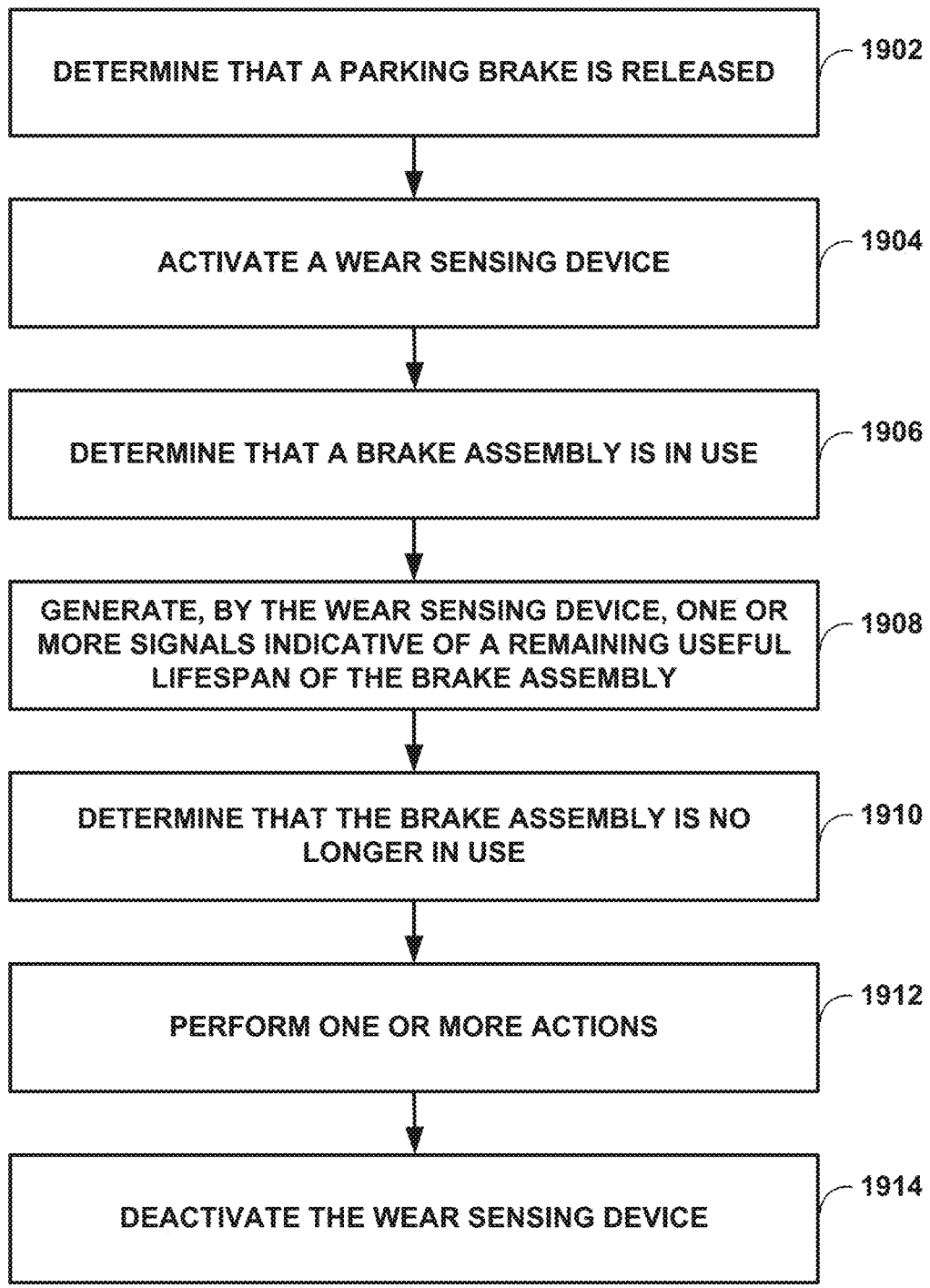
FIG. 19 is a flow diagram illustrating an example operation for operating a wear sensing device when an aircraft takes off, in accordance with one or more techniques of this disclosure.

FIG. 19 is a flow diagram illustrating an example operation for operating a wear sensing device when an aircraft takes off, in accordance with one or more techniques of this disclosure. FIG. 19 is described with respect to wear sensing device 101 and brake assembly 131 of FIG. 1, system 900 of FIG. 9, and system 1000 of FIG. 10. However, the techniques of FIG. 19 may be performed by different components of wear sensing device 101, brake assembly 131, system 900, and system 1000, or by additional or alternative systems.

In some examples, an aircraft may include one or more wear sensing devices, wherein each wear sensing device of the one or more wear sensing devices monitor a respective brake assembly of the aircraft. In some examples, each wear sensing device of the one or more wear sensing devices generates one or more signals that indicate a remaining life of the respective brake assembly. In some cases, it may be beneficial for the one or more wear sensing devices to monitor the respective brake assemblies when the aircraft is taking off, landing, taxiing, resting, or any combination thereof. The one or more wear sensing devices may be configured to generate signals indicative of one or more use states of the aircraft including taking off, landing, taxiing, resting, or any combination thereof. The one or more wear sensing devices may activate or deactivate depending on a use state of the aircraft.

Wear sensing device 101 may determine that a parking brake is released (1902). Based on determining that a parking brake is released, one or more components of wear sensing device 101 may activate (1904). Wear sensing device 101 may determine that a brake assembly is in use (1906). Based on determining that a parking brake assembly is in use, wear sensing device 101 may generate one or more signals indicative of a remaining useful lifespan of the brake assembly (1908). Wear sensing device 101 may determine that the brake assembly is no longer in use (1910) and perform one or more actions (1912). These one or more actions may include transmitting and/or receiving information via communication circuitry. The wear sensing device 101 may deactivate after performing the one or more actions (1914).

Figure 20:
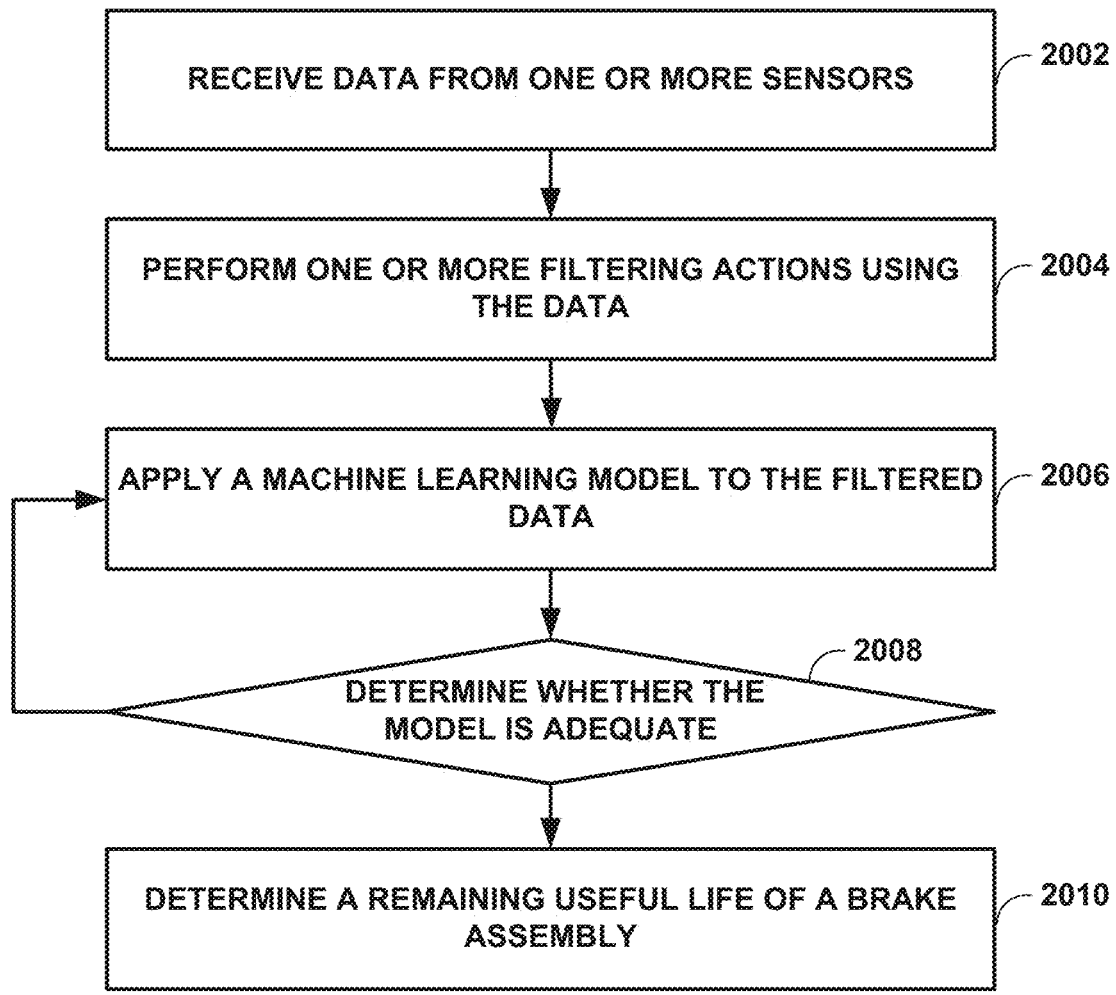
FIG. 20 is a flow diagram illustrating an example operation for using a machine learning model to determine a remaining useful lifespan of a brake assembly, in accordance with one or more techniques of this disclosure.

FIG. 20 is a flow diagram illustrating an example operation for using a machine learning model to determine a remaining useful lifespan of a brake assembly, in accordance with one or more techniques of this disclosure. FIG. 20 is described with respect to wear sensing device 101 and brake assembly 131 of FIG. 1, system 900 of FIG. 9, and system 1000 of FIG. 10. However, the techniques of FIG. 20 may be performed by different components of wear sensing device 101, brake assembly 131, system 900, and system 1000, or by additional or alternative systems.

In some examples, a computing device is configured to receive data from one or more sensors (2002). In some examples, the computing device may be configured to receive the data from one or more wear sensing devices and/or one or more other sensors. For example, the computing device may collect data from one or more wear position sensors, one or more temperature sensors, one or more accelerometers (e.g., 3-axis accelerometers), one or more gyroscopes, or any combination thereof.

In some examples, the computing device is configured to perform one or more filtering actions using the data (2004). The computing device is configured to filter the data received by the computing device. For example, the computing device may transform data collected by the one or more wear sensing device during landing, parking and takeoff of an aircraft to a clean dataset. The data may, in some examples may include inconsistent values. It may be beneficial to filter the data in order to remove instances having missing values, estimate missing values of instances using statistical method, removing duplicate instances, and normalizing the sensor data in the dataset.

The computing device may apply a machine learning model to the filtered data (2006). In some examples, the computing device may apply the central limit theorem (CLT) to the filtered data in order to generate one or more outputs. In some examples, the computing device passes sensor data through a learning block that analyzes normal gaussian distribution to calculate one or more mean values. The computing device may use a multivariate CLT method for multi-sensor data correlation.

The computing device is configured to determine whether the model is adequate (2008). The computing device may compare normal distribution parameters stored in a memory with a current set of data for which normal distribution parameters are calculated. The errors are measured between the different stages integrated over time to validate the model accuracy. Based on a model verification error band, the computing device may proceed to a next stage. In some examples, verification is repeated iteratively to obtain acceptable error band.

When the computing device determines that the model is not adequate ("NO" at block 2008), the computing device may determine a remaining useful life of one or more brake assemblies (2010). Based on the trained model and the current sensor dataset, the computing device may derive the normal distribution parameters are derived. The computing device may perform statistical data analysis is performed, and a relationship may be established between multi sensors with linear or multiple polynomial regression method. The remaining useful life (RUL) of the brakes may be predicted. The RUL data may be communicated to a cloud and/or field maintenance operator.

Figure 21:
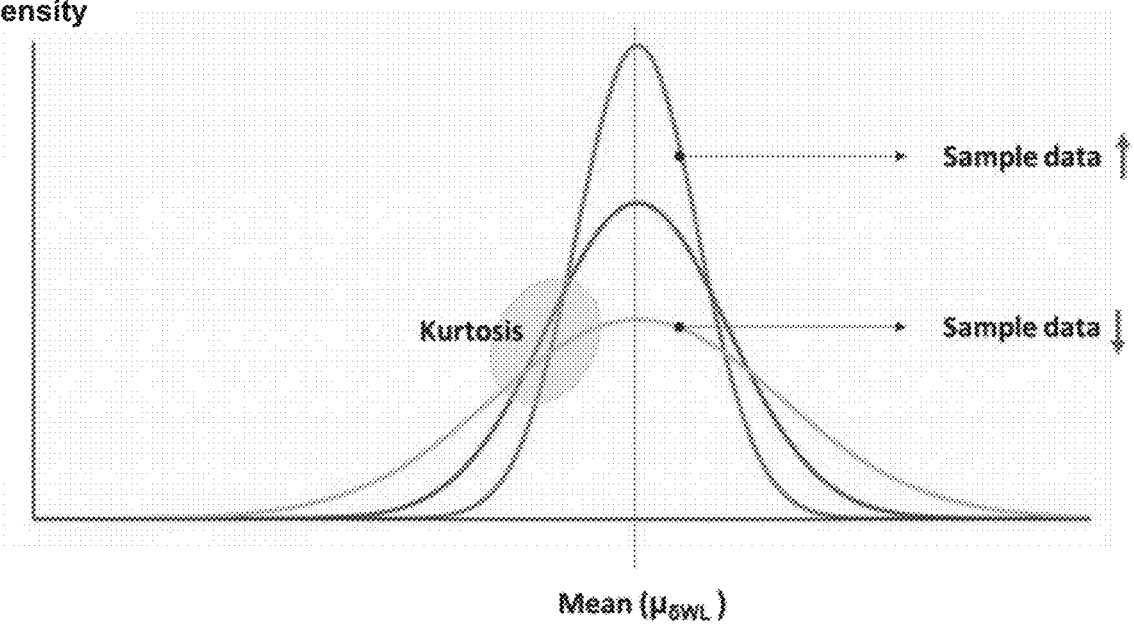
FIG. 21 is a diagram illustrating a plot of one or more gaussian distributions, in accordance with one or more techniques of this disclosure.

FIG. 21 is a diagram illustrating a plot 2100 of one or more gaussian distributions, in accordance with one or more techniques of this disclosure. In some examples, a computing device may analyze the one or more gaussian distributions by applying the central limit theorem.

In some examples, the computing device may analyze sensor data based on normal distribution, the central limit theorem, linear or multi polynomial regression analysis, special inferencing algorithms, or any combination thereof. The below equation is an equation for a gaussian distribution.

$$f(x_i) = \frac{1}{\sigma_i \sqrt{2\pi}} e^{-\frac{1}{2}\left(\frac{x_i - \mu_i}{\sigma_i}\right)^2} \quad \text{(equation 1)}$$

In some examples, $f(x_i)$ represents a probability density function of a gaussian distribution, $\sigma_i$ represents a standard deviation of the probability density function, $\mu_i$ represents a mean of the probability density function, $x_i$ represents a raw score of the gaussian distribution, and $$Z = \frac{x_i - \mu_i}{\sigma_i}$$

is a Z-score of the probability density function. A variance of a gaussian distribution may be given by the below equation.

$$\sigma^2 = \frac{\sum (x_i - \mu)^2}{N} \quad \text{(equation 2)}$$

In some examples, $\sigma^2$ is the variance of a gaussian distribution, $x_i$ is the value of one data point, $\mu$ is the mean of all data points, and N is the number of all data points. An equation for the standard deviation of a gaussian distribution may be given by the below equation.

$$\sigma = \sqrt{\frac{\sum (x_i - \mu)^2}{N}} \quad \text{(equation 3)}$$

The central limit theorem provides that when random variables are collected, their properly normalized sum tends toward a normal distribution. Under the central limit theorem, when random samples are taken from a population of data points to form a dataset with mean $\mu$ and standard deviation a, a distribution of the dataset may be approximately normally distributed. This may hold true regardless of whether the source population is normal or skewed, provided the sample size is sufficiently large (usually N>30).

In some examples, a computing device stores wear-out data collected for every landing in a memory. The computing device may retrieve previous wear-out data is retrieved from the memory. For example, a difference between current and previous landing wear-out data may be stored in the memory. In some examples, the difference may be stored as $\delta WL_n$ with respect to a number of landings $N_n$. After recording a dataset that is integrated over time, calculating a sample mean of the $\delta WL_n$ may be normally distributed if the sample size meets CLT criteria.

As seen in plot 2100, a gaussian distribution curve may stretch or squeeze with reference to a sample dataset. A larger dataset may "squeeze" the curve making it narrower, resulting in smaller standard deviation. Applying the central limit theorem to a collected sensor dataset for a specific time interval may result in calculating a mean value $\mu_{\delta WL}$. Tracking a mean value for a larger number of aircraft landings and establishing a correlation with the wear-out data provides the slope (rate of wear-out) for specific conditions. The wear-out data for aircraft parked condition, taxiing snub, and hard landings may be filtered with multi-sensor fusion and stored separately in the memory.

Figure 22:
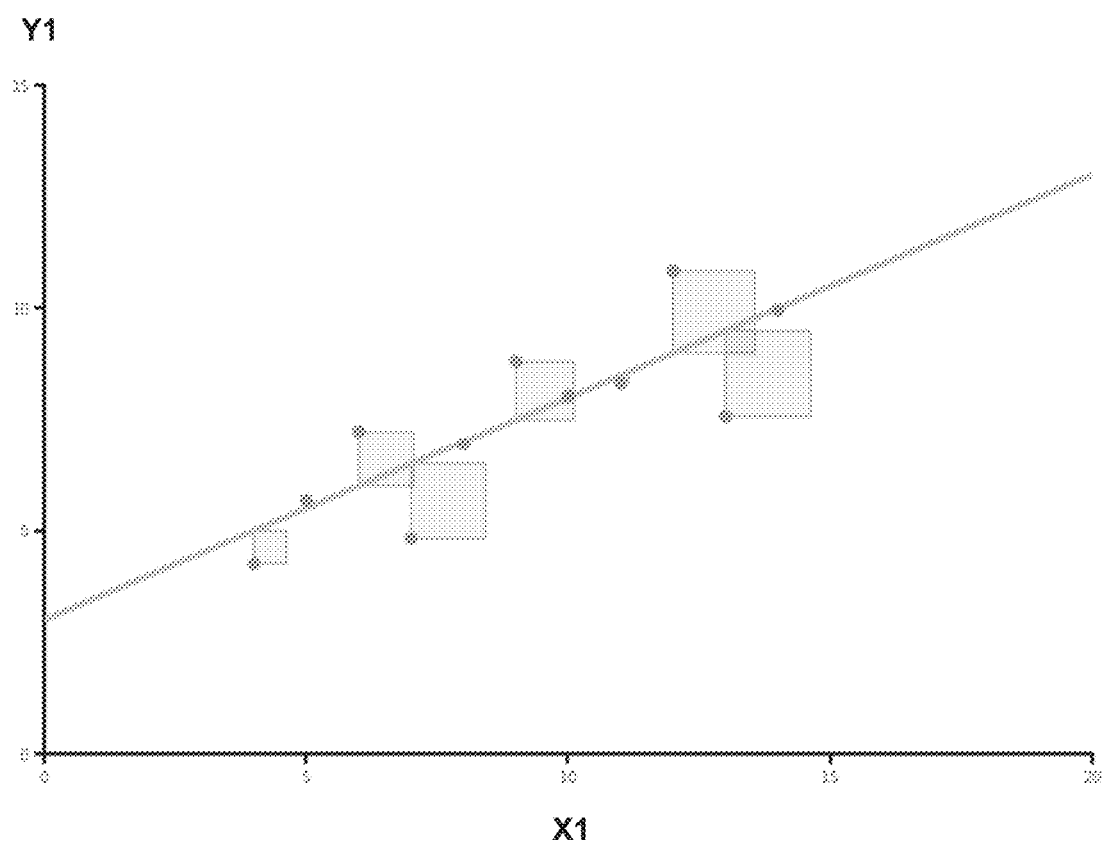
FIG. 22 is a diagram illustrating a plot of a linear regression analysis, in accordance with one or more techniques of this disclosure.

FIG. 22 is a diagram illustrating a plot 2200 of a linear regression analysis, in accordance with one or more techniques of this disclosure. In some examples, a computing device may apply linear regression in order to analyze brake wear sensor data.

In some examples, a computing device may execute an optimized model stored in a memory. In some examples, the processing circuitry may further process the model through the decision tree for edge inferencing. The computing device may retrieve sorted or filtered data from the memory to establish a relationship by means of regression to predict the remaining useful life of one or more brake assemblies (e.g., an estimated remaining number of landings). Regression is an approach for modeling a relationship between variables. A linear regression model may include a relationship between two variables, whereas multiple polynomial regression may include a modeling relationship between multiple variables. The simple least squares approach to regression includes approximating the parameters of a linear model. In some examples, linear regression may determine a linear model that minimizes a sum of the squared errors between the observations in a dataset and those predicted by the model. In some examples, the following equation may represent a linear regression model:

$$y_i = \beta_1 x_i + \beta_0 + \varepsilon_i \qquad \text{(equation 4)}$$

In some examples, $y_i$ represents a dependent value of a linear regression model, $x_i$ represents an independent variable of the linear regression model, $\beta_1$ and $\beta_0$ are coefficients of the linear regression model, and $\varepsilon_i$ represents the error of the linear regression model.

Figure 23:
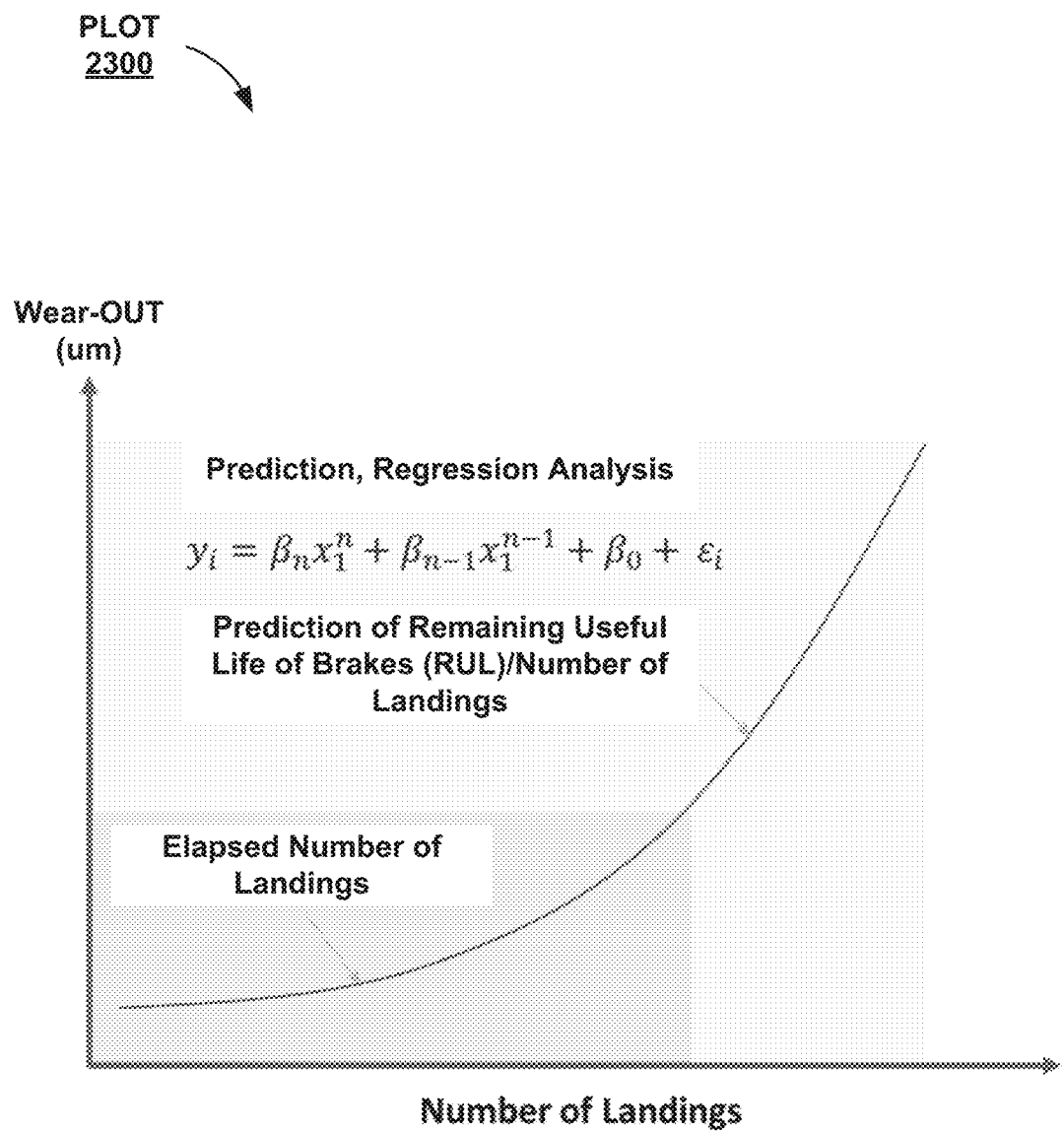
FIG. 23 is a diagram illustrating a plot of a non-linear regression analysis, in accordance with one or more techniques of this disclosure.

FIG. 23 is a diagram illustrating a plot 2300 of a non-linear regression analysis, in accordance with one or more techniques of this disclosure. In some examples, a computing device may apply non-linear regression in order to analyze brake wear sensor data.

A computing device may generate and execute a non-linear regression model in an edge device. The computing device may, in some examples, generate a non-linear regression model based on wear data corresponding to one or more brake assemblies. In some examples, the computing device may store the model in a memory. The computing device may retrieve the model is retrieved from the memory for the inferencing and prediction of the remaining useful life of the brakes. Wear data indicators, RUL, energy information sent may be sent to a cloud for further processing and actions. The following equations may represent a non-linear regression model and/or a multiple polynomial regression model.

$$\begin{bmatrix} y_1 \\ y_2 \\ y_3 \\ \vdots \\ y_n \end{bmatrix} = \begin{bmatrix} 1 & x_1 & x_1^2 & \cdots & x_1^m \\ 1 & x_2 & x_2^2 & \cdots & x_2^m \\ 1 & x_3 & x_3^2 & \cdots & x_3^m \\ \vdots & \vdots & \vdots & \ddots & \vdots \\ 1 & x_n & x_n^2 & \cdots & x_n^m \end{bmatrix} \begin{bmatrix} \beta_1 \\ \beta_2 \\ \beta_3 \\ \vdots \\ \beta_n \end{bmatrix} + \begin{bmatrix} E_1 \\ E_2 \\ E_3 \\ \vdots \\ E_n \end{bmatrix} \qquad \text{(equation 4)}$$

$$y_i = \beta_n x_1^n + \beta_{n-1} x_1^{n-1} + \beta_0 + \varepsilon_i \qquad \text{(equation 5)}$$

As seen in FIG. 23, a non-linear regression model and/or a multiple polynomial regression model may include a section for an "elapsed number of landings" and a section for a "prediction of remaining useful life of brakes." The prediction section of the model may allow a prediction of a number of landings remaining before a brake assembly wears out.

Figure 24:
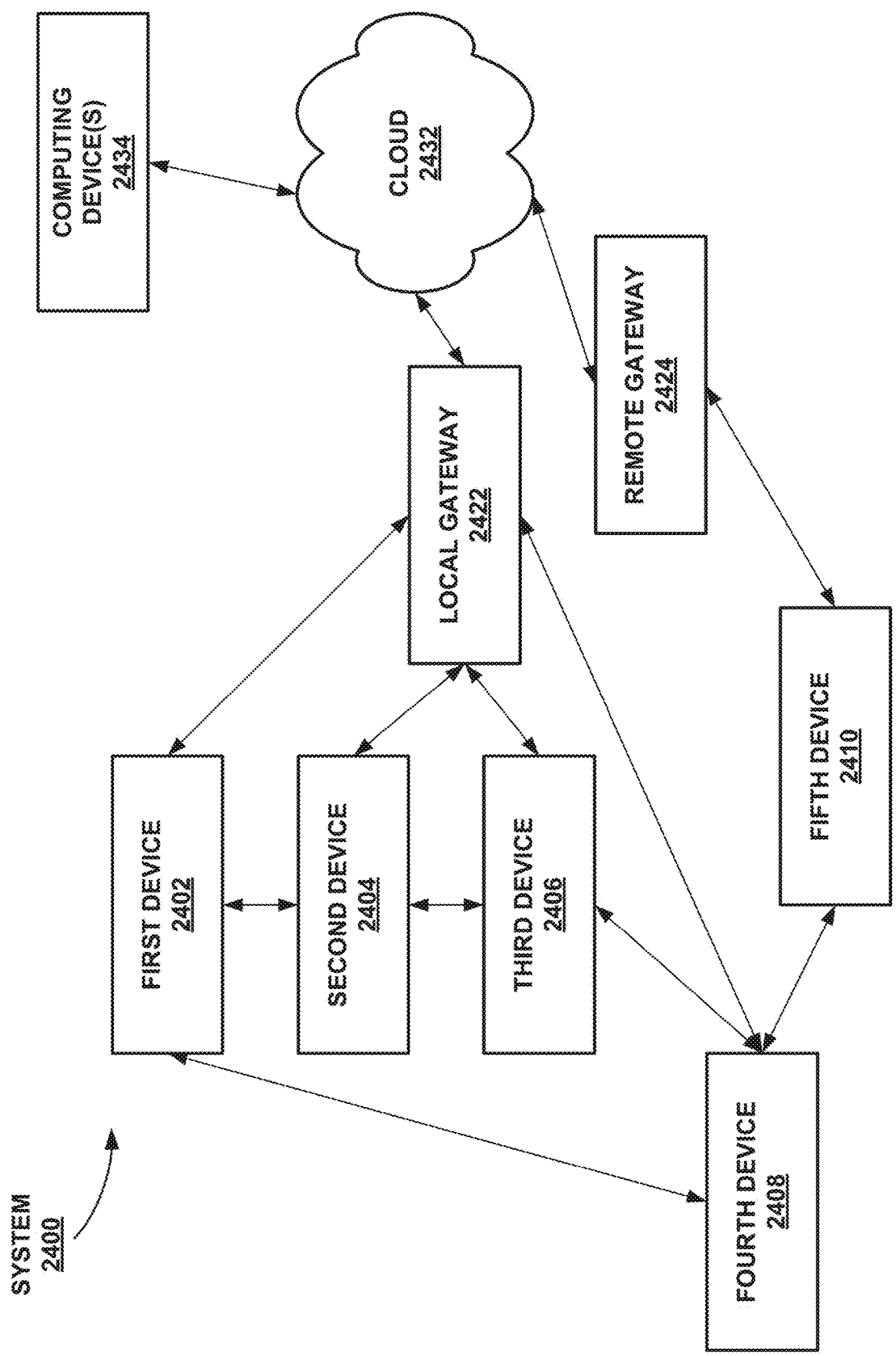
FIG. 24 includes a block diagram illustrating a system including a set of wear sensing devices connected to one or more computing devices via one or more gateways, in accordance with one or more techniques of this disclosure.

FIG. 24 includes a block diagram illustrating a system 244 including a set of wear sensing devices connected to one or more computing devices via one or more gateways, in accordance with one or more techniques of this disclosure. As seen in FIG. 24, system 2400 includes a first device 2402, a second device 2404, a third device 2406, a fourth device 2408, and a fifth device 2410 (collectively, "devices 2402-2410"). Devices 2402-2410 may be connected to cloud 2432 via local gateway 2422 and/or remote gateway 2424. Computing device(s) 2432 may be connected to cloud 2432.

In some examples, each device of devices 2402-2410 may represent a wear sensing device that generates data indicative of a remaining useful life of a brake assembly. In some examples, devices 2402-2410 may form a mesh network including sensors located on the same network. Each device of devices 2402-2410 may communicate with one or more other devices of devices 2402-2410 via one or more wireless links. These one or more wireless links include Bluetooth® wireless links and/or one or more other kinds of wireless links. In some examples, each device of devices 2402-2410 may communicate one or more sensing parameters such as a current remaining wear length of a wear pin indicator, a temperature, vibration and/or shock data, gyroscope data, battery status information, or any combination thereof. In some examples, each device of devices 2402-2410 may be configured for point-to-point communication between one or more nodes of the network. In some examples, each device of devices 2402-2410 may be configured to perform edge inferencing in order to predict a remaining useful life of a respective brake assembly.

In some examples, the local gateway 2422 comprises a gateway that is located on a same vehicle on which devices 2402-2410 are located. In some examples, the local gateway 2422 comprises an aircraft data gateway (ADG). In some examples, remote gateway 2424 may be located separately from a vehicle on which devices 2402-2410 are located. In some examples, one or more of devices 2402-2410 may communicate with the local gateway 2422 according to one or more Bluetooth® communication protocols or one or more Wi-Fi communication protocols. In some examples, one or more of devices 2402-2410 may communicate with the remote gateway 2424 using one or more Long Range (LoRa) communication protocols and/or one or more SigFox Low Power Wide Area Network (LPWAN) protocols.

The following numbered examples demonstrate one or more aspects of the disclosure.

Example 1. A system comprising: a magnet configured to move in response to a movement of a wear pin indicator of a brake assembly of a vehicle; a sensor configured to generate position data corresponding to the magnet, the position data indicating a relative linear position of the wear pin indicator, wherein the position data corresponds to an estimated remaining useful lifespan of the brake assembly; and an energy harvesting device configured to generate an electrical signal based on an operation of one or both of the brake assembly and the vehicle, wherein the energy harvesting device is configured to deliver at least a portion of the electrical signal to the sensor.

Example 2. The system of example 1, wherein the system further comprises processing circuitry configured to: activate the sensor in response to determining that a status of the vehicle supports a measurement of the estimated useful lifespan of the brake assembly; control the sensor to generate the position data corresponding to the magnet; and determine, based on the position data, the estimated remaining useful lifespan of the brake assembly.

Example 3. The system of examples 1-2 or any combination thereof, wherein to activate the sensor in response to determining that the status of the vehicle supports the measurement of the estimated useful lifespan of the brake assembly, the processing circuitry is configured to: receive one or more signals indicating a shock event indicating a landing of the vehicle, wherein the vehicle comprises an aircraft; and activate the sensor in response to determining that the status of the vehicle is a landed status.

Example 4. The system of claim 3, wherein to activate the sensor in response to determining that the status of the vehicle supports the measurement of the estimated useful lifespan of the brake assembly, the processing circuitry is configured to: receive one or more signals indicating that a parking brake of the vehicle is released; and activate the sensor in response to determining that the status of the vehicle is a landed status with the parking brake being released.

Example 5. The system of examples 1-4 or any combination thereof, further comprising a rotational element configured to rotate in response to the movement of the wear pin indicator, wherein the magnet is attached to the rotational element and configured to rotate in response to the movement of the wear pin indicator, and wherein the sensor is configured to generate the position data based on an angle of the magnet relative to the sensor.

Example 6. The system of claim 5, wherein the rotational element comprises a gear comprising a first set of teeth that form a first set of grooves, wherein the wear pin indicator includes an elongate member comprising a second set of teeth that form a second set of grooves, wherein the first set of teeth are configured to engage with the second set of teeth such that a linear movement of the wear pin indicator relative to the rotational element causes the rotational element to rotate about an axis of rotation.

Example 7. The system of claim 6, wherein the magnet is positioned such that an axis of rotation of the magnet is aligned with the axis of rotation of the rotational element.

Example 8. The system of examples 1-7 or any combination thereof, wherein the energy harvesting device comprises a thermoelectric device configured to generate the electrical signal based on a temperature gradient between a hot node and a cold node.

Example 9. The system of claim 8, wherein the thermoelectric device comprises: a set of thermoelectric elements connected to a hot node of the thermoelectric device, wherein the set of thermoelectric elements are configured to generate the electrical signal based on the temperature gradient between the hot node and the cold node, and wherein a magnitude of the electrical signal depends on a difference in temperature between the hot node and the cold node.

Example 10. The system of claim 9, wherein the thermoelectric device further comprises: a heat sink device comprising the cold node of the thermoelectric device, wherein thermal energy is configured to travel from the hot node to the heat sink device through the thermoelectric elements such that the thermoelectric elements generate the electrical signal.

Example 11. The system of claim 10, wherein a housing at least partially encloses the magnet and the sensor, and wherein the heat sink device comprises: a rounded member extending at least partially around the housing that at least partially encloses the magnet and the sensor; and a set of fins, wherein each fin of the set of fins extends radially from the rounded member of the heat sink device.

Example 12. The system of examples 10-11 or any combination thereof, further comprising: a phase change material (PCM) heat pipe configured to deliver thermal energy from the hot node to the heat sink device comprising cold node of the thermoelectric device, wherein the PCM heat pipe connects the heat sink device to the thermoelectric elements such so that at least a portion of the heat sink device is laterally displaced from the housing relative to the wear pin indicator.

Example 13. The system of examples 9-12 or any combination thereof, wherein the thermoelectric device further comprises: a phase change material (PCM) heat pipe configured to deliver thermal energy from the hot node to the cold node; and a connector device configured to connect the PCM heat pipe to the cold node, wherein an element of the brake assembly comprises the cold node.

Example 14. The system of examples 1-13 or any combination thereof, wherein the energy harvesting device comprises an electromagnetic device configured to generate the electrical signal based on a magnetic field induced by a wheel rotating proximate to the brake assembly.

Example 15. The system of example 14, wherein an amplitude of the electrical signal is correlated with a rotational velocity of the wheel.

Example 16. The system of examples 1-15 or any combination thereof, wherein the energy harvesting device comprises a piezoelectric device configured to generate the electrical signal based on a vibration induced by the brake assembly.

Example 17. The system of examples 1-16 or any combination thereof, wherein the energy harvesting device comprises an electromagnetic device configured to generate the electrical signal based on a vibration induced by the brake assembly.

Example 18. The system of examples 1-17 or any combination thereof, further comprising: a housing at least partially enclosing the magnet and the sensor; communication circuitry at least partially enclosed by the housing, wherein the communication circuitry is configured to transmit the position data; and a computing device configured to receive the position data form the communication circuitry.

Example 19. A method comprising: moving a magnet in response to a movement of a wear pin indicator of a brake assembly of a vehicle; generating, by a sensor, position data corresponding to the magnet, the position data indicating a relative linear position of the wear pin indicator, wherein the position data corresponds to an estimated remaining useful lifespan of the brake assembly; generating, by an energy harvesting device, an electrical signal based on an operation of one or both of the brake assembly and the vehicle; and delivering, by the energy harvesting device, at least a portion of the electrical signal to the sensor.

Example 20. A non-transitory computer-readable medium comprising instructions for causing one or more processors to: generate position data corresponding to a magnet that moves in response to a movement of a wear pin indicator of a brake assembly of a vehicle, the position data indicating a relative linear position of the wear pin indicator, wherein the position data corresponds to an estimated remaining useful lifespan of the brake assembly; generate an electrical signal based on an operation of one or both of the brake assembly and the vehicle; and deliver at least a portion of the electrical signal.

In one or more examples, the techniques described herein may utilize hardware, software, firmware, or any combination thereof for achieving the functions described. Those functions implemented in software may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure.

Instructions may be executed by one or more processors within the accelerometer or communicatively coupled to the accelerometer. The one or more processors may, for example, include one or more DSPs, general purpose microprocessors, application specific integrated circuits ASICs, FPGAs, or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for performing the techniques described herein. Also, the techniques could be fully implemented in one or more circuits or logic elements.

The techniques of this disclosure may be implemented in a wide variety of devices or apparatuses that include integrated circuits (ICs) or sets of ICs (e.g., chip sets). Various components, modules, or units are described in this disclosure to emphasize functional aspects of devices configured to perform the disclosed techniques, but do not necessarily require realization by different hardware units. Rather, various units may be combined or provided by a collection of interoperative hardware units, including one or more processors as described above, in conjunction with suitable software and/or firmware.

Various examples of the disclosure have been described. Any combination of the described systems, operations, or functions is contemplated. These and other examples are within the scope of the following claims.

What is claimed is:

1. A system comprising:
a magnet configured to move in response to a movement of a wear pin indicator of a brake assembly of a vehicle;
a rotational element configured to rotate in response to the movement of the wear pin indicator, wherein the magnet is attached to the rotational element and configured to rotate in response to the movement of the wear pin indicator, wherein the rotational element comprises a gear comprising a first set of teeth that form a first set of grooves, wherein the wear pin indicator includes an elongate member comprising a second set of teeth that form a second set of grooves, and wherein the first set of teeth are configured to engage with the second set of teeth such that a linear movement of the wear pin indicator relative to the rotational element causes the rotational element to rotate about an axis of rotation;
a sensor configured to generate position data based on an angle of the magnet relative to the sensor, the position data indicating a relative linear position of the wear pin indicator, wherein the position data corresponds to an estimated remaining useful lifespan of the brake assembly; and
an energy harvesting device configured to generate an electrical signal based on an operation of one or both of the brake assembly and the vehicle, wherein the energy harvesting device is configured to deliver at least a portion of the electrical signal to the sensor.

2. The system of claim 1, wherein the system further comprises processing circuitry configured to:
activate the sensor in response to determining that a status of the vehicle supports a measurement of the estimated remaining useful lifespan of the brake assembly;
control the sensor to generate the position data; and
determine, based on the position data, the estimated remaining useful lifespan of the brake assembly.

3. The system of claim 2, wherein to activate the sensor in response to determining that the status of the vehicle supports the measurement of the estimated remaining useful lifespan of the brake assembly, the processing circuitry is configured to:
receive one or more signals indicating a shock event indicating a landing of the vehicle, wherein the vehicle comprises an aircraft; and
activate the sensor in response to determining that the status of the vehicle is a landed status.

4. The system of claim 2, wherein to activate the sensor in response to determining that the status of the vehicle supports the measurement of the estimated remaining useful lifespan of the brake assembly, the processing circuitry is configured to:
receive one or more signals indicating that a parking brake of the vehicle is released; and
activate the sensor in response to determining that the status of the vehicle is a landed status with the parking brake being released.

5. The system of claim 1, wherein the magnet is positioned such that an axis of rotation of the magnet is aligned with the axis of rotation of the rotational element.

6. The system of claim 1, wherein the energy harvesting device comprises a thermoelectric device configured to generate the electrical signal based on a temperature gradient between a hot node of the thermoelectric device and a cold node of the thermoelectric device.

7. The system of claim 6, wherein the thermoelectric device comprises:
a set of thermoelectric elements connected to the hot node of the thermoelectric device,
wherein the set of thermoelectric elements are configured to generate the electrical signal based on the temperature gradient between the hot node and the cold node, and wherein a magnitude of the electrical signal depends on a difference in temperature between the hot node and the cold node.

8. The system of claim 7, wherein the thermoelectric device further comprises:
- a heat sink device comprising the cold node of the thermoelectric device,
- wherein thermal energy is configured to travel from the hot node to the heat sink device through the set of thermoelectric elements such that the set of thermoelectric elements generate the electrical signal.

9. The system of claim 8,
wherein a housing at least partially encloses the magnet and the sensor, and
wherein the heat sink device comprises:
- a rounded member extending at least partially around the housing that at least partially encloses the magnet and the sensor; and
- a set of fins, wherein each fin of the set of fins extends radially from the rounded member of the heat sink device.

10. The system of claim 9, further comprising:
- a phase change material (PCM) heat pipe configured to deliver thermal energy from the hot node to the heat sink device comprising cold node of the thermoelectric device,
- wherein the PCM heat pipe connects the heat sink device to the set of thermoelectric elements such so that at least a portion of the heat sink device is laterally displaced from the housing relative to the wear pin indicator.

11. The system of claim 7, wherein the thermoelectric device further comprises:
- a phase change material (PCM) heat pipe configured to deliver thermal energy from the hot node to the cold node; and
- a connector device configured to connect the PCM heat pipe to the cold node, wherein an element of the brake assembly comprises the cold node.

12. The system of claim 1, wherein the energy harvesting device comprises an electromagnetic device configured to generate the electrical signal based on a magnetic field induced by a wheel rotating proximate to the brake assembly.

13. The system of claim 12, wherein an amplitude of the electrical signal is correlated with one or both of a rotational velocity and a rotational acceleration of the wheel.

14. The system of claim 1, wherein the energy harvesting device comprises a piezoelectric device configured to generate the electrical signal based on a vibration induced by the brake assembly.

15. The system of claim 1, wherein the energy harvesting device comprises an electromagnetic device configured to generate the electrical signal based on a vibration induced by the brake assembly.

16. The system of claim 1, further comprising:
- a housing at least partially enclosing the magnet and the sensor;
- communication circuitry at least partially enclosed by the housing, wherein the communication circuitry is configured to transmit the position data; and
- a computing device configured to receive the position data form the communication circuitry.

17. A method comprising:
- moving a magnet in response to a movement of a wear pin indicator of a brake assembly of a vehicle;
- causing a rotational element configured to rotate in response to the movement of the wear pin indicator, wherein the magnet is attached to the rotational element and configured to rotate in response to the movement of the wear pin indicator, wherein the rotational element comprises a gear comprising a first set of teeth that form a first set of grooves, wherein the wear pin indicator includes an elongate member comprising a second set of teeth that form a second set of grooves, and wherein the first set of teeth are configured to engage with the second set of teeth such that a linear movement of the wear pin indicator relative to the rotational element causes the rotational element to rotate about an axis of rotation;
- generating, by a sensor, position data based on an angle of the magnet relative to the sensor, the position data indicating a relative linear position of the wear pin indicator, wherein the position data corresponds to an estimated remaining useful lifespan of the brake assembly;
- generating, by an energy harvesting device, an electrical signal based on an operation of one or both of the brake assembly and the vehicle; and
- delivering, by the energy harvesting device, at least a portion of the electrical signal to the sensor.

18. A system comprising:
- a magnet configured to move in response to a movement of a wear pin indicator of a brake assembly of a vehicle;
- a sensor configured to generate position data corresponding to the magnet, the position data indicating a relative linear position of the wear pin indicator, wherein the position data corresponds to an estimated remaining useful lifespan of the brake assembly; and
- an energy harvesting device configured to generate an electrical signal based on an operation of one or both of the brake assembly and the vehicle, wherein the energy harvesting device is configured to deliver at least a portion of the electrical signal to the sensor,
- wherein the energy harvesting device includes a thermoelectric device comprising:
  - a set of thermoelectric elements connected to a hot node of the thermoelectric device, wherein the set of thermoelectric elements are configured to generate the electrical signal based on a temperature gradient between the hot node and a cold node of the thermoelectric device, and wherein a magnitude of the electrical signal depends on a difference in temperature between the hot node and the cold node;
  - a phase change material (PCM) heat pipe configured to deliver thermal energy from the hot node to the cold node; and
  - a connector device configured to connect the PCM heat pipe to the cold node, wherein an element of the brake assembly comprises the cold node.

19. The system of claim 18, wherein the thermoelectric device further comprises:
- a heat sink device comprising the cold node of the thermoelectric device,
- wherein thermal energy is configured to travel from the hot node to the heat sink device through the set of thermoelectric elements such that the set of thermoelectric elements generate the electrical signal.

20. The system of claim 19,
wherein a housing at least partially encloses the magnet and the sensor, and
wherein the heat sink device comprises:
- a rounded member extending at least partially around the housing that at least partially encloses the magnet and the sensor; and a set of fins, wherein each fin of the set of fins extends radially from the rounded member of the heat sink device.

\* \* \* \* \*